(12) United States Patent
Vance et al.

(10) Patent No.: US 7,050,986 B1
(45) Date of Patent: May 23, 2006

(54) SYSTEM FOR CORPORATE TRAVELER PLANNING AND TRAVEL MANAGEMENT

(75) Inventors: Arlene M. Vance, Flower Mound, TX (US); Kerry Balch, Dallas, TX (US); Karl Vochatzer, Flower Mound, TX (US); Cynthia Sawtell, Arlington, TX (US); Sherry Williams, Dallas, TX (US)

(73) Assignee: The Sabre Group, Inc., Fort Worth, TX (US)

( * ) Notice: Subject to any disclaimer, the term of this patent is extended or adjusted under 35 U.S.C. 154(b) by 0 days.

(21) Appl. No.: 08/951,630

(22) Filed: Oct. 16, 1997

Related U.S. Application Data

(63) Continuation of application No. 08/524,381, filed on Sep. 6, 1995, now abandoned.

(51) Int. Cl.
    *G06F 17/06* (2006.01)
(52) U.S. Cl. ............................................ 705/5; 705/6
(58) Field of Classification Search ............... 705/5, 705/6; 340/825.28, 825.29
    See application file for complete search history.

(56) References Cited

U.S. PATENT DOCUMENTS

| | | | |
|---|---|---|---|
| 4,449,186 A * | 5/1984 | Kelly et al. ..................... | 705/5 |
| 4,862,357 A | 8/1989 | Ahlstrom et al. | |
| 4,922,439 A | 5/1990 | Greenblatt | |
| 5,021,953 A | 6/1991 | Webber et al. | |
| 5,191,523 A | 3/1993 | Whitesage | |
| 5,202,985 A | 4/1993 | Goyal | |
| 5,237,499 A | 8/1993 | Garback | |
| 5,253,166 A * | 10/1993 | Dettelbach et al. ............ | 705/5 |
| 5,270,921 A | 12/1993 | Hornick | |
| 5,311,425 A | 5/1994 | Inada | |
| 5,319,542 A | 6/1994 | King, Jr. et al. ............ | 364/401 |
| 5,331,546 A * | 7/1994 | Webber et al. | |
| 5,422,809 A | 6/1995 | Griffin et al. | |
| 5,467,268 A | 11/1995 | Sisley et al. | |
| 5,570,283 A * | 10/1996 | Shoolery et al. ............ | 395/275 |
| 5,644,721 A | 7/1997 | Chung et al. | |

(Continued)

FOREIGN PATENT DOCUMENTS

EP           0 455 825 A1      11/1991

(Continued)

OTHER PUBLICATIONS

David Vis, "TraveLogix Launches On-Line Service," Travel Weekly, vol. 54, No. 6 Section 1, Monday, Jan. 23, 1995, pp. 57 and 60.

(Continued)

*Primary Examiner*—Frantzy Poinvil
(74) *Attorney, Agent, or Firm*—Alston & Bird LLP

(57) ABSTRACT

A client-server system for corporate travel planning, expense reporting and travel management that utilizes a corporate database server to enable accurate and timely pre-travel and post-travel decision making that is fed by a travel planning process and an expense reporting process, plus a SABRE data feed of all booked data and back office system data as well as a hand-off of exchange and void ticket information that comprises a Travel Planning module, a Travel Decision Maker module, and a Travel Expense Reporting module. The system uses a corporate database environment communicating with a real-time CRS data feed that enhances the Travel Planning module by offering the traveler live choices of air, car, and hotel availability based upon company travel policy as well as live access to current or company negotiated fares while also allowing the Travel Decision Maker module to make comparisons between booked information and actual current travel data.

71 Claims, 57 Drawing Sheets

U.S. PATENT DOCUMENTS

| | | | |
|---|---|---|---|
| 5,648,900 A | | 7/1997 | Bowen et al. |
| 5,832,454 A | | 11/1998 | Jafri et al. |
| 5,936,625 A | * | 8/1999 | Kahl et al. |
| 6,023,679 A | * | 2/2000 | Acebo et al. .................. 705/5 |

FOREIGN PATENT DOCUMENTS

| | | |
|---|---|---|
| EP | 0 660 251 A2 | 6/1995 |
| WO | WO 89/07798 | 8/1989 |
| WO | WO 92/15063 | 9/1992 |
| WO | WO 93/10502 | 5/1993 |
| WO | WO 97/08639 | 3/1997 |

OTHER PUBLICATIONS

Isae Wada, "Rosenbluth Int'l, AT&T to Unveil Cost-Tracking Tool for Clients," Travel Weekly, vol. 54, No. 59, Thursday, Jul. 27, 1995, p. 3.

Cheryl Rosen, "Amex Offers Software to Help Create a Travel Policy," Business Travel News, Sep. 4, 1995, Issue 325, p. 22.

Mary Ann McNulty, "Expense Data Product Deluge," Business Travel News, Jul. 17, 1995, Issue 321, pp. 1 and 52.

Mary Ann McNulty and Cheryl Rosen, "Carlson, Amex: T&E Automation Generation," Business Travel News, Jul. 17, 1995, Issue 321, pp. 1, 50, and 51.

"E-Mail, Electronic Ticket Delivery On The Rise," Corporate Travel, 1994 Black Book Issue, vol. IX, No. 11, p. 67 (month unavailable).

Mary Brisson, "EDS Pauses But Widens Sights," Business Travel News, Issue 299, Oct. 10, 1994, pp. 1, 8, and 42.

Jennifer Dorsey, "Carlson Wagonlit's Booking, Expense-Reporting Systems Bow," Travel Weekly, vol. 54, No. 60, Monday, Jul. 31, 1995, p. 33.

David Vis, "Worldview: On-Line Product Limited," Travel Weekly, vol. 53, No. 103, Thursday, Dec. 29, 1994.

Wendy Pickering, "TravelNet lets corporations tackle travel costs in-house," PC Week, Oct. 2, 1995.

Laura Del Rosso, "Software Firm Rolls Out Travel Management Product," Travel Weekly, Dec. 11, 1995.

Ed Leefeldt, "Plane Truth, Airline Reformer Kevin Mitchell Preaches That Frequent-Flier Miles Must Go," Your Guide to Money and Markets, Bloomberg Personal, The Dallas Morning News, Oct., 1994, pp. 4-9.

Jonathan Dahl, "Many Bypass the New Rules of the Road," The Wall Street Journal, Section B1, Thursday, Sep. 29, 1994.

Rik Fairlie, "Data System Being Sold Directly to Corporations," Travel Weekly, Oct. 4, 1993, pp. 53, 54, and 56.

Travel Information Management Newsletter, vol. 2, No. 2, Fall 1993.

Travel Information Management User Notes, "Version 1.5 Overview," Special Edition, Winter 1995.

AmadeusPro Sale, Functional Overview, Aug., 1995.

AmadeusPro Sale, "Train the Trainer" Course, Aug. 1995.

AmadeusPro Sale, Product Guide, Mar. 1994.

"Introducing AmadeusPro Sale," Aug. 1995.

AmadeusPro Sale 2.0 (OS/2 Version) Walkabout, Apr. 1995.

System One Workbook and User Guide, Sep. 1995.

"How To Use The Online Index For: ACCESS Product Guide," Sep. 1995.

Letter, Fantasia Information Network (NZ) Limited to Sydney Yap, Manager, Stars Travel International, Jun. 1995.

System One—Workbook block diagrams, Sep. 1995.

"Fantasia Plus Accounting" brochure, Jan. 1995.

TARMAQ The One Screen Solution brochure (undated).

Galileo letter dated Mar. 1992.

"How to make a killing!," Galileo Seminar Itinerary (undated).

"How to make a killing!" Galileo Subscribers Seminar brochure, Apr. 1992.

Southern Cross Distribution Systems Pty. Limited, Software License and Services Agreement, dated Apr. 16, 1993.

Galileo letter dated Jul. 29, 1994.

"Proposal for the Implementation of TravelTrack into Channel 10," Aug. 1, 1994.

Letter to Ken Birchall dated Oct. 11, 1994.

Travelsearch facsimile transmission dated Oct. 31, 1994.

"Traveltrak System" draft letter dated Oct. 31, 1994.

"Response to Tender for Channel 10" Memorandum, dated Nov. 11, 1994.

TravelTrack overview (undated).

TravelTrack and Network Ten Minutes of Meeting dated Jun. 16, 1995.

Proposal for the Implementation of TravelTrack into Sample Company, Jul. 1, 1995.

Network Ten Progress Schedule dated Jul. 27, 1995.

Network Ten letter dated Sep. 5, 1995.

TravelTrack Pre-Implementation Study dated Sep. 6, 1995.

TravelTrack letter dated Sep. 11, 1995.

Procedures for setting up a new TravelTrack site document dated Sep. 20, 1995.

Travelsearch Facsimile Transmission dated Sep. 24, 1995.

TravelTrack User Guide dated Mar. 1998.

TravelTrack Sample Reports Version 3.0 (undated).

TravelTrack letter dated Jul. 20, 1994.

Galileo letter dated Nov. 16, 1994.

Galileo letter dated Nov. 18, 1994, enclosing "TravelTrack Technical Overview" (undated).

Travelsearch facsimile transmission dated Dec. 5, 1994.

Notes on meeting with Channel 10 & Qantas dated Dec. 5, 1994.

Traveltrak letter dated Dec. 5, 1994.

Network Ten/Qantas Minutes of Meeting dated Dec. 9, 1994.

TravelTrack Implementation Plan for Network Ten Limited dated Dec. 8, 1994.

Network Ten Limited letter dated Dec. 20, 1994.

Network Ten Meeting Agenda dated Feb. 3, 1995.

Network Ten Minutes of Travel Meeting dated Feb. 21, 1995.

Minutes of Travel Meeting dated Feb. 6, 1995.

Network Ten facsimile transmission dated Feb. 28, 1995, enclosing Traveltrack flow charts.

TravelTrack letter dated Apr. 18, 1995.

TravelTrack letter dated Apr. 19, 1995.

Travel Track Memorandum (undated).

Patent Abstracts of Japan, vol. 1995, No. 04, May 31, 1995 (JP 07 021283 A).

European Search Report dated Sep. 19, 2003.

David J. Wardell, *Software-Based Travel Decisions*, 1988.

David J. Wardell, *Travel Auditing Software*, 1989.

Mary Brisson, *Sun Will Shine Thru Windows*, Business Travel News, Jul. 6, 1992.

Paul Steven Alexander, *Statutory Declaration, In the Matter of Australian Patent No. 720671 in the name of Sabre, Inc.—and—In the Matter of opposition to grant by Amadeus Global Travel Distribution SA*, Dec. 6, 2001.

Peter Watson, *Statutory Declaration, In the Matter of Australian Patent No. 720671 in the name of Sabre, Inc.—and—In the Matter of opposition to grant by Amadeus Global Travel Distribution SA*, Aug. 14, 2003.

Mary Brisson, "'Agentless' Means 'Costs Less' ", Business Travel News, p. 14, Aug. 8, 1994, Dialog file 16, Accession No. 03503684.*

Paul Steven Alexander, Statutory Declaration, In the Matter of Australian Patent No. 720671 in the name of Sabre, Inc. — and —In the Matter of opposition to grant by Amadeus Global Travel Distribution SA, Dec. 6, 2001.

* cited by examiner

Travel Itinerary for James P. Kelvin

Please verify the reservation information in the Trip Itinerary below:

James P. Kelvin
ACME Products, Inc.
123 Elm, Suite 123
Irving, TX 75038
214-555-6100 Ext. 345

This reservation has been guaranteed with your Corporate Credit Card number. Your airline ticket will be issued and delivered by 12:00PM, September 10, by ABC Travel. If you have any questions contact ABC Travel at 1-800-555-5678.

| | | |
|---|---|---|
| Airfare: | $499.00 | Round-trip |
| Car: | $109.94* | 2 days |
| Hotel: | $109.00* | 1 night |

Total Trip Cost: $717.94

*Price estimates determined by nightly or daily rate times the number of nights or days. Price does not include taxes, fees or other incidentals.

Airfare Details: This is a Restricted Air Fare. Penalties may apply to charges or cancellation.

Reserved: American Airlines Flight 2220 Coach Class

Reserved:
American 22
Depart:DFW 7
July 6, 199
Arrive:ORD 9
July 6, 199

Reserved:
Budget Rent&
ORD Airport
Pick-up: 9:10/
July 6, 1995
Drop-off: 5:00
July 7, 1995
2 days $109

Reserved:
Holiday Inn
Mart Plaza
Chicago, Il
Check-In: 5:0
July 6, 199

Expense Date Range for James P. Kelvin — 458

Enter Expense Report Header information below.

| | |
|---|---|
| Purpose Trip/Expense: | New product discussion-Chicago |
| Start Date: | 08/11/95 |
| End Date: | 08/14/95 |
| Default Project: | CC000 |

[OK] — 460   [Cancel]

Business Entertainment Detail

Entertainment Detail

Start Date: 08/11/95     Purpose of Entertainment: Lunch discussion
Stop Date: 08/14/95      Place: Palmer House-Hilton    Topic: New product design
                         Receipt Total: $63.07    Currency: USD-US Dollar
                         ☐ Value Added Tax

| Name | Amount | Tax | Company | Affiliation |
|---|---|---|---|---|
| Susan Clark | $59.00 | $4.07 | Sanderson Plastics, Inc. | V.P. Marketing |
| Roger Sanderson, Jr. | | | Sanderson Plastics, Inc. | President |

| Date | Amount | Type | Ent. Type | Description |
|---|---|---|---|---|
| 8/11/95 | $63.07 | Reimbursable | Meal | |

Sales Tax:        $0.00    Company Paid:      $0.00
Total Amount:     $63.07   Non-reimbursable:  $0.00
Amount in USD:    $63.07   Reimbursable:      $63.07

[Repeat Row] [Remove Row]
[OK] ← 486  [Cancel]

| Calculate Totals | | |
|---|---|---|
| ⦿ By Date   ○ By Type | | |
| Date | Amount | |
| 06/13/99 | $957.73 | |
| 06/18/99 | $2233.13 | |

Employee #:    5051232
Charge Ctr #:  SE-4303
Phone #:       817-555-1414 x34494

Payment Instructions
⦿ Mail Check   ○ Auto Deposit

Send Check To:
Attn: James P. Kelvin
2245 W. Maple St

Irving                    TX
USA                      75744

Expense Report Total:              $0.00
Less Travel Advance:      [ $0.00 ]
Less Non-reimbursable:             $0.00
Less Company Paid:                 $432.00

Net Due Company:                    
Net Due Employee:                  $358.87

[Check Policy] — 442   [Save]   [Submit for Approval]   [Cancel]

Fig. 16I

Expense Report for James P. Kelvin

Employee #: 5051232  From: 08/11/95  Through: 08/14/95  Exp. Rpt. #:

| Date | Expense Type | City | Amount | Exp. Alloc | Amt Type | Receipt Alloc | Apprv Status |
|------|-------------|------|--------|------------|----------|---------------|--------------|
| 8/11/95 | Air | DFW-Dallas/Ft. Worth | $432.00 | | C | | |
| 8/11/95 | Car | ORD-Chicago O'Hare | $43.52 | | R | | |
| 8/11/95 | Hotel | ORD-Chicago O'Hare | $109.40 | | R | | |
| 8/11/95 | Meal | ORD-Chicago O'Hare | $60.00 | | R | | |
| 8/11/95 | Entertain | ORD-Chicago O'Hare | $63.87 | | R | | |

Expense Report Total: $790.07

[Enter Detail...] [Allocate Expense...] [Calculate Totals...] [Remove Row] [Save] [Cancel]

Fig. 16L

SYSTEM FOR CORPORATE TRAVELER PLANNING AND TRAVEL MANAGEMENT

This is a continuation of application Ser. No. 08/524,381, filed Sep. 6, 1995 now abandoned.

TECHNICAL FIELD OF THE INVENTION

This invention relates in general to a travel and transportation information system, and in particular to, a client-server system that communicates with an airline Computerized Reservation System and places travel information directly in the hands of the corporate traveler.

BACKGROUND OF THE INVENTION

Historically, corporate travel has often escaped the close scrutiny by management that was used for every other function of the corporation. Travel dollars were seen as a necessary evil and were spent until the corporate balance sheet showed more problem than promise. Recently, corporations have aggressively examined every process and paradigm to re-engineer and transform themselves into a lean and highly-productive corporate machine that can support success and growth. As a result, travel dollars became one of the first expenses tightly controlled or cut.

Given that approximately $130 billion were spent on travel in 1994, Corporate Travel Managers are examining and implementing a variety of solutions to manage costs and change the aura that typically surrounds corporate travel expenses. For example, corporations have consolidated travel management in credit card services, published corporate travel policies, and mandated the use of preferred travel providers.

Corporate policies, however, that force a frequent traveler to sit through a two hour connection or stay in a less than mid-line hotel off the beaten path have driven the typical frequent traveler to come up with creative ways to circumvent the travel policy in order to meet their own personal requirements. Frequent travelers are bypassing policy at every turn to maintain their productivity and to take advantage of any perks that compensate them for long hours away from home. This scenario compounds the already huge information deficit Corporate Travel Managers are struggling to resolve including travelers' circumvention of corporate policy, which results in travel data being totally lost.

From a corporate standpoint, travel has an impact on the traveler, the Corporate Travel Manager, the Department Manager, Accounts Payable and the Corporation itself. The traveler seeks an easy and fast way to arrange travel. Under conventional methods however, the traveler must arrange trips through a series of telephone conversations with a travel management firm or agency. In addition, the traveler seeks an automated expense reporting system. Present methods which combine manual and automated forms may require repetitive data input of previously requested travel information for report presentation. In addition, the approval and reimbursement of expenses is typically manual.

The Corporate Travel Manager needs a true summary of the total corporate travel expenses by category. Presently, the Corporate Travel Manager may estimate travel expenses and category breakdowns based upon report information from Travel Management Firms, corporate credit card companies, or preferred vendors. These estimates may be inaccurate, however, if the traveler made on-the-road trip changes, did not comply with usage of corporate travel agencies or credit card, or stayed in a hotel that is not the same as the one which was booked. Corporate Travel Managers must also stay informed as to the status of preferred vendor agreements. Historically, summaries of the corporation's actual market share performance was provided by travel management firms or the preferred vendor. These summaries, however, were typically not provided on a timely basis, provided minimal information on a pre-travel basis, and provided no method for self-validation of performance.

Department managers need pre-travel reporting of travel expenses and possible violations of travel policy. Presently, random manual notification of policy violations is provided by travel management firms to the Corporate Travel Manager. Typically, this notification is insufficient or not timely enough to allow Department Managers to enforce corporate policy on a pre-travel basis. Department Managers also desire an automated expense reporting system. Current methods require manual processing of approval and reimbursements of expenses by Department Managers.

Accounts Payable desires an automated processing system for expense reports. Current methods require manual auditing, posting, and payments of expense reports.

Many of the limitations on the current corporate travel planning and management systems stem from the corporate traveler's dependence on travel management firms. Travel management firms currently function as the central hub for all travel service and information regarding travel for the corporate traveler. There is a total reliance on the travel management firm by the travelers for trip planning and management as well as by the Corporate Travel Managers for summary reporting.

Therefore, a need has arisen for a corporate travel planning and management system which operates on a corporate database environment that allows automated travel planning from a corporate traveler's desktop, pre-travel decision support to inform a corporation of planned travel expenditures before corporate dollars are spent, and automated expense reporting.

The present invention comprises a client-server system for corporate travel planning and management which operates on a corporate database environment, comprising desktop LAN software as well as a Travel Planning module and a Travel Expense Reporting module, which together provide solutions for two of the manual and most costly areas of corporate business travel management. The two modules may coexist as fully-functional, stand-alone modules or be integrated into a Travel Decision Maker module creating a comprehensive travel management system.

The Travel Planning module of the present invention provides the corporate traveler with a desktop system that provides a graphical user interface to real-time Computerized Reservation Service (CRS) Data for efficient travel planning and booking. The system targets two of the most prevalent types of corporate trips, the simple 2–4 segment trips that include air, car, and hotel accommodations as well as the common or repeat trip, estimated at 40%–70% of all corporate travel.

The Travel Planning module interacts with locally stored traveler and corporate profiles in a relational database that function as filters against real-time CRS Data output to ensure the appropriate corporate vendor preferences are displayed to and booked by the corporate traveler. The present invention enables the traveler to complete the entire booking process, which results in the creation of a Personal Name Record (PNR), or to create a PNR with a booking request which a travel agency completes.

The Travel Expense Reporting module of the present invention provides to the traveler's desktop a system that automates the preparation of travel expense reports. The system also automates the routing of expense report to assure appropriate authorization, accurate expense reimbursement and timely posting of expense totals to a corporation's general ledger.

In addition, the present invention provides automated summary reporting of the actual costs of corporate travel. The reporting is enabled by the relational database, which resides in the corporate environment, that tracks all data from the expense report process and provides comparisons to yearly vendor market share contracts and budgets. A number of automated reports are provided to both the Corporate Travel Manager and Department-level Managers to enable timely and proactive management of corporate resources.

The Travel Decision Maker module of the present invention incorporates information that results from the Trip Planning and Expense Reporting modules to enable comprehensive pre-travel and post-travel reporting for Corporate Travel Managers and Department Managers. The Pre-travel and post-travel information that feeds the Travel Decision Makers module is integrated into a relational database via the travel planning and expense reporting processes.

BRIEF DESCRIPTION OF THE DRAWINGS

For a more complete understanding of the present invention, including its features and advantages, reference is now made to the detailed description, taken in conjunction with the accompanying drawings of which.

DETAILED DESCRIPTION OF THE INVENTION

Figure 1:
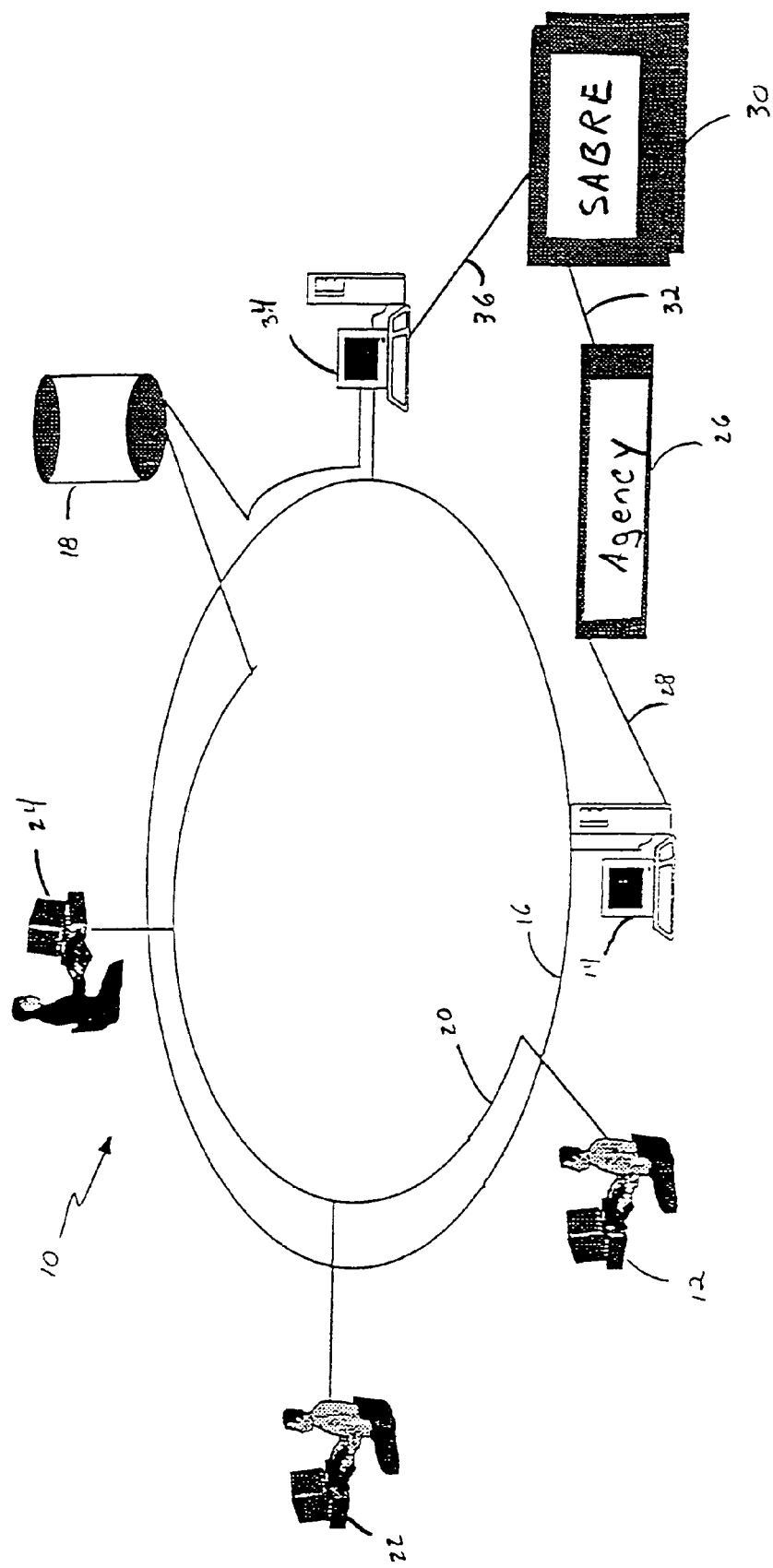
FIG. 1 is a simplified diagram of the platform of the present invention as it may look in a corporation.

The client-server system of the present invention for corporate travel planning and management 10 is shown in simplified platform diagram form in FIG. 1. The client interface of the present invention may be deployed on any conventional personal computer or client workstation 12, running a suitable operating system such as Windows, OS\2, or MacIntosh. The client workstation 12 is in communication with an E-mail server 14 via a conventional network connection 16. The E-mail system may operate any standard E-mail protocol such as VIM or MAPI. The client workstation 12 is in communication with a corporate database server 18 via network connection 20. The corporate database server 18 may operate any open relational database environment such as Oracle or Sybase. The corporate database server 18 may be a pentium (NT), or Unix having 32–64 MB of memory.

A department manager workstation 22 is in communication with the E-mail server 14 the via network connection 16 and the corporate database server 18 via the network connection 20. The department manager workstation 22 may be any conventional personal computer with a suitable operating system as specified above. The travel manager workstation 24 is in communication with the E-mail server 14 via network connection 16 and in communication with the corporate database server 18 via the network connection 20. The travel manager workstation 24 may be a conventional 486 personal computer having 16 MB RAM of memory.

The E-mail server 14 is in communication with any conventional travel agency 26 via a telecommunication link 28. The telecommunication link 28 preferably consists of high speed modems and telephone lines or the equivalent thereof. The travel agency 26 is in communication with any airline computerized reservation system such as American Airlines' SABRE Computerized Reservation System 30 via a telecommunication link 32. The corporate database server 18 communicates with the gateway 34 using a TCP\IP sockets interface, which is the industry standard cross-platform interprocess communication protocol. The gateway 34 will provide a Generalized Data Stream (GDS) style request and reply interface with the CRS 30 via telecommunication link 36.

Figure 2:
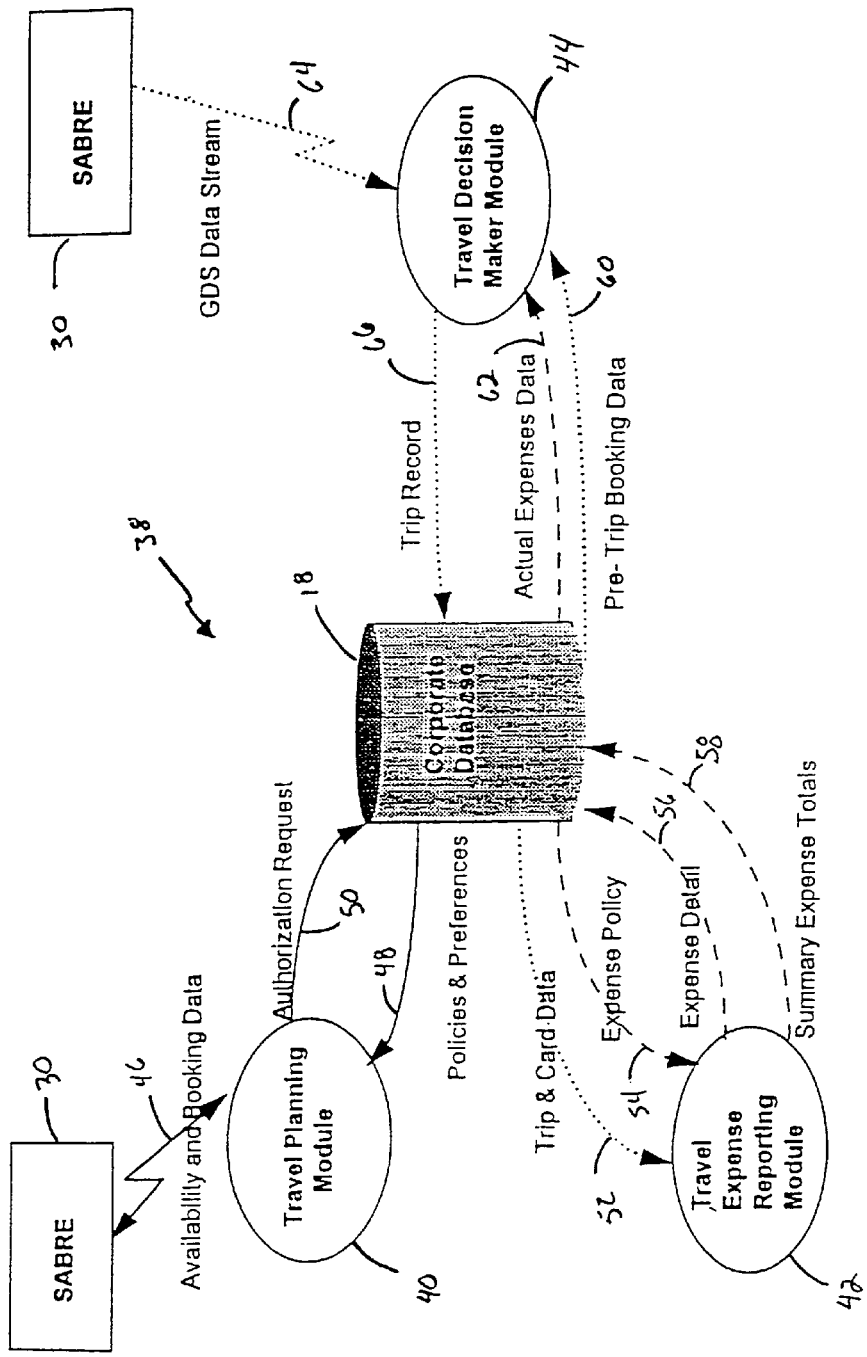
FIG. 2 is a simplified block diagram of the modules of the present invention.

A simplified block diagram of the corporate travel planning and management system generally designated 38 is represented in FIG. 2. The corporate centric client-server system 38 comprises Travel Planning module 40, Travel Expense Reporting module 42, and Travel Decision Maker module 44. From the client workstation 12, the Travel Planning module 40 receives and sends availability, fare and booking data 46 from the CRS 30. The Travel Planning module 40 receives policies and preferences data 48 from the corporate database 18 and sends authorization request data 50 to the corporate database 18. The Travel Expense Reporting module 42 receives trip and card data 52 and expense policy data 54 from the corporate database 18. The Travel Expense Reporting module 42 sends expense detail data 56 and summary expense totals 58 to the corporate database 18. The Travel Decision Maker module 44 receives pre-trip booking data 60 and actual expenses data 62 from the corporate database 18. The Travel Decision Maker module 44 receives GDS data 64 from the CRS 30. The Travel Decision Maker module 44 sends trip record data 66 to the corporate database 18.

Figure 3:
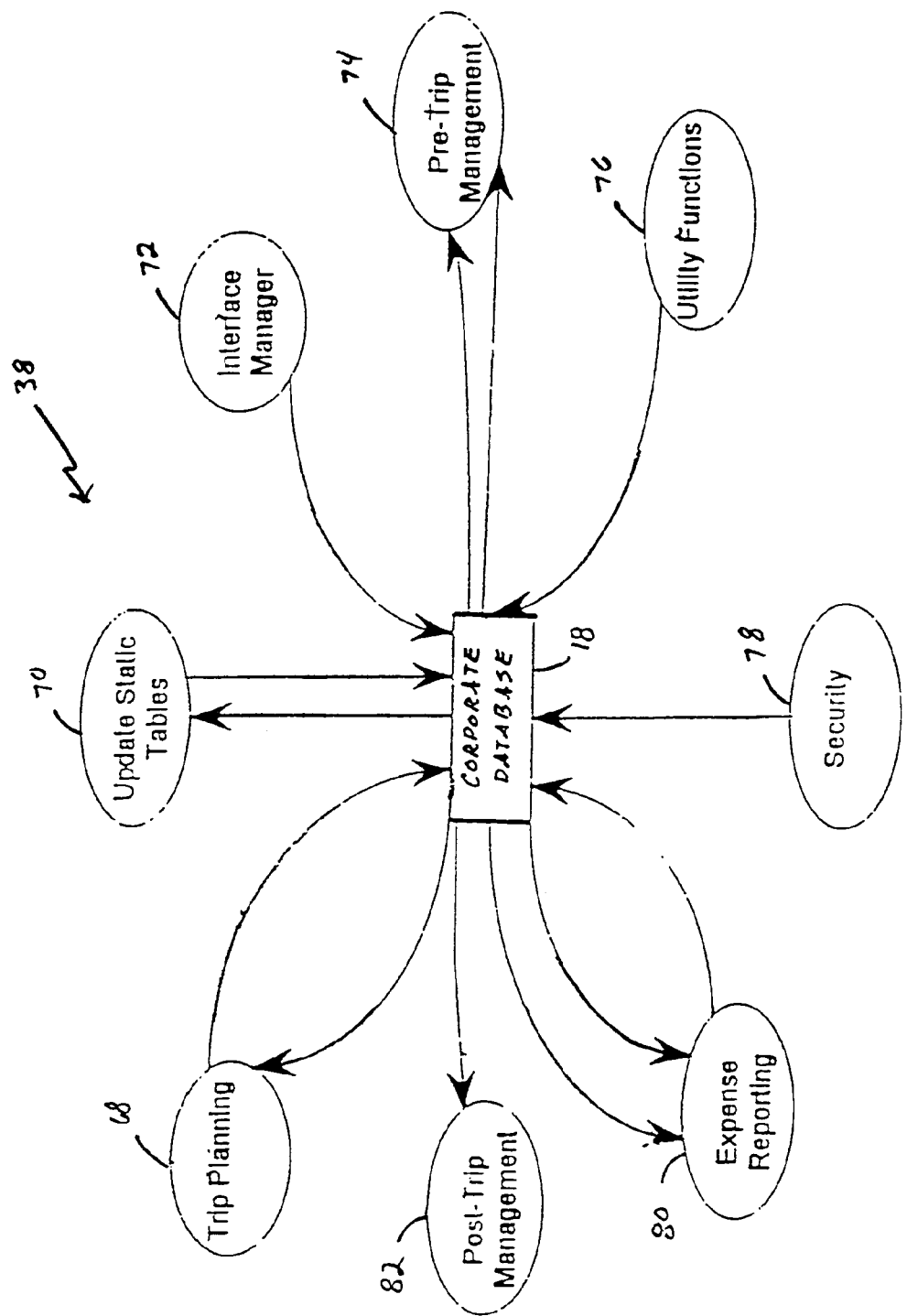
FIG. 3 is a simplified block diagram of the system of the present invention.

A Simplified block diagram of the functional elements of the corporate centric client-server system 38 is depicted in FIG. 3. The functional elements comprise trip planning 68, update static tables 70, interface manager 72, pre-trip management 74, utility functions 76, security 78, expense reporting 80, and post-trip management 82.

Figure 4:
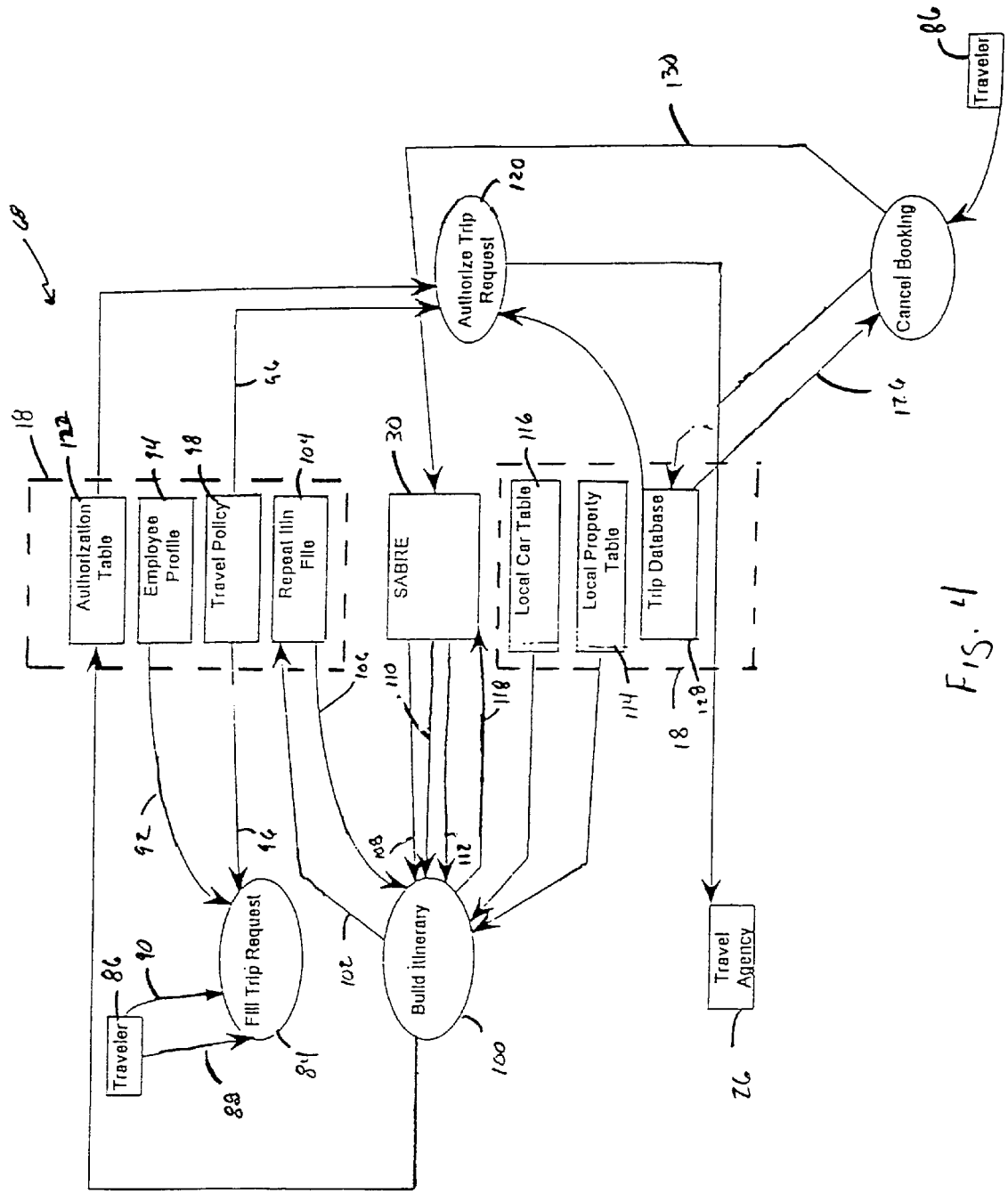
FIG. 4 is more detailed block diagrams of the trip planning system of FIG. 3.

Turning now to FIG. 4, the trip planning 68 of FIG. 3 is described in greater detail. The first step in trip planning 68 is a trip request process 84. Entry into the trip request process 84 can be done by either the corporate traveler 86 or by a corporate travel arranger (not pictured). The trip request process 84 may also be backfilled through a CRS PNR download if the trip originated with a telephone request. The Corporate traveler 86 must enter an employee number 88 and the trip parameters 90 during the trip request process 84. After the trip request process 84 has been initiated, the employee record data 92 is retrieved from the employee profile database 94 located in the corporate database 18. The corporate travel policy data 96 from the corporate travel policy database 98 located in the corporate database 18 is also downloaded during the trip request process 84. The employee profile database 94 includes information such as seat preferences, special meals, frequent flier, account numbers, hotels, car rental, connecting flights, and airline equipment preferences.

The next step in trip planning 68 is the build itinerary process 100. The build itinerary process 100 allows the traveler 86 to enter basic trip parameters and either request a booking or make a booking with direct access to CRS 30 availability and fare information or allows the traveler 86 to pull up saved, repeat itinerary data 102 from the repeat intinerary file database 104 and provide a new departure date and autofilled trip parameters for use in an availability display. For routine trips, the traveler 86 may fill the trip parameters section from stored repeat itinerary data 106 and subsequently add, modify or delete segments for the itinerary of a specific trip.

For standard or non-routine trips, the build intinerary process 100 allows the traveler 86 to enter basic trip parameters such as departure date, time and city, arrival date, time and city, and hotel and car requirements. The traveler 86 will input in a batch all the travel requirements (air, hotel, car) grouped by segment. The build itinerary process 100 via communication with CRS 30 displays flight availability data 108, fare data 110 and highlights preferred vendor data from the corporate travel policy 112. The traveler 86 is able to make only one selection from the availability data 108 for each segment. The traveler 86 can change selection if desired using the display window. As selections are made, an in-process itinerary will be built and displayed to the traveler 86 showing information as it is selected or adding to what has been previously selected. The in-process itinerary will display the associated cost of each item as well as a running total of the entire trip, including air, hotel, car and a grand total.

From the availability data 108, the traveler 86 may request a list of preferred hotels in the destination city. The display will highlight which hotels can be booked via CRS 30 access and also those that would need to be contacted directly. The traveler 86 can request availability at one or more of the preferred hotels. The build itinerary process 100 also allows display of preferred chains as well as preferred hotels specified to a city location which are stored in the local property table 114.

The traveler 86 may request a list of preferred rental car vendors through CRS 30. Special negotiated rates for a vendor in a specific city stored in local car table 116, when present, will override the data returned from CRS 30. The build intinerary process 100 returns a queued PNR 118 including air, hotel and car requirements to CRS 30.

The trip planning process 68 further comprises the authorized trip request process 120. The authorized trip request process 120 provides for the routing of the trip request form to the appropriate authorizer (not pictured) and provides the authorization utility. Once authorized, the traveler 86 is notified of the authorization electronically. Actual routing of the trip request form is determined in the authorization table 122 and the travel policy table 98. The routing may be to a specific person or a specific manager position. The trip request form is electronically signed for the traveler 86 before it is routed for approval. The approver is able to review a version of the trip request form that allows the approver to view the completed itinerary, the cost, the purpose for the trip and the remarks fields. The approver is also able to review the traveler's 86 request for a travel cash advance.

If the approver does not approve the request, the authorized trip request process 120 requires that the approver input a description of the reason for disapproval. The trip request is then routed back to the originator of the request. If the originator was a travel arranger, a copy of the disapproval will be sent to the traveler 86. If the approver does approve the request, it is routed to the next processing step, for example, travel agency 26. The trip request form is electronically signed for the approver whether the request is approved or disapproved.

Another feature of the trip planning 68 is the cancel booking process 124 which allows the traveler 86 a quick means of cancelling a booked trip from the client workstation 12. The cancelled booking process 124 displays an abbreviated list of all booked trip records whose departure date is equal to or greater than today's system date. The traveler 86 receives stored trip data 126 from the trip table 128 and may select a stored trip to cancel from the list. Once a cancelled trip button is activated on the screen, the traveler 86 may send cancellation data 130 to the CRS 30. A response from the CRS 30 will be displayed back to the traveler 86 confirming the cancellation is complete.

Figure 5:
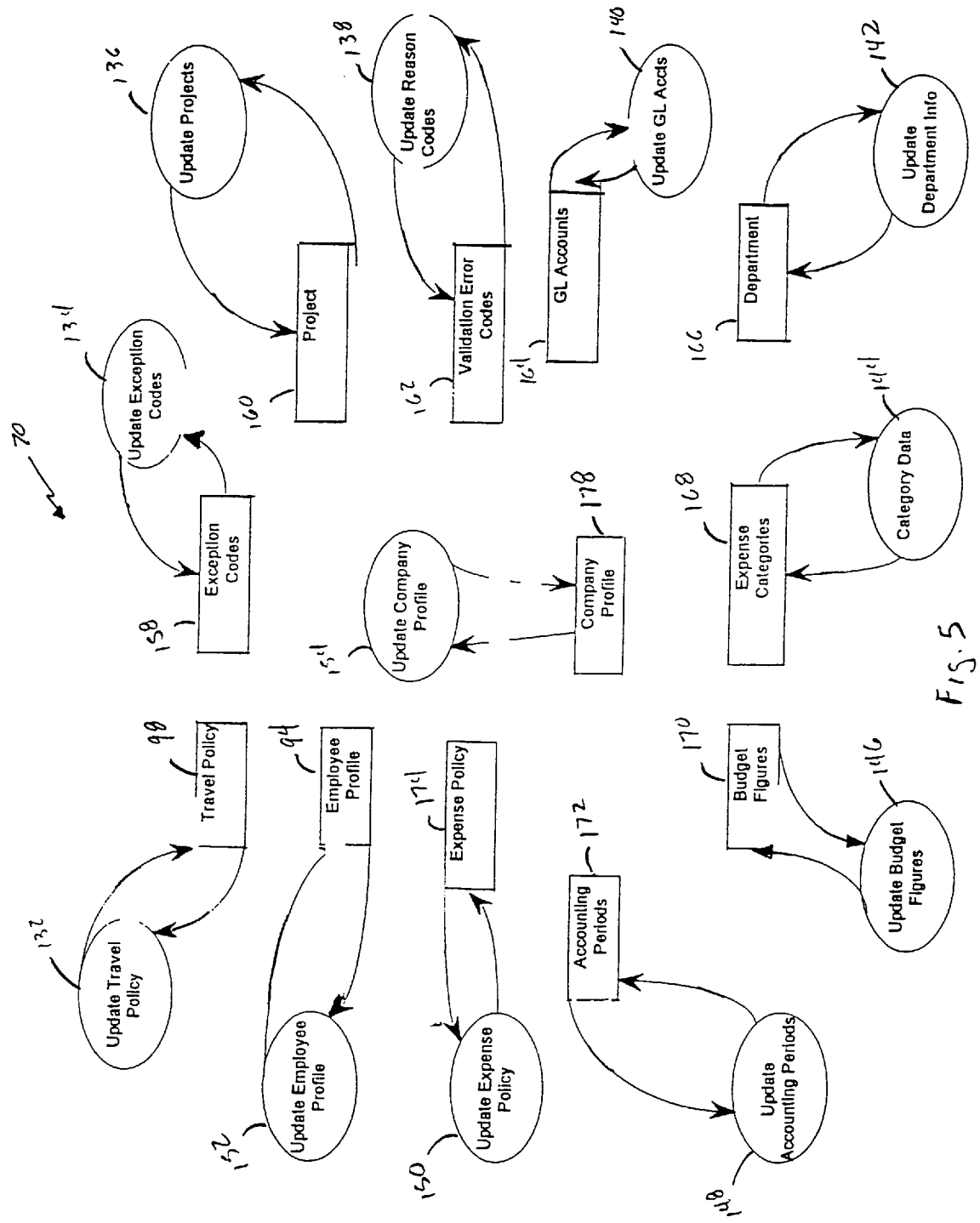
FIG. 5 is more detailed block diagrams of the update static tables system of FIG. 3.

Now referring to FIG. 5, a block diagram representing the update static tables process 70 of FIG. 3 is presented. All of the corporation's static tables are presumably part of the corporate centric client-server system 38 implementation process. Each corporation defines the static tables in order to start using the corporate centric client-server system 38. Typically, a system administrator inputs the update travel policy data 132, the update exception codes data 134, the update projects data 136, the update reason codes data 138, the update GL accounts data 140, the update department information data 142, the update category data 144, the update budget figures data 146, the update accounting periods data 148, the update expense policy data 150, the update employment profile data 152, the update company profile data 154, the travel policy table 98, the exception codes table 158, the project table 160, the validation error codes table 162, the GL accounts table 164, the department table 166, the expense categories table 168, the budget figures table 170, the accounting period table 172, the expense policy table 174, the employee profile table 94, and the company profile table 178, each of which are part of the larger corporate database 18. All static tables 70 have the ability to add new records, update existing records, and delete unused records.

Figure 6:
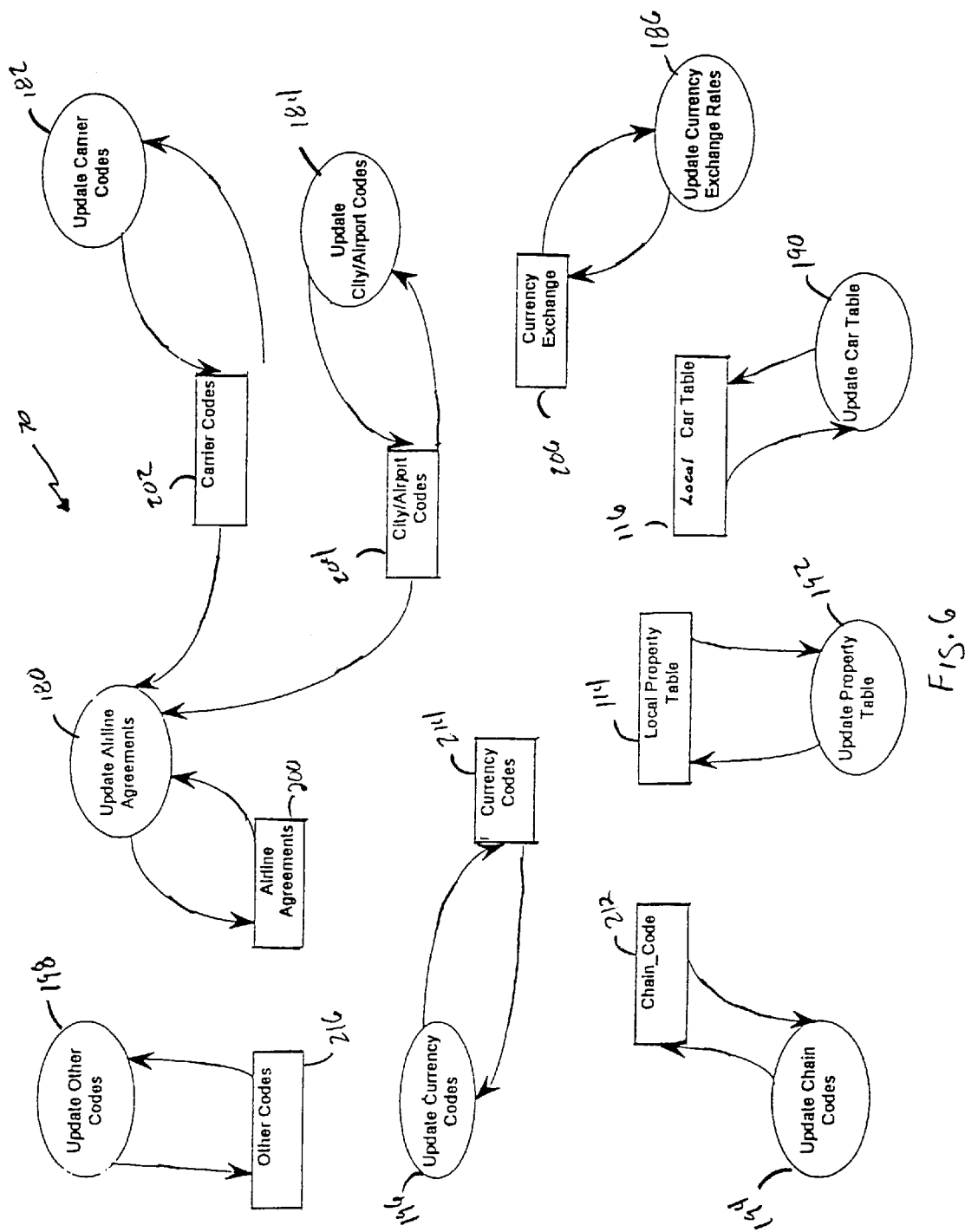
FIG. 6 is more detailed block diagrams of the update static tables system of FIG. 3.

Now referring to FIG. 6, the system administrator may update the static table 70 by inputting the update airline agreements data 180, the update carrier codes data 182, the update city/airport codes data 184, the update currency exchange rates data 186, the update car table data 190, the update property table data 192, the update chain codes data 194, the update currency codes data 196, and the update other codes data 198, respectively updating the airline agreements table 200, the carrier codes table 202, the city/airport codes table 204, the currency exchange table 206, the local car table table 116, the local property table 114, the chain code table 212, the currency code table 214, and the other codes table 216, each of which are part of the corporate database 18.

Figure 7:
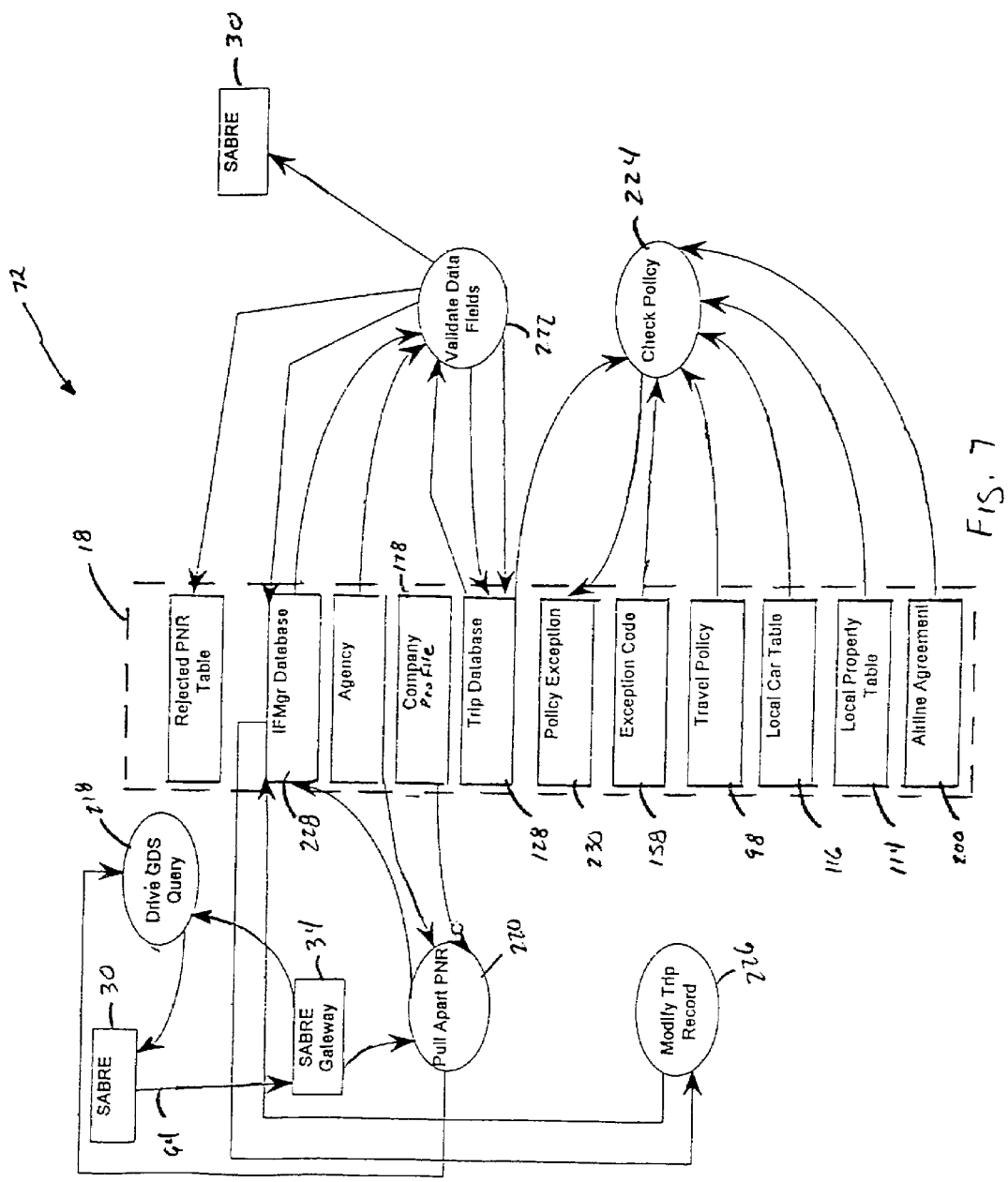
FIG. 7 is more detailed block diagrams of the interface manager system of FIG. 3.

Referring now to FIG. 7, a block diagram detailing the interface manager 72 of FIG. 3 is depicted. The interface manager 72 involves processing CRS 30 data which consists of five distinct processes: the drive GDS query process 218, the pull apart PNR process 220, the validate data fields process 222, the check policy process 224, and the modify trip record process 226. The drive GDS query process 218 resides on the CRS Supersaver 34 and serves to retrieve the GDS data 64 for each PNR. After the GDS data 64 is retrieved, the GDS data 64 is forwarded to the corporate database 18 where the parsing of the stream is performed and the trip is inserted into the interface manager table 228.

The pull-apart PNR process 220 reads GDS data 64 and maps the CRS elements to the interface manager table 228.

The validate data fields process 222 ensures the integrity of the data being inserted into the trip table 128. An incomplete PNR or a PNR containing a value that cannot be found in the static tables 70 will be rejected by the validate datafields process 222 and the queued for reprocessing through CRS 30. The PNR's which pass the validation data fields process 222 are assigned a unique trip number that does not already exist in the trip table 128 and such valid trips are inserted into the trip table 128.

The check policy process 224 has a heirachical order of application, for example, project policy takes precedence over employee policy and a negotiated hotel rate takes precedence over a company-preferred vendor. In the check policy process 224, each policy violation is flagged and the violation is assigned a code type based upon the nature of the violation. Depending upon how the violation is set up in the policy record, the violation will either simply be an item on a report, or it may be queued to an individual specified in the employee or project record for approval or rejection. The status of the violation is stored within the policy exception table 230. Data from trip table 128 is compared against data from the travel policy table 98, the local car table table 116, the local property table 114, and the airline agreement table 200. If the check policy process 224 finds any violations, a code from the exception code table 158 is applied and then stored in the policy exceptions table 230.

The modify trip record process 226 allows the traveler 86 to maintain non-purged PNR's in the interface manager table 228. Maintenance may occur at two levels, a high-level delete of detail older than a specified date, or a modification utility which allows fixes to fields such as project I.D. which, once repaired, will enable the PNR to populate the trip table 128.

Figure 8:
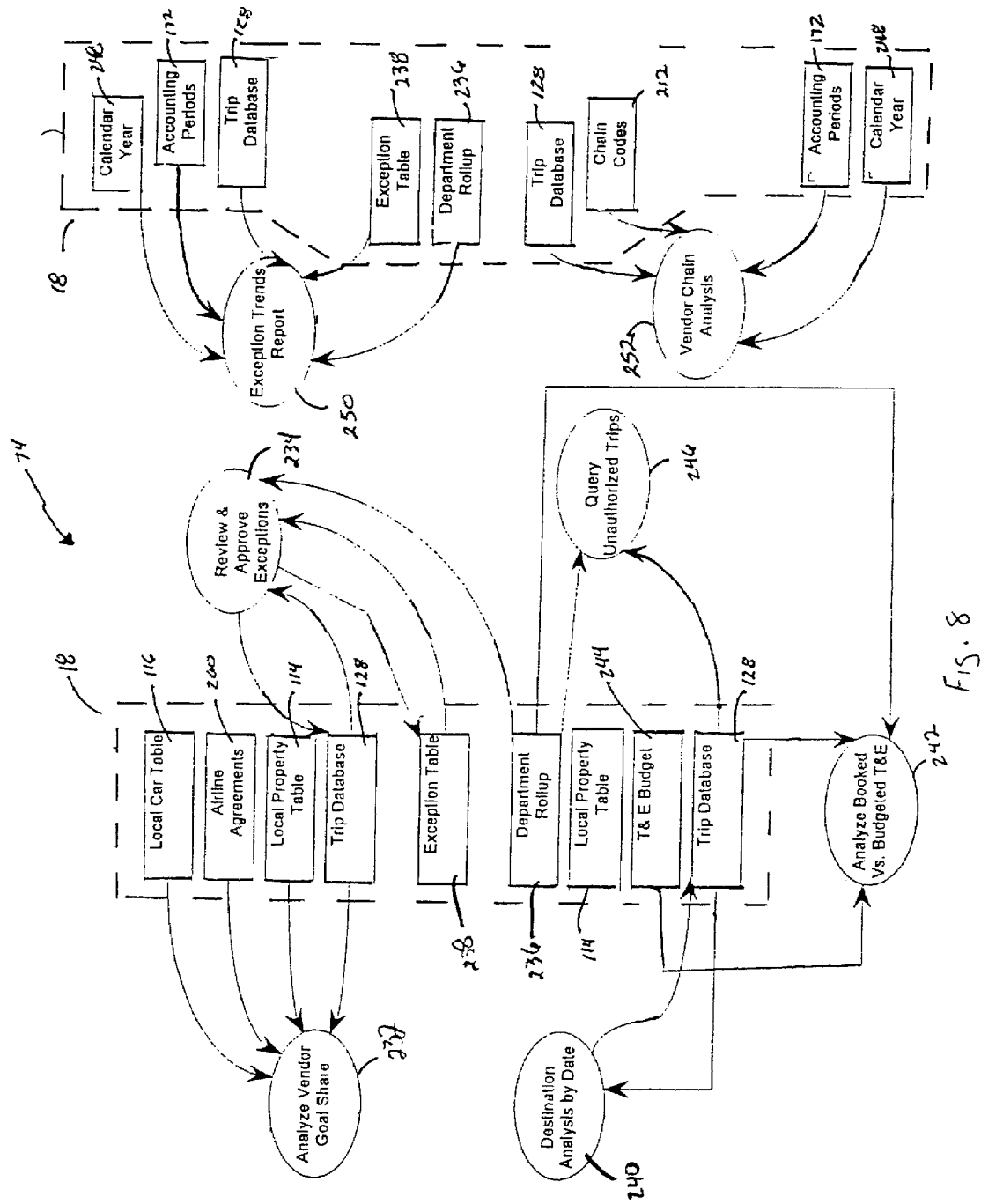
FIG. 8 is more detailed block diagrams of the pre-trip management system of FIG. 3.

Now referring to FIG. 8, a detailed block diagram of the pre-trip management 74 of FIG. 3 is pictured. The analyze vendor goal share process 232 imports data from the local car table 116, the airline agreements table 200, the local property table 114, and the trip table 128. The analyze vendor goal share process 232 analyzes each preferred airline vendor on a specified city pair and divides the number of segments booked on that airline by the total number of segments booked and compares the obtained percentage with the share agreement for that airline.

The review and approve exceptions process 234 imports data from the trip table 128, the exception table table 238, and the department roll-up table 236 and creates exception reporting for the overall corporation, an overall cost center, an individual, trend analysis, year-to-date totals, and chronic policy violators.

The destination analysis by date process 240 uses data from the trip table 128 and reports to the corporate travel manager all destination cities where multiple travelers 86 will be traveling on a given date or date range for the purpose of managing opportunities for obtaining zone fares or discounted group hotel rates.

The analyze booked versus budgeted travel and entertainment expense process 242 imports data from the trip table 128 and travel and expense budget table 244 to show projected cost of booked trips, a comparison between booked and budgeted expenses, and a trend analysis for forecasting if the travel budget will be met based upon trends.

The query unauthorized trips process 246 imports data from the department roll-up table 236 and trip table 128 to provide department managers or corporate travel managers information regarding unauthorized trips that require either authorization or cancellation. Department managers or Corporate Travel Managers may either cancel or authorize trips and electronic notification of cancelled trips will be sent to the traveler 86.

The exception trends report process 250 imports data from the department roll-up table 236, the exception table 238, the trip table 128, the accounting periods table 172, and the calendar year table 248. The exception trends report process 250 provides a trend analysis of travel policy exceptions for a defined time frame. Both written and graphical reports show trends of exceptions by individual, by type, and by department as well as the known costs of those exceptions.

The vendor chain analysis process 252 imports data from the trip table 128, the chain codes table 212, the accounting periods table 172 and the calendar year table 248 and provides an analysis of the booked plus actual activity for a specific date range for a given hotel or car chain. The output includes a total transaction count for number of room/nights or car/days plus a summary of the dollar value of each transaction as well as an average room/car nights per booking and average daily rates.

Figure 9:
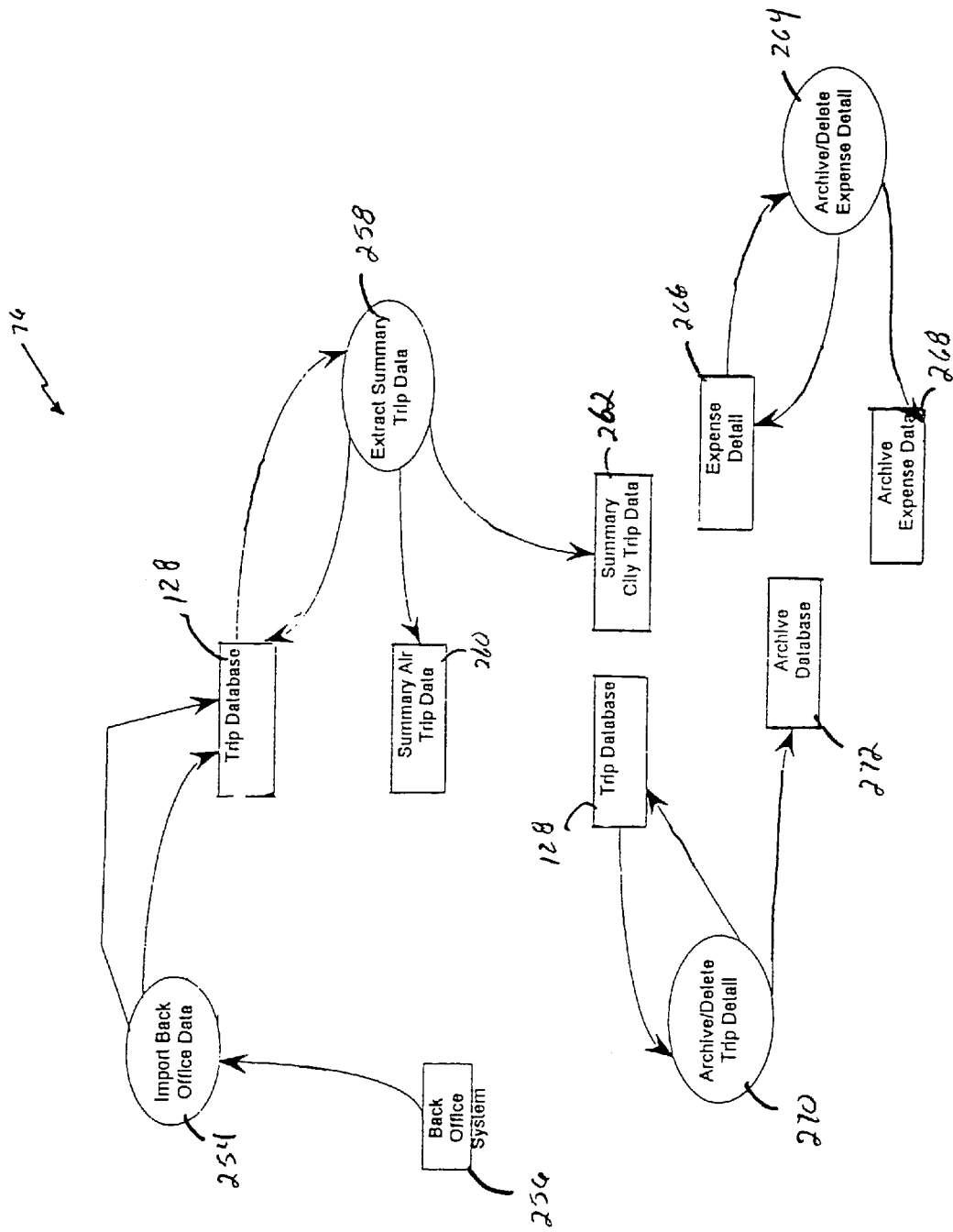
FIG. 9 is more detailed block diagrams of the utilities function system of FIG. 3.

Now referring to FIG. 9, a detailed block diagram of the utility functions 76 of FIG. 3 is depicted. The import back office data process 254 creates an electronic handoff of data from agency back office system 256 such as ADS or TravelBase, at a defined frequency. The import back office data process 254 is a means by which agency invoice numbers associated with tickets, refunds or exchanges are obtained by the corporate database 18.

The extract summary trip data process 258 provides nightly updates to the trip table 128 and provides data to the summary air trip table 260 and summary city trip table 262.

The archive/delete expense detail process 264 allows input of date parameters such that select expense detailed records that match date parameters are purged from the expense detail table 266 and placed in the archive expense table 268.

The archive/delete trip detailed process 270 allows input of the date parameters such that select trip records that match date parameters are purged from the trio table 128 and placed in the archive table 272.

Figure 10:
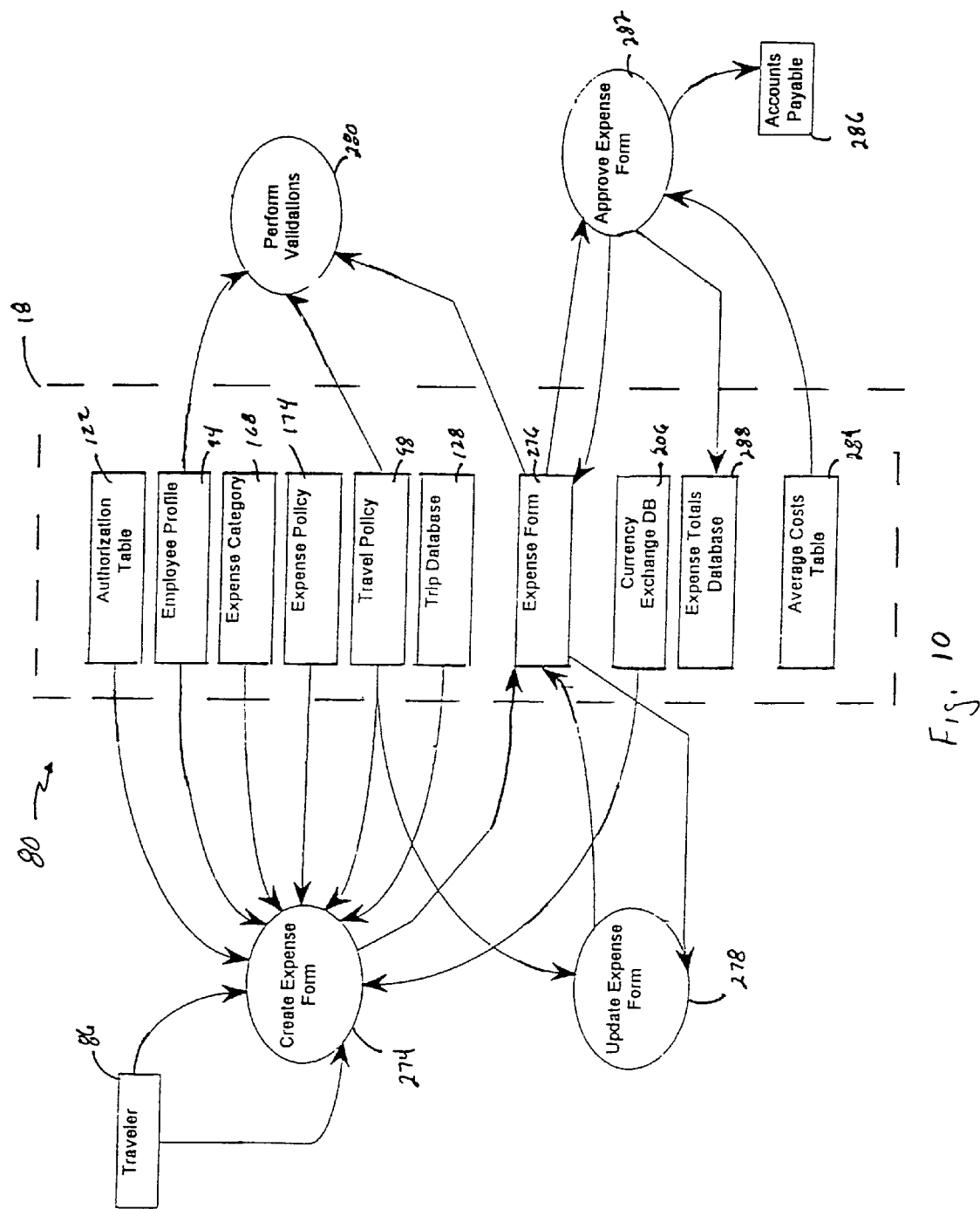
FIG. 10 is more detailed block diagrams of the expense reporting system of FIG. 3.

Now turning to FIG. 10, a detailed block diagram of the expense reporting 80 from FIG. 3 is pictured. The create expense form process 274 provides secured access to the expense forms, autofills the forms with data from the employee profile table 94 and allows the traveler 86 to construct an expense report semi-automatically as well as by pulling stored data from the trip table 128. The create expense form process 274 imports data from the expense category table 168, the expense policy table 174, and the travel policy table 98 and provides this information to the traveler 86 so that the traveler 86 can construct a policy compliant expense report.

The create expense form process 274 also imports data from the currency exchange table and allows the traveler 86 to process currency exchange conversions. When the traveler 86 has completed the expense report, a filled expense form is electronically forwarded to the expense form table 276, where it is assigned a unique expense form number. The number is assigned the first time an expense form is saved. The number is associated with a optional receipt envelope which may be printed at any time after the initial saving of the expense report has taken place. There is also a traveler reference number to support pre-bar coded envelopes for receipts.

The update expense form process 278 allows the traveler 86 to modify or cancel an expense report. The traveler 86 may import expense form data from expense form table 276 and modify an expense form until it has been approved or may pull up disapproved expense forms for modification and resubmission. An unsubmitted or disapproved expense report may also be cancelled.

The perform validations process 280 checks an expense form against data from the travel policy table 98 to identify unapproved policy violations. Policy violations on the expense form are highlighted and the approver has access to explanations for each of the errant fields. The approver will be able to approve the violations or return the form to the traveler 86 with comments.

The approve expense form process 282 comprises two methods of expense approval. First, the manager level approval gives the manager the option of rejecting an expense form if, for example, it exceeds the data provided from the average cost table 284. If the manager rejects the expense form, it can be routed back to the traveler 86 with comments. If the manager approves the expense form, it is routed to the Accounts Payable 286 for further processing. All approved expense data is also routed to the expense totals table 288. In the second case, the corporation can define situations when approval will be automatic and the expense form is routed directly to the Accounts Payable department 286.

Figure 11:
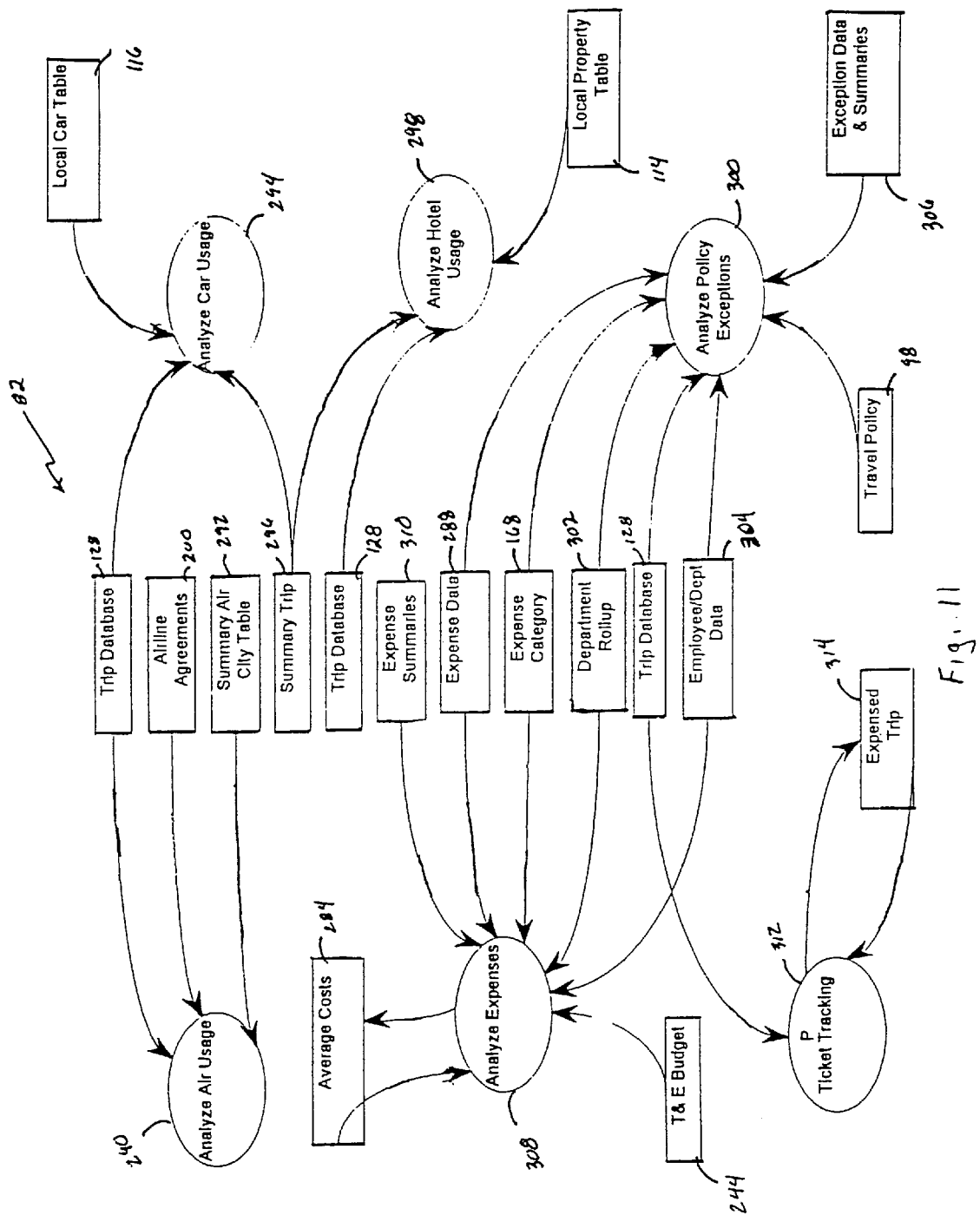
FIG. 11 is more detailed block diagrams of the post-trip management system of FIG. 3.

Now turning to FIG. 11, a detailed block diagram of the post-trip management 82 of FIG. 3 is depicted. The analyze air usage process 290 imports data from the trip table 128, the airline agreements table 200, and the summary air city table 292. The analyze air usage process 290 reports the percentage of goal share achieved for a specified city pair carrier, percent of goal share achieved for a carrier overall, overall usage for a given city pair, overall air cost for a given city pair, and average leg fare cost for a given city pair.

The analyze car usage process 294 imports data from the local car table 116, the trip table 128 and the summary trip table 296. The analyze car usage process 294 reports percent of goal share achieved for specified chain in a specified city, percent of goal share achieved for chain overall, overall usage for a given city, overall car dollar spent in a given city, overall chain usage, and average car rental day cost in each city. The analyze hotel usage process 298 imports data from the local property table 114, the summary trio table 296 and the trip table 128.

The analyze hotel usage process 298 reports percent of goal share achieved for a specified hotel chain in a specified city, percent of goal share achieved for a chain overall, overall usage for a given city, overall hotel dollars spent in a given city, overall chain usage, and average hotel night cost in each city.

The analyze policy exceptions process 300 imports data from the expense table 288, the expense category table 168, the department roll-up table 302, the trip table 128, the employee/department table 304, the travel policy table 98, and the exception data and summaries table 306. The analyze policy exceptions process 300 creates on request reports, for example, for monthly reporting of exceptions by employee and by type, overall monthly exception trends by employee and type, overall monthly exception trends by department and type, and overall exceptions by type and monthly trends.

The analyze expenses process 308 imports data from the expense summaries table 310, the expense table 288, the expense category table 168, the department roll-up table 302, the employee/department table 304, and the travel and expense budget table 244. The analyze expenses process 308 creates a report that shows trends by overall company, summary by department, summary by project, and summary by employee.

The ticket tracking process 312 imports data from the trip table 128 and the expense trio table 314. The ticket tracking process 312 reports on the status of any given ticket, lists tickets older than a given number of days that have not appeared on an expense report or been refunded or voided, lists tickets returned for refund which have not been credited, and reports unrefunded tickets or miscellaneous change orders available for exchange.

Figure 12:
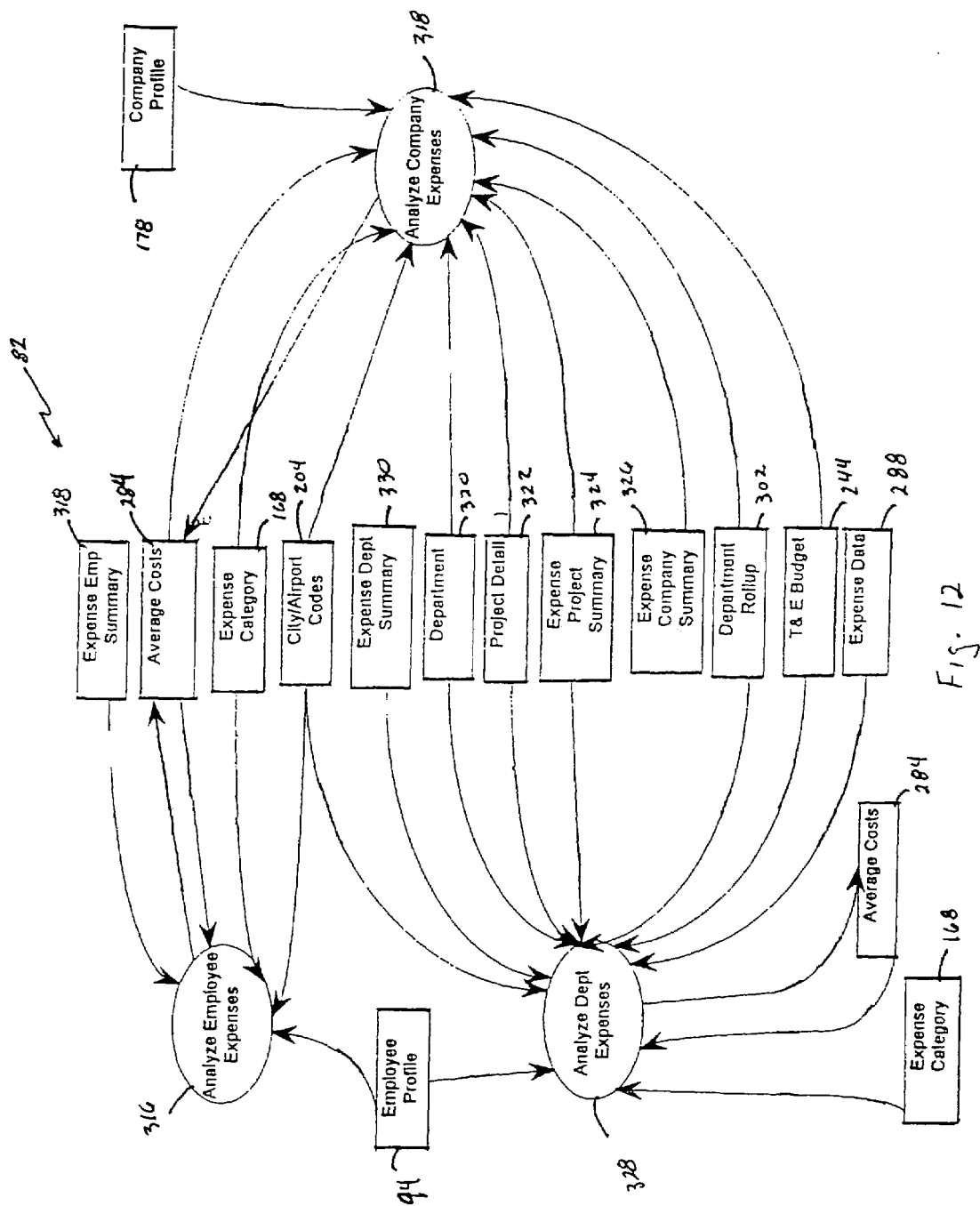
FIG. 12 is more detailed block diagrams of the post-trio management system of FIG. 3.

Now turning to FIG. 12, a detailed block diagram of post-trip management 82 of FIG. 3 is detailed. The analyze employee expenses process 316, uses data from the expense employee summary table 318, the average costs table 284, the expense category table 168, the city/airport codes table 204, and the employee profile table 94. The analyze employee expense process 316 summarizes for a given time period employee expenses by category as well as shows trends in employee expenses by category.

The analyze company expenses process 318 uses data from the company profile table 178, the average costs table 284, the expense category table 168, the city/airport codes table 204, the department table 320, the project detail table 322, the expense project summary table 324, the expense company summary table 326, the department roll-up table 302, and the travel and expense budget table 244. The analyze company expenses process 318 creates a summary for a given time period of company expenses by category and by project as well as trends in company expenses by project and by category.

The analyze department expenses process 328 imports data from the employee profile table 94, the city/airport codes table 204, the expense department summary table 330, the department table 320, the project detail table 322, the expense project summary table 324, the department roll-up table 302, the travel and the expense budget table 244, the expense table 288, the average costs table 284, and the expense category table 168. The analyze department expenses process 328 creates a summary for a given time period of departmental expenses by category and by project.

The analyze department expenses process 328 also reports trends in departmental expenses by category and by project.

Figure 13:
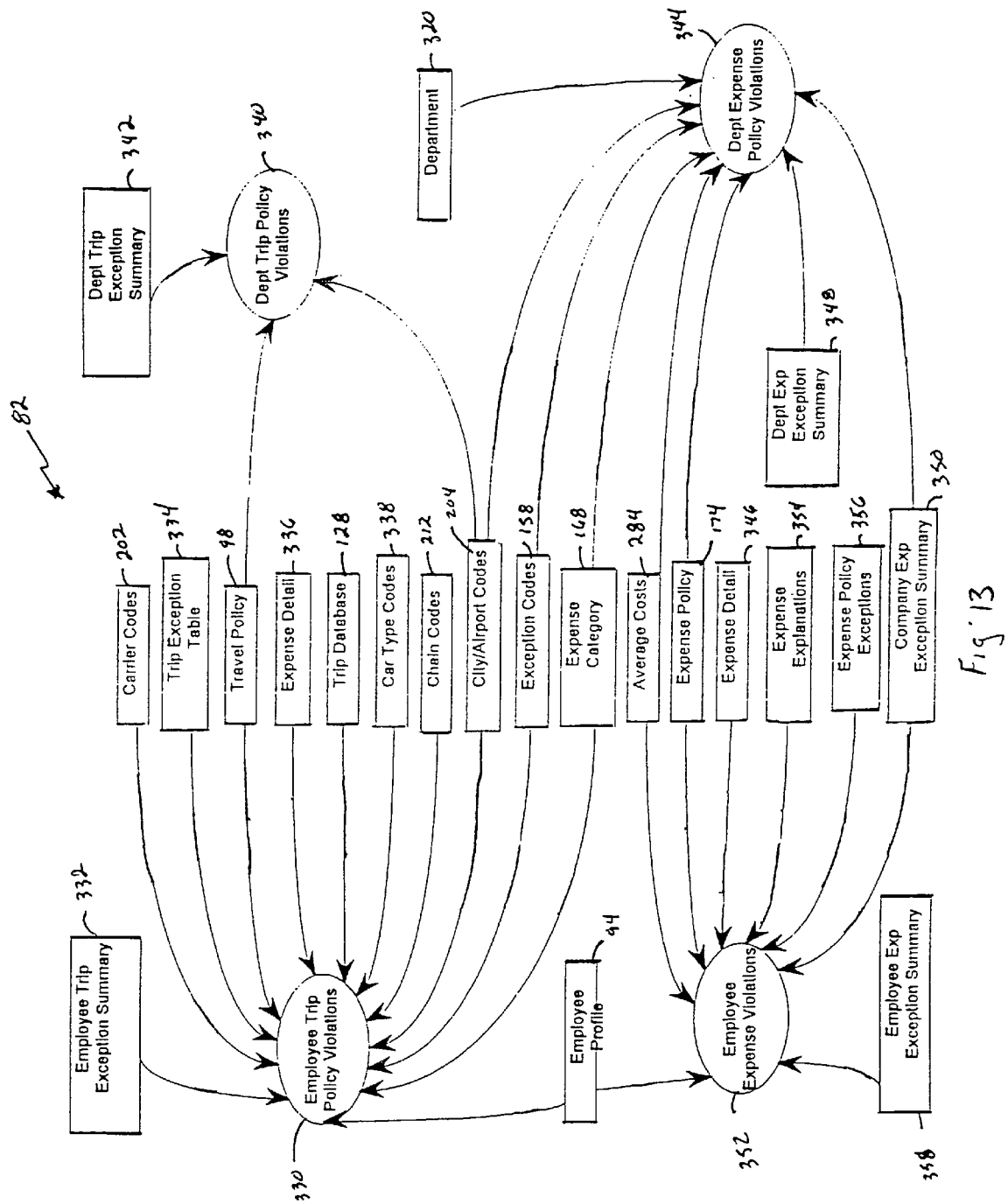
FIG. 13 is more detailed block diagrams of the post-trip management system of FIG. 3.

Now turning to FIG. 13, a detailed block diagram of another aspect of the post-trip management 82 of FIG. 3 is depicted. The employee trip policy violations process 330 imports data from employee trip exception the summary table 332, the carrier codes table 202, the trip exception table 334, the travel policy table 98, the expense detail table 336, the trip table 128, the car type codes table 338, the chain codes table 212, the city/airport codes table 204, the exception codes table 158, the expense category table 168, and the employee profile table 94. The employee trip policy violations process 330 creates a summary for a given time period of employee trip violations by category and violation trends by category.

The department trip violations process 340 imports data from the department trip exception summary table 342, the travel policy table 98, and the city/airport codes table 204. The department trip policy violations process 340 creates a summary for a given time period of department trip violations by category and reports trends in department trip violations.

The department expense policy violations process 344 uses data from the city/airport codes table 204, the exception codes table 158, the expense category table 168, the average costs table 284, the expense policy table 174, the department expense exception summary table 348, the company expense exception summary table 350, and the department table 320. The department expense policy violations process 344 creates a summary for a given time period of departmental expense policy violations by category and trends in departmental expense policy violations. The employee expense violations process 352 uses data from the employee profile data base 94, the average costs table 284, the expense policy table 174, the expense detail table 346, the expense explanations table 354, the expense policy exceptions table 356, the company expense exception summary table 350, and the employee expense exception summary table 358. The employee expense violations process 352 creates a summary for a given time period of employee expense violations by category and trends in employee expense violations.

Figure 14A:
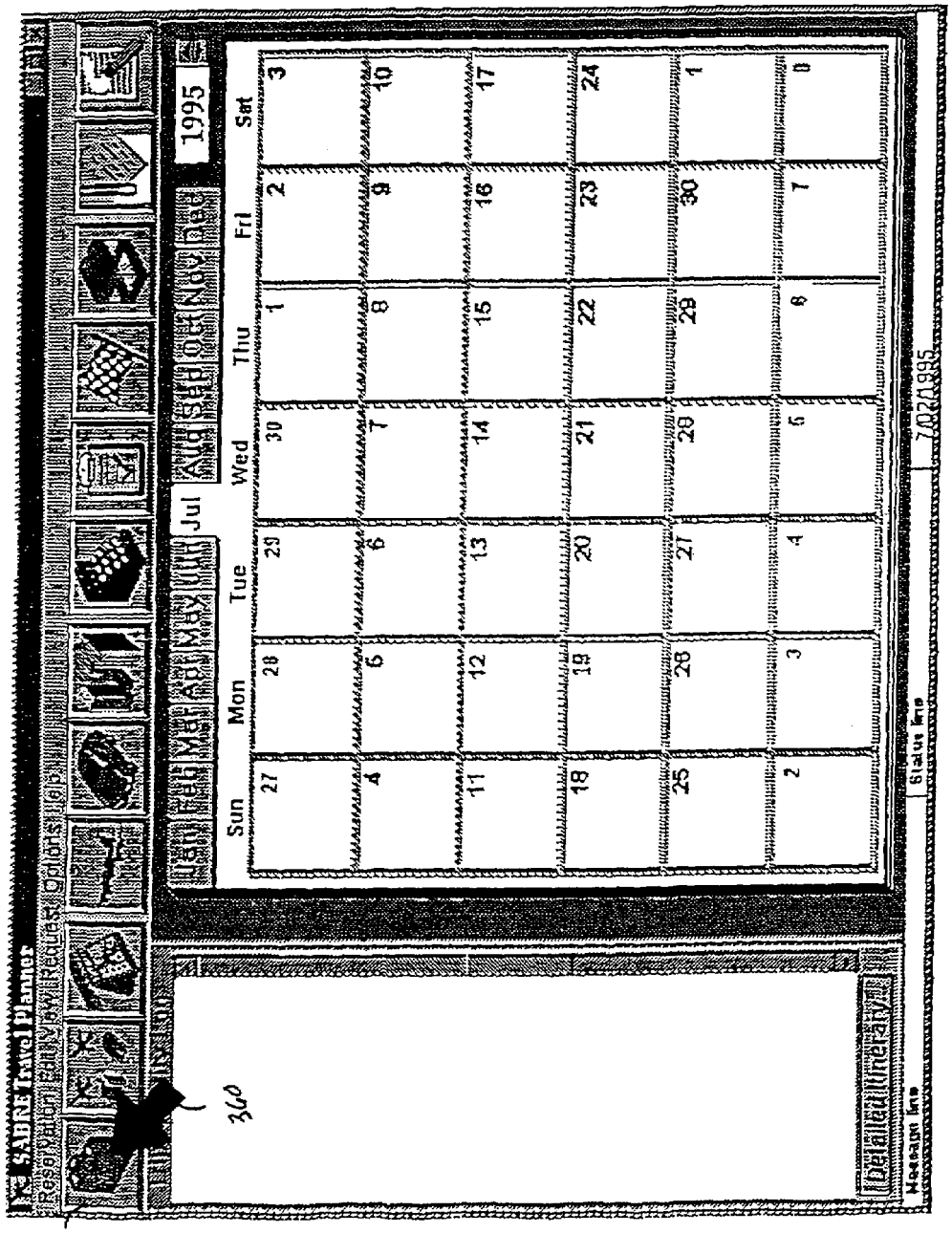
FIG. 14, consisting of 14A–14X, is a series of graphical user interfaces for scheduling a trip.
Figure 14B:
Figure 14C:
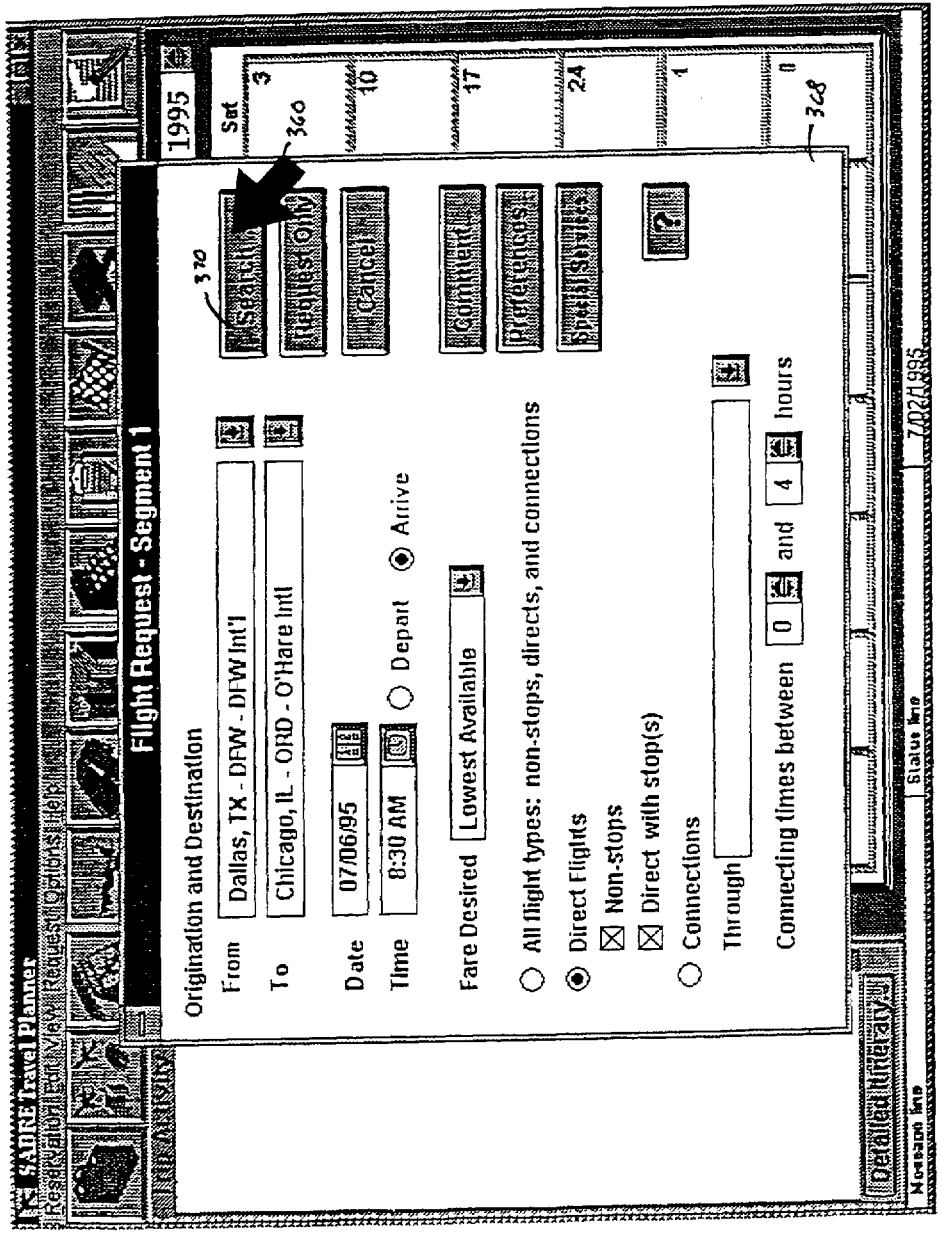
Figure 14D:
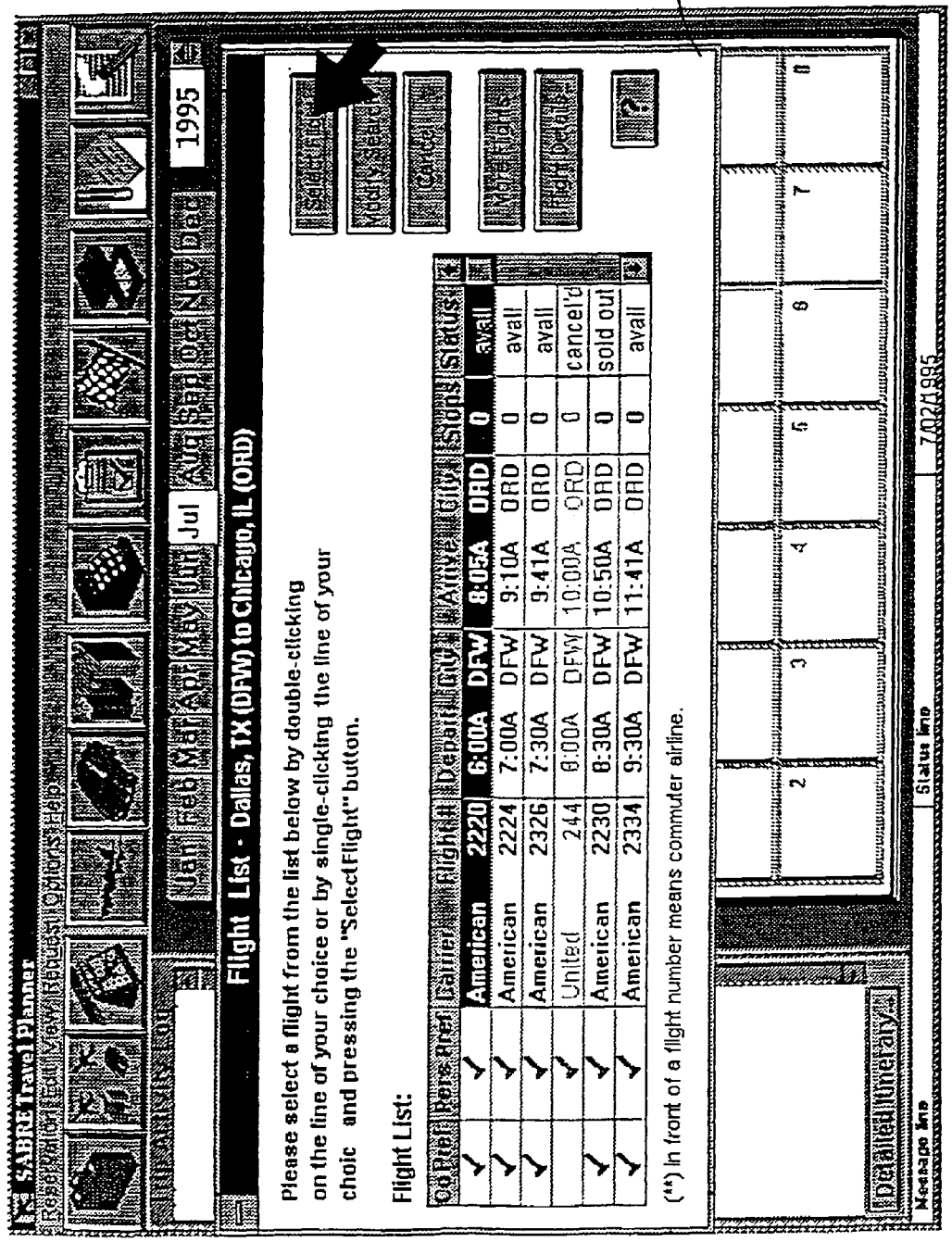
Figure 14E:
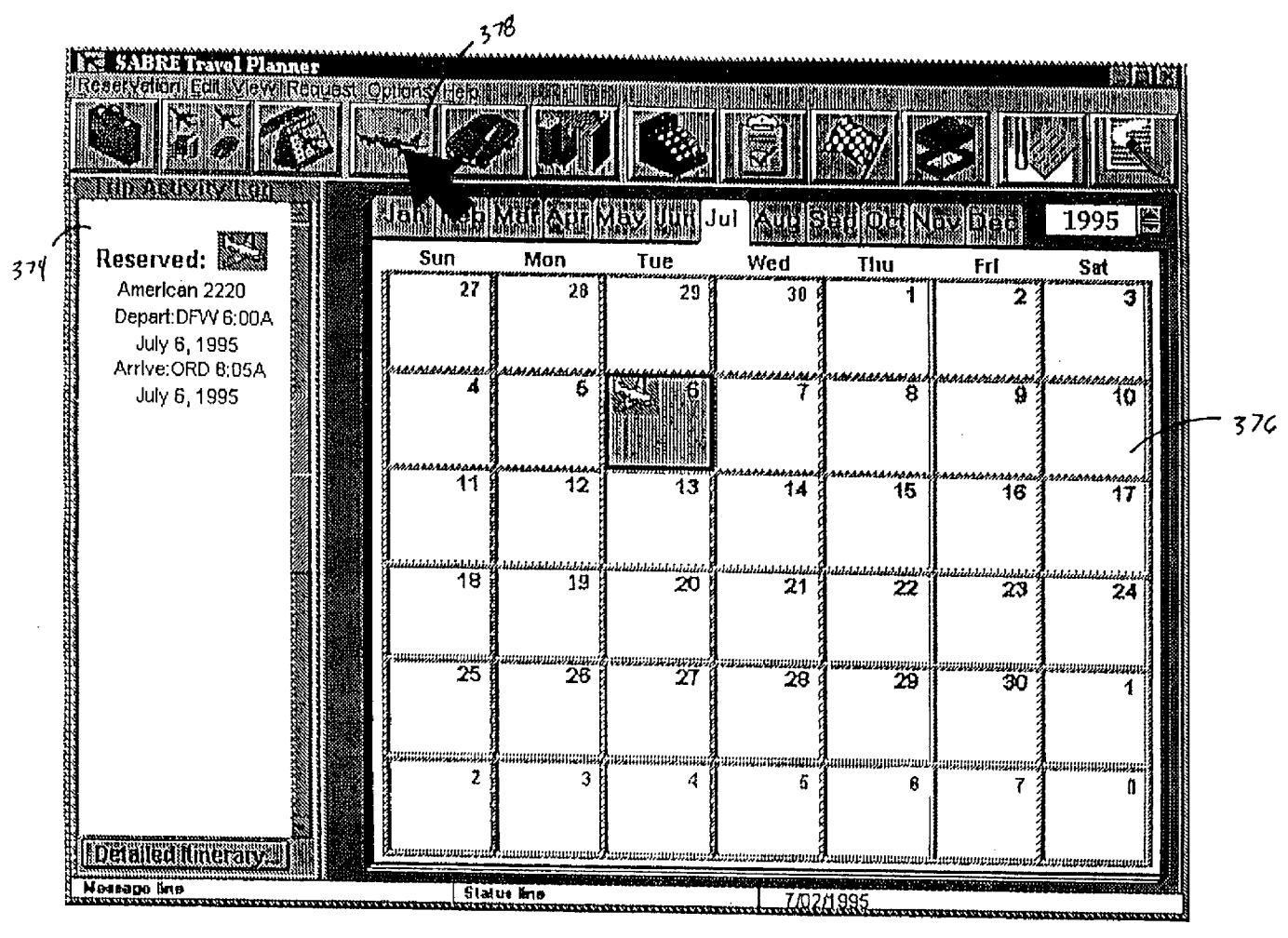
Figure 14F:
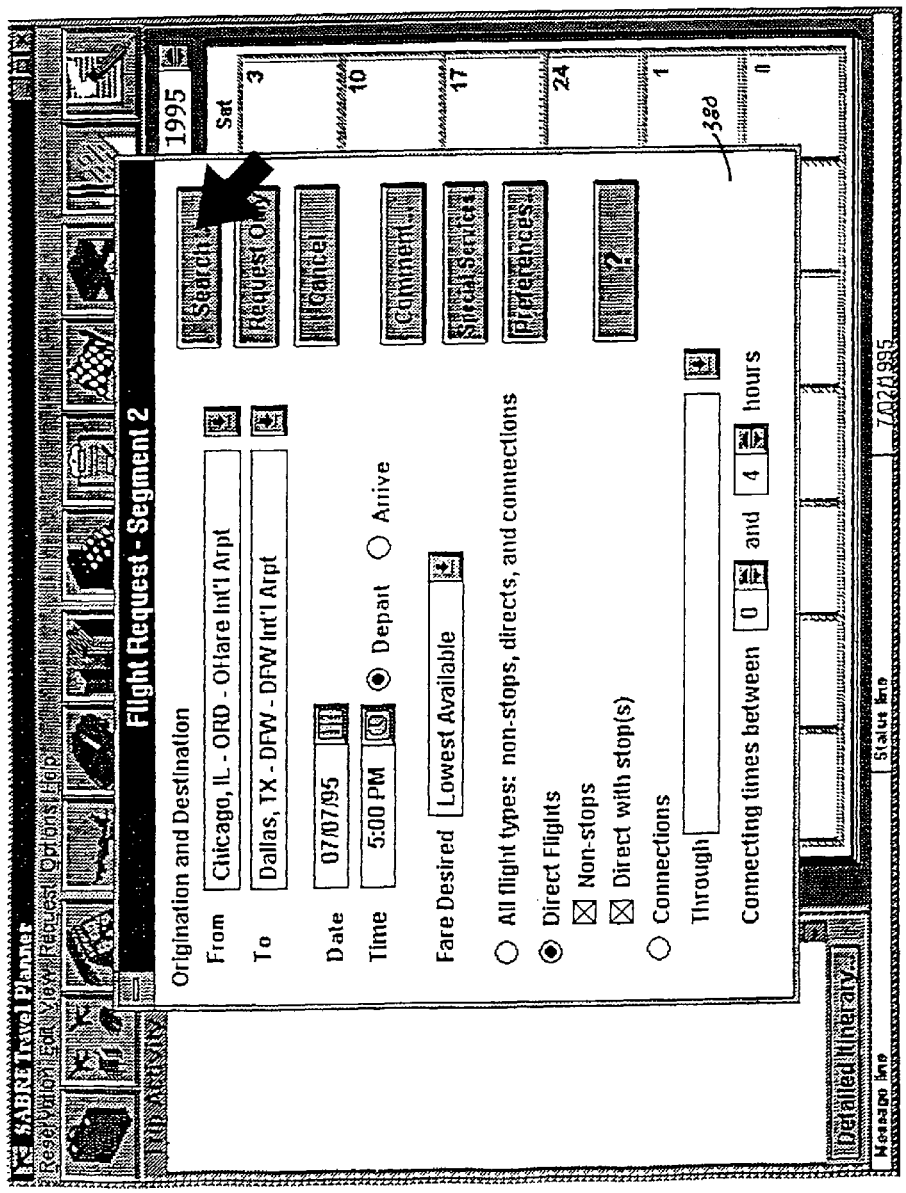
Figure 14G:
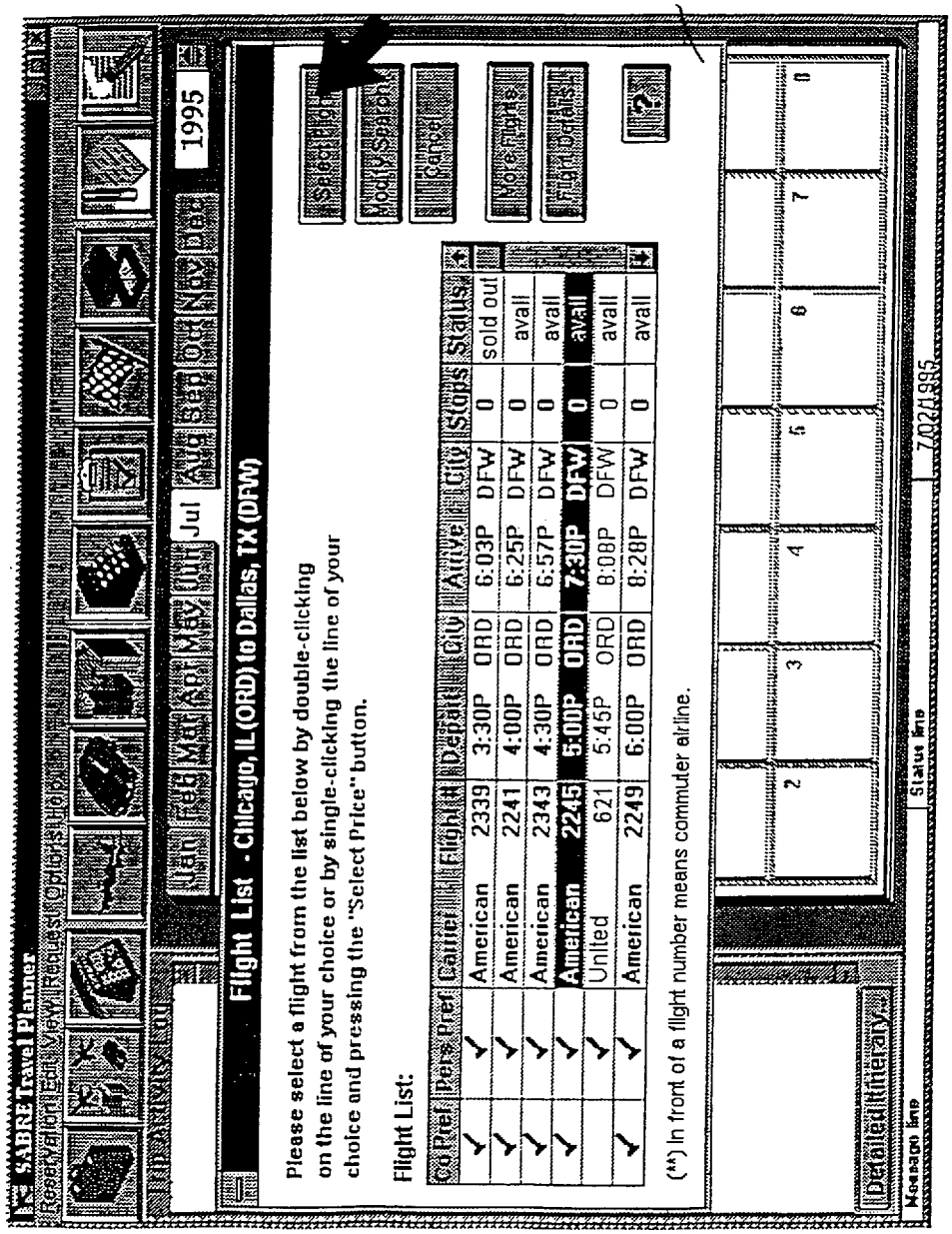
Figure 14A:
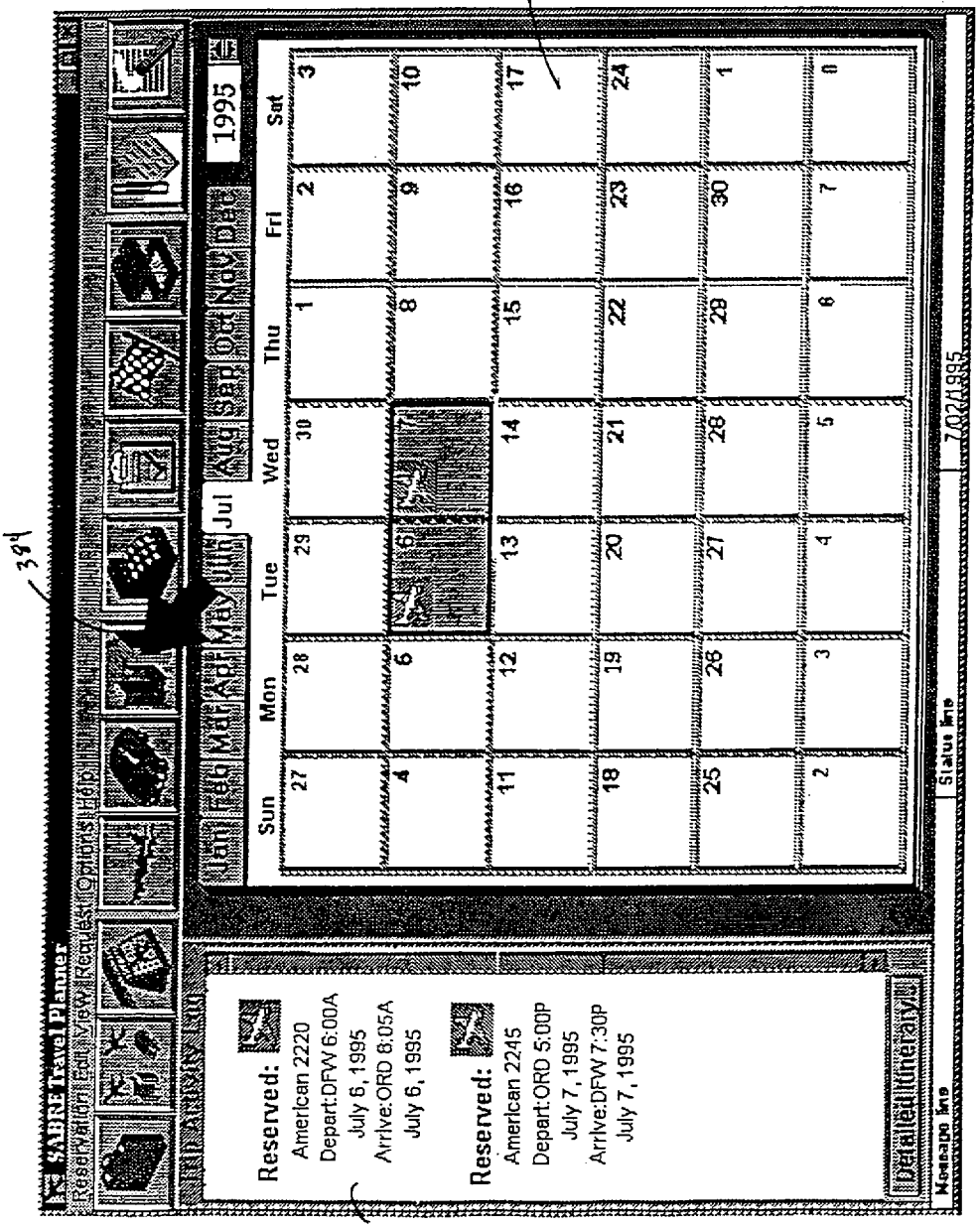
Figure 14I:
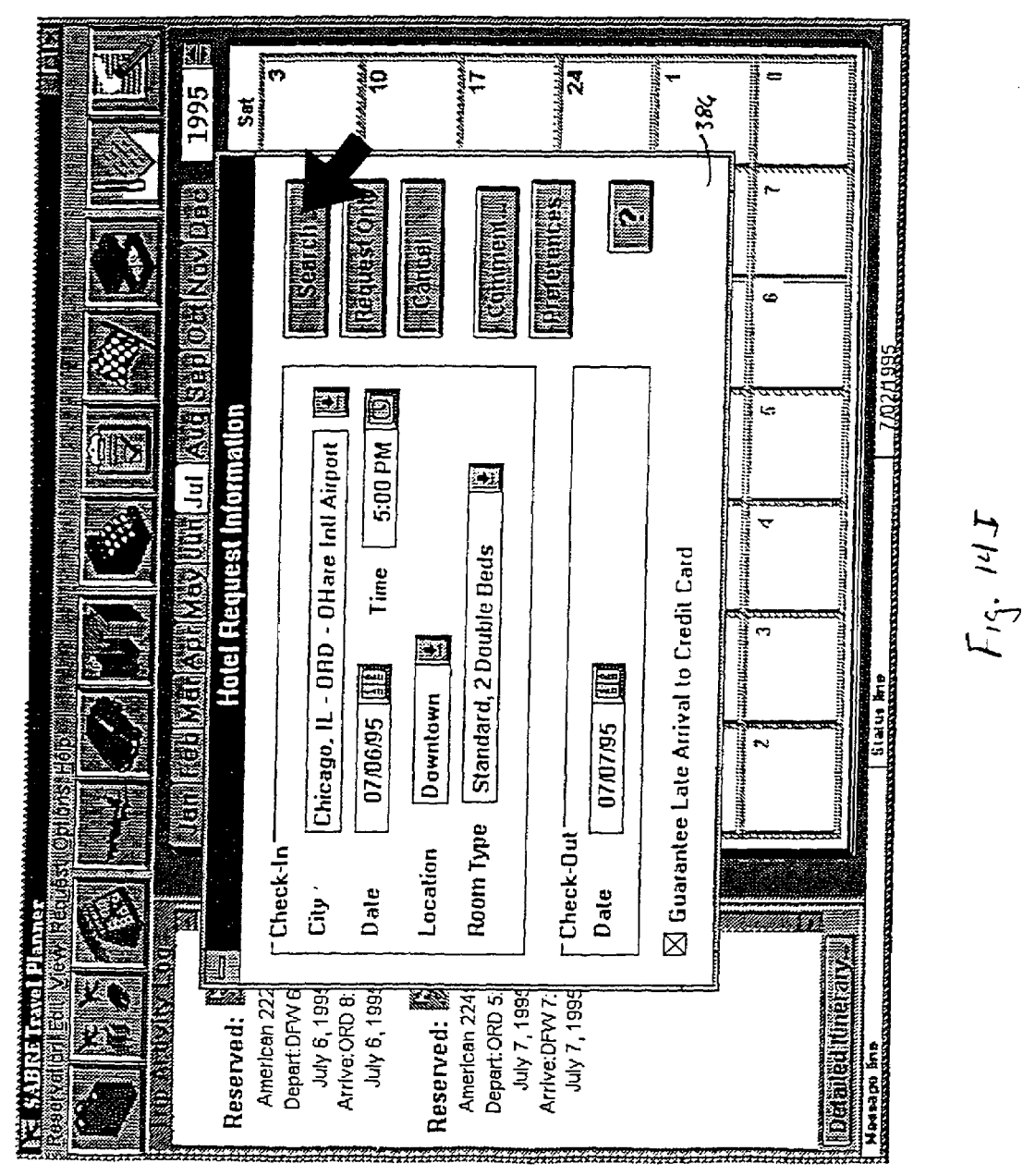
Figure 14J:
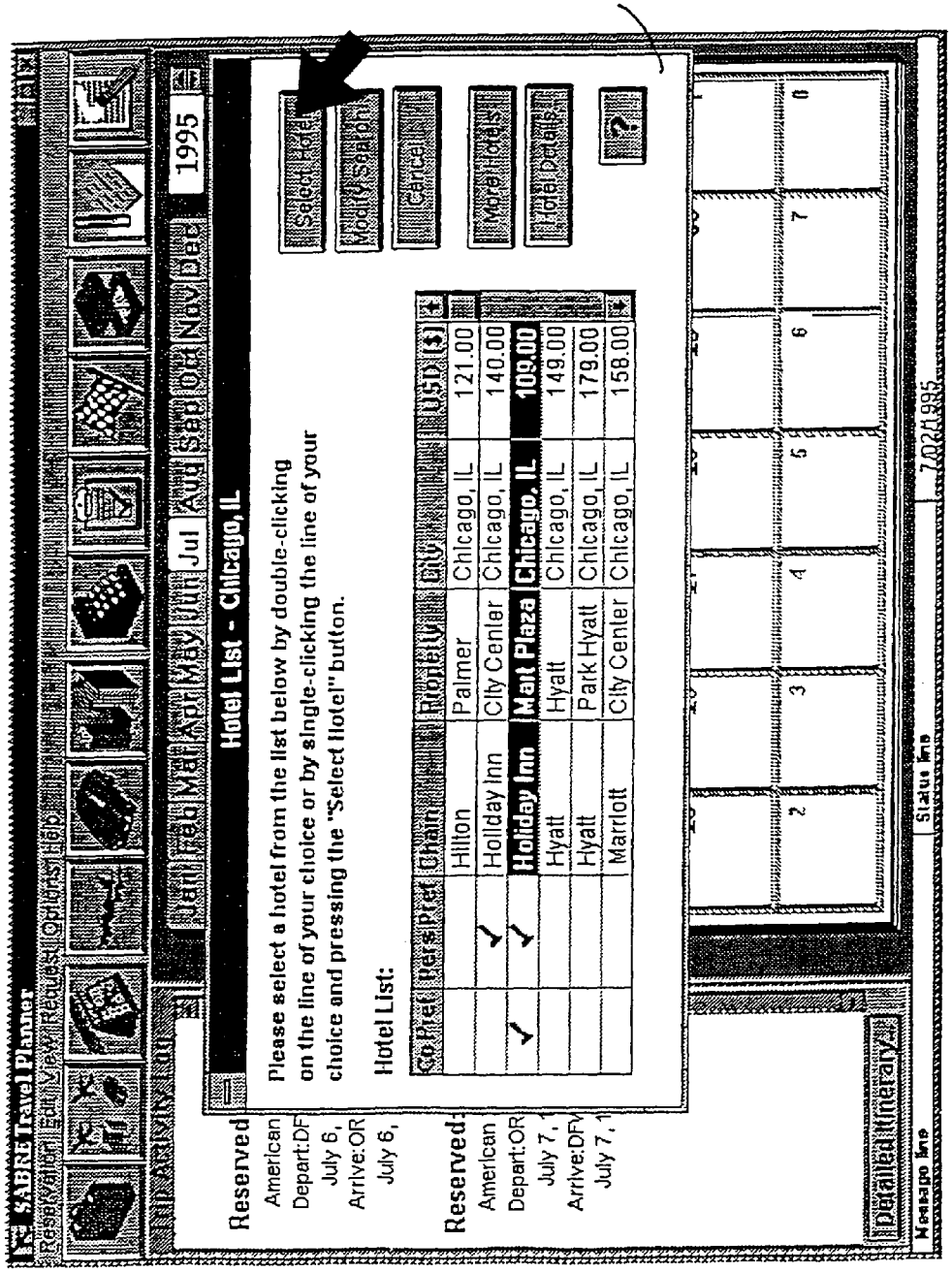
Figure 14K:
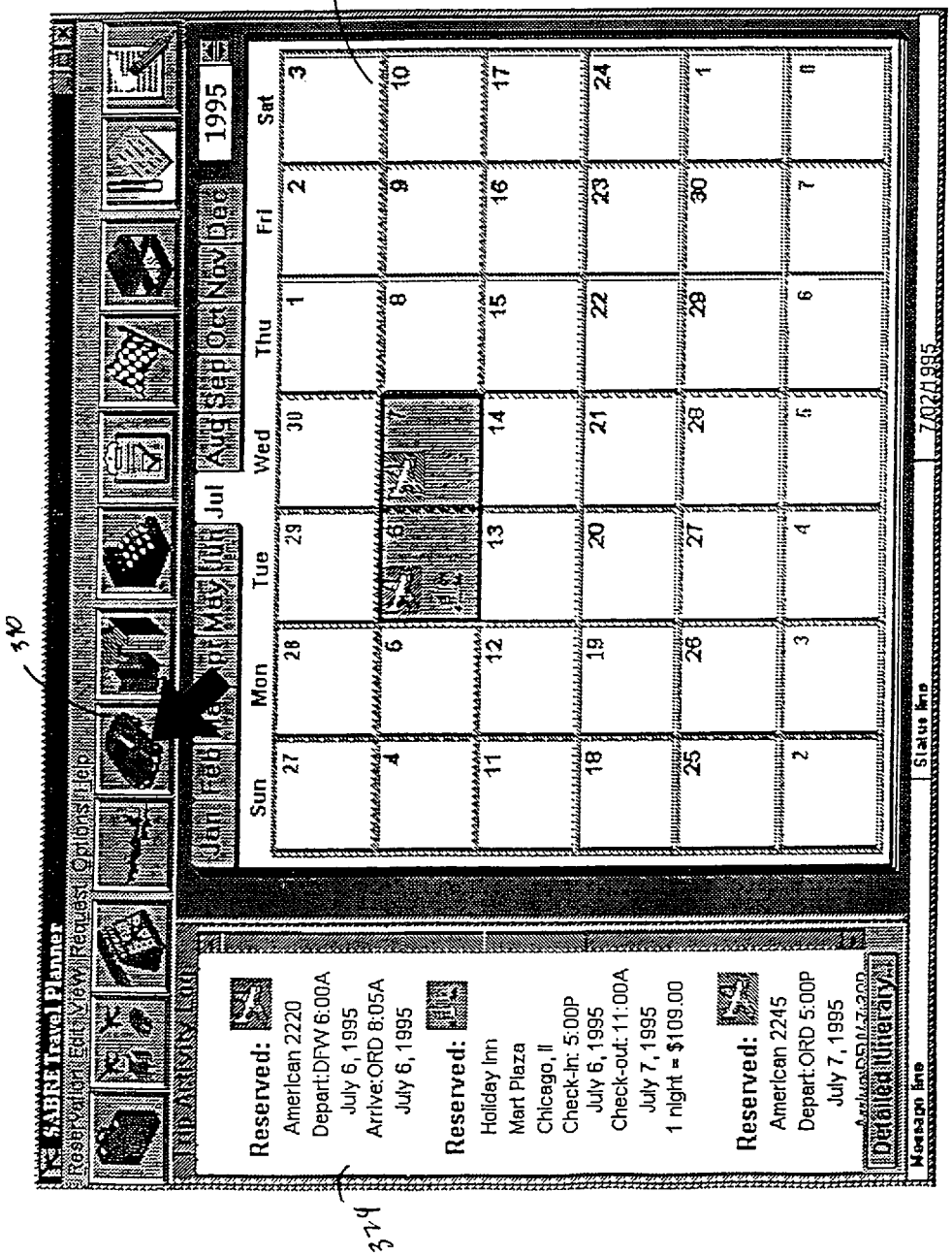
Figure 14I:
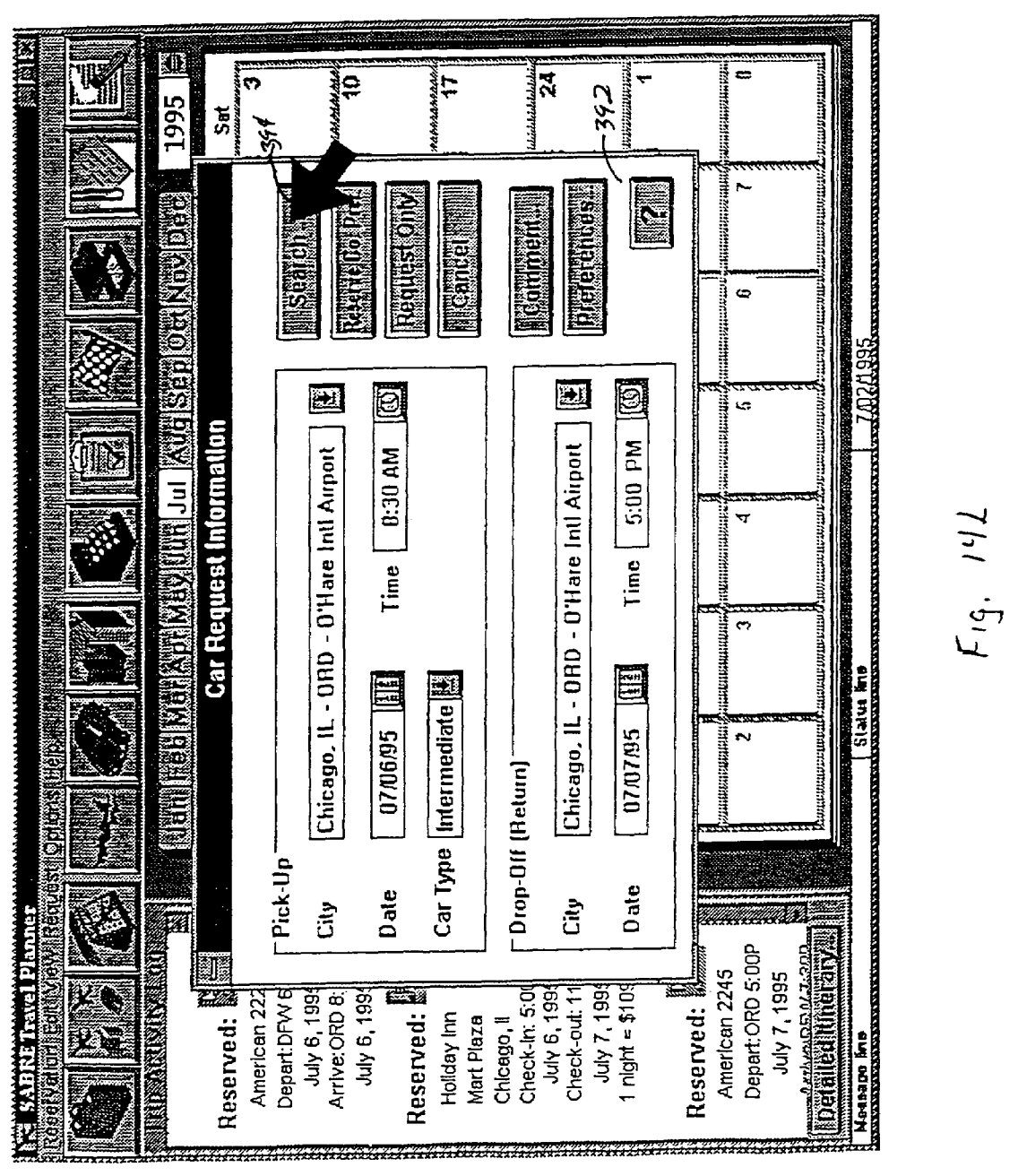
Figure 14M:
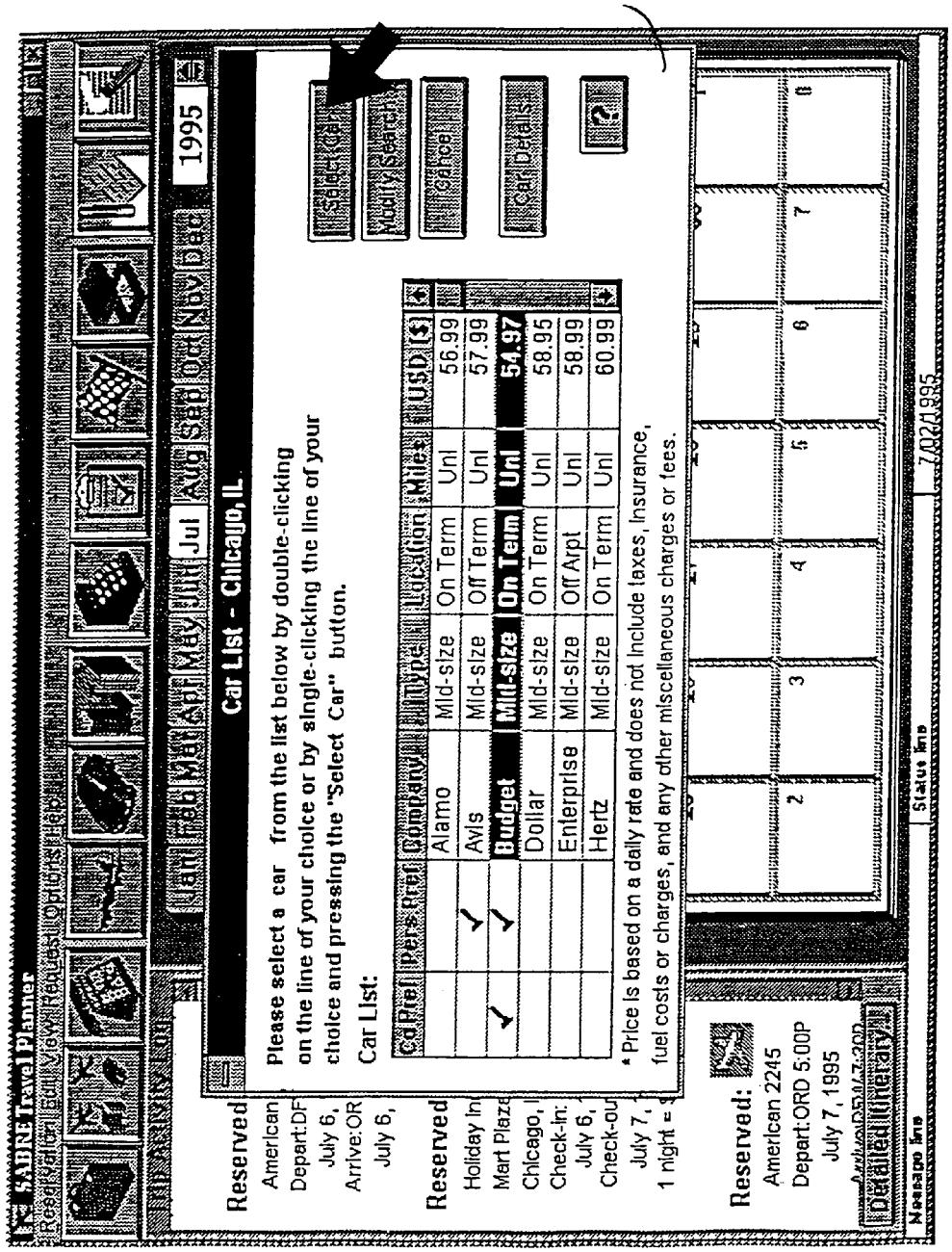
Figure 14D:
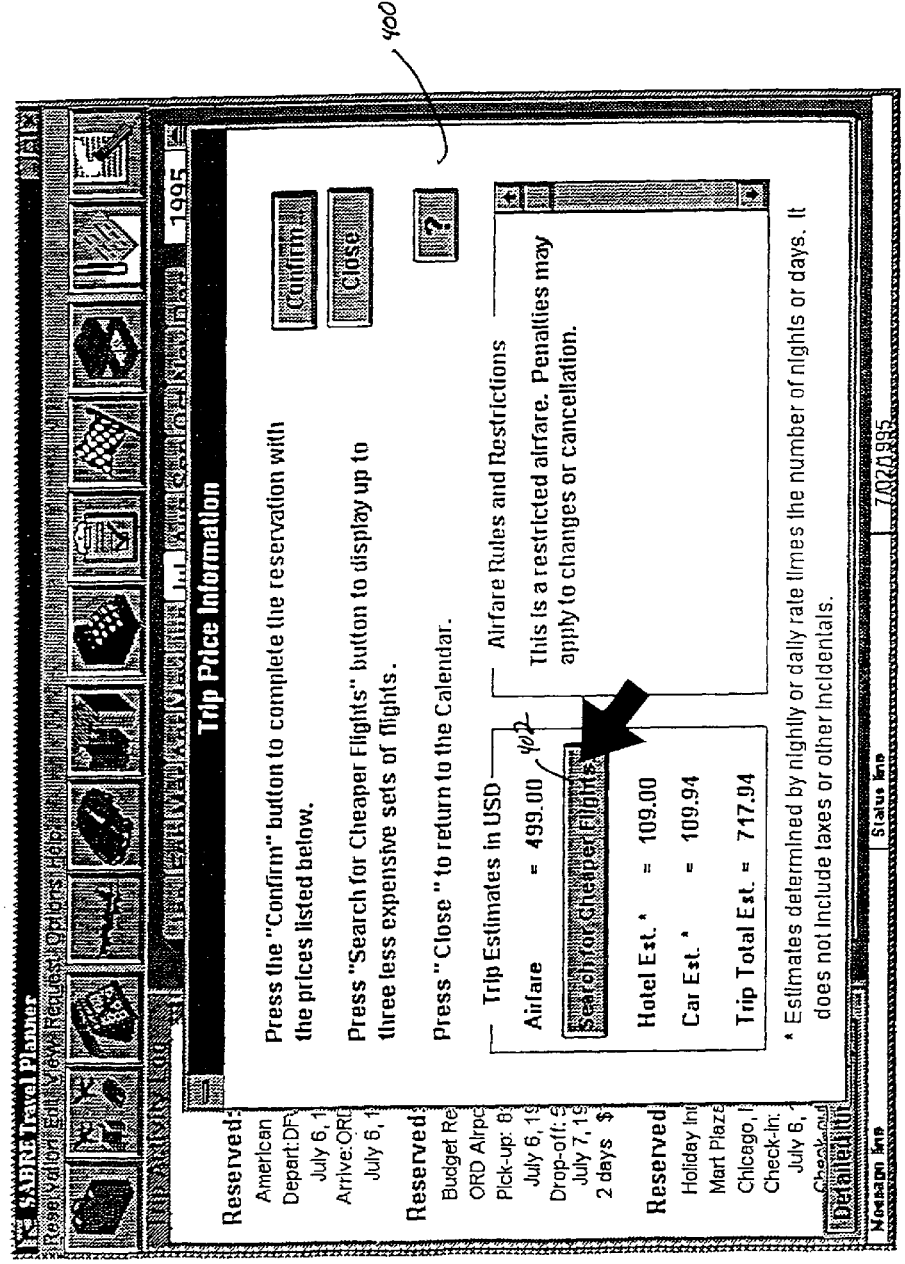
Figure 14P:
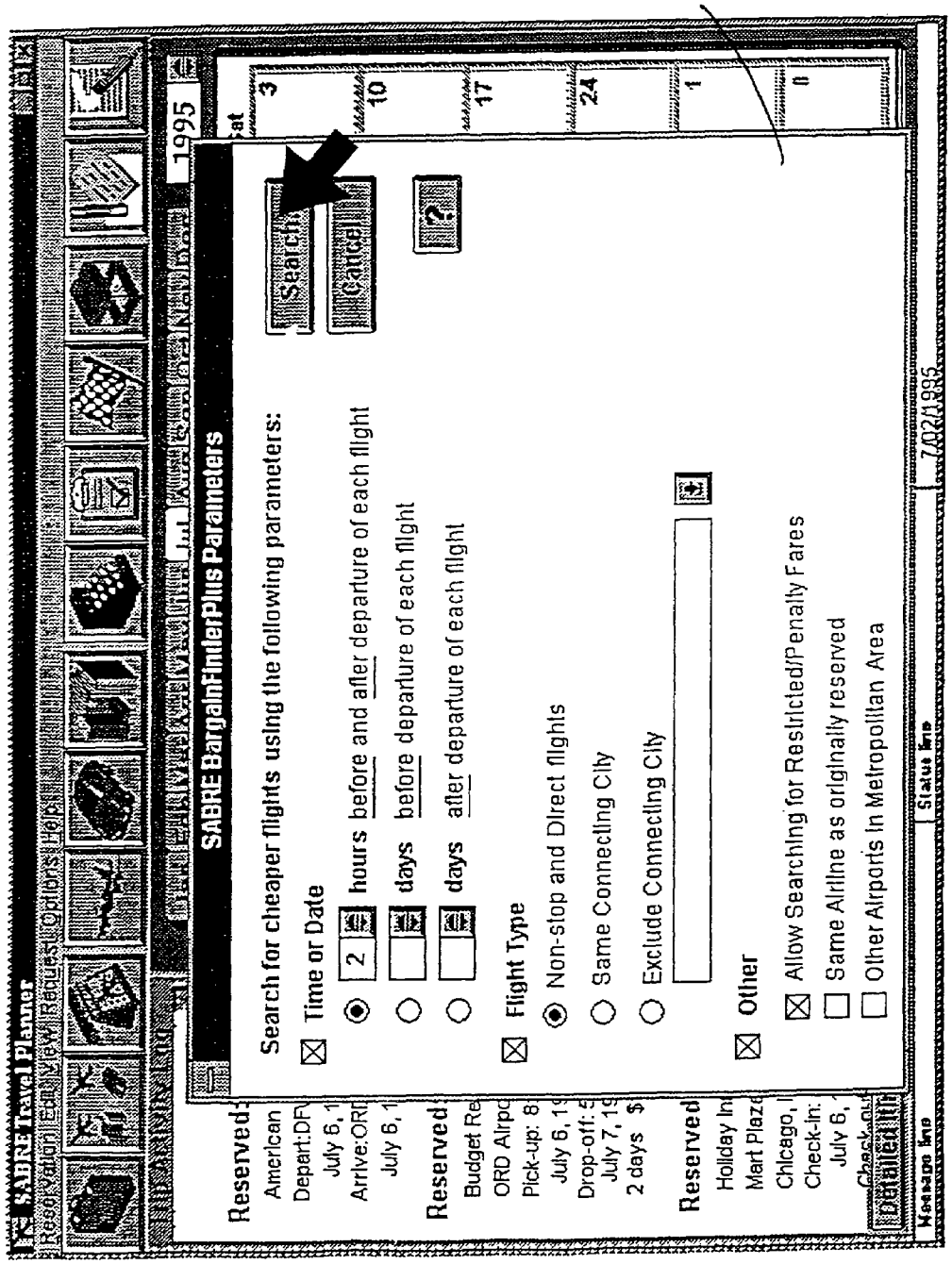
Figure 14Q:
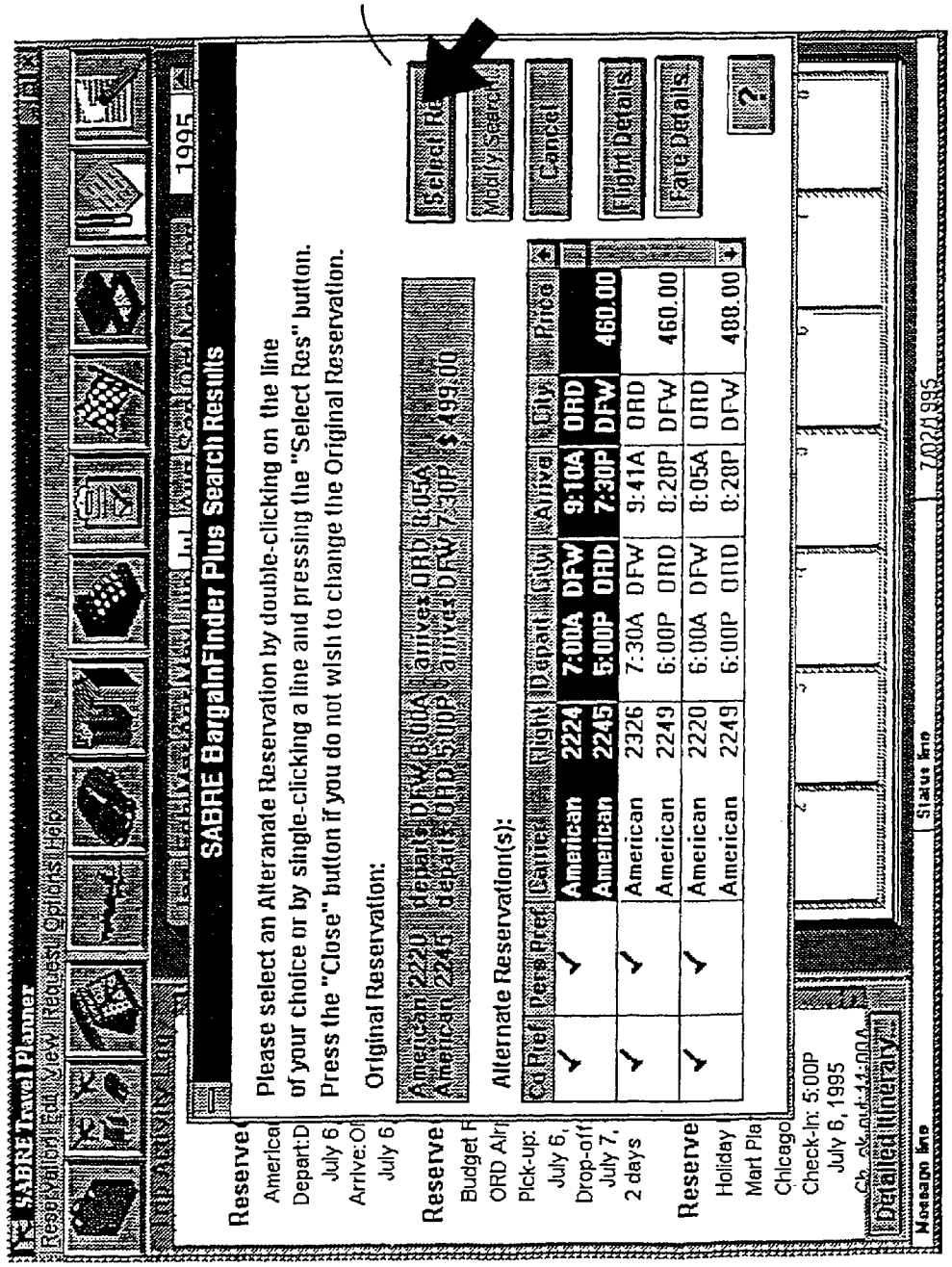
Figure 14R:
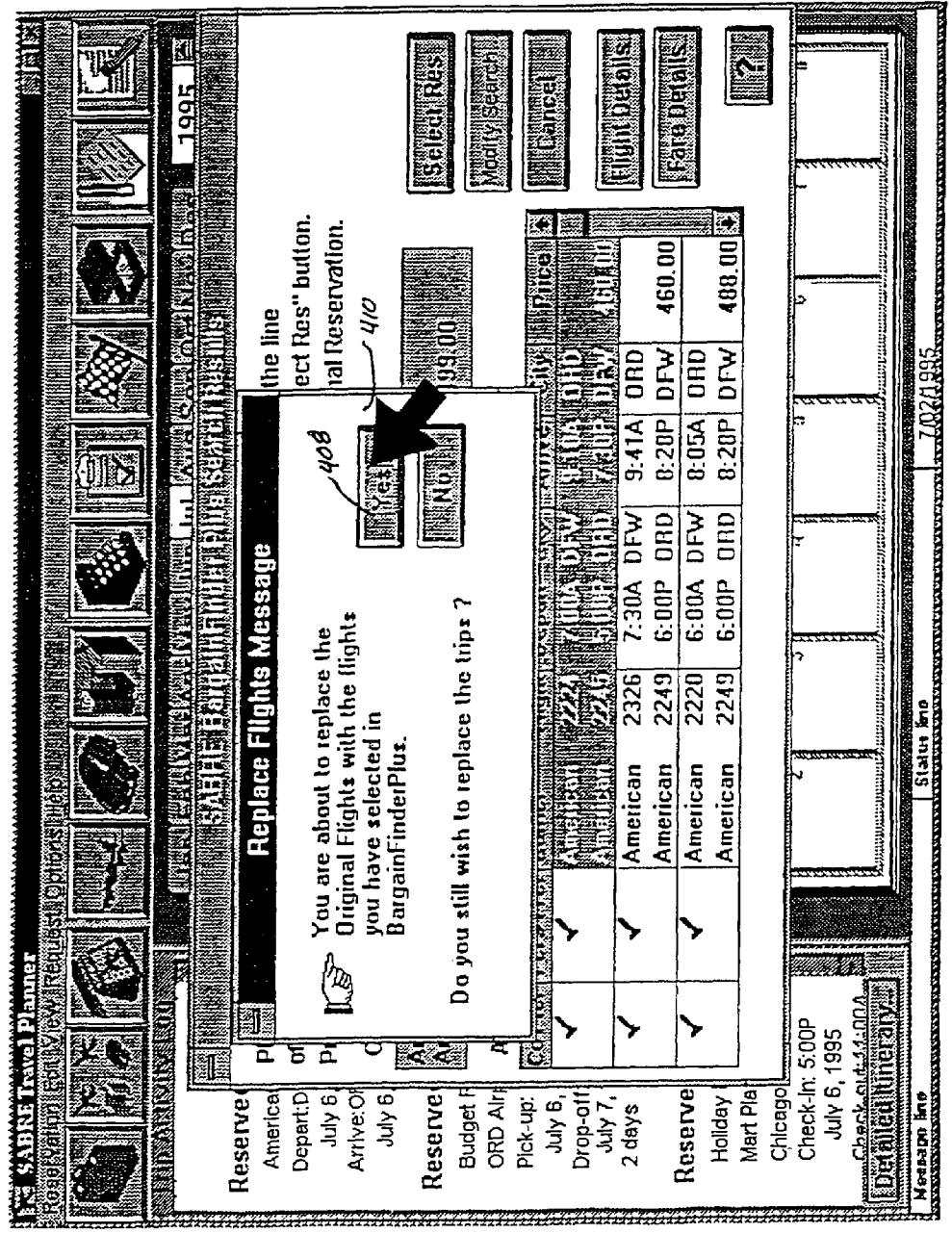
Figure 14S:
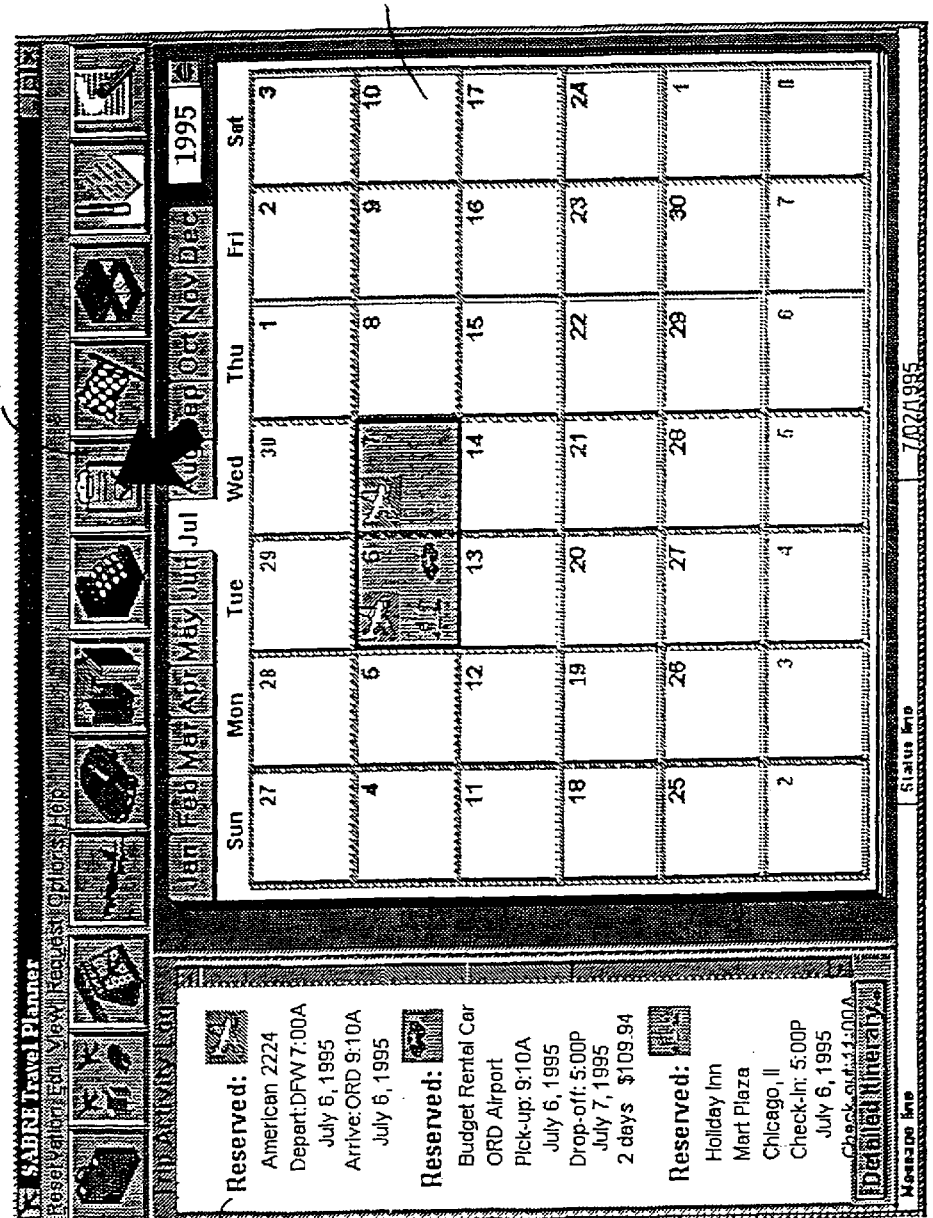
Figure 14T:
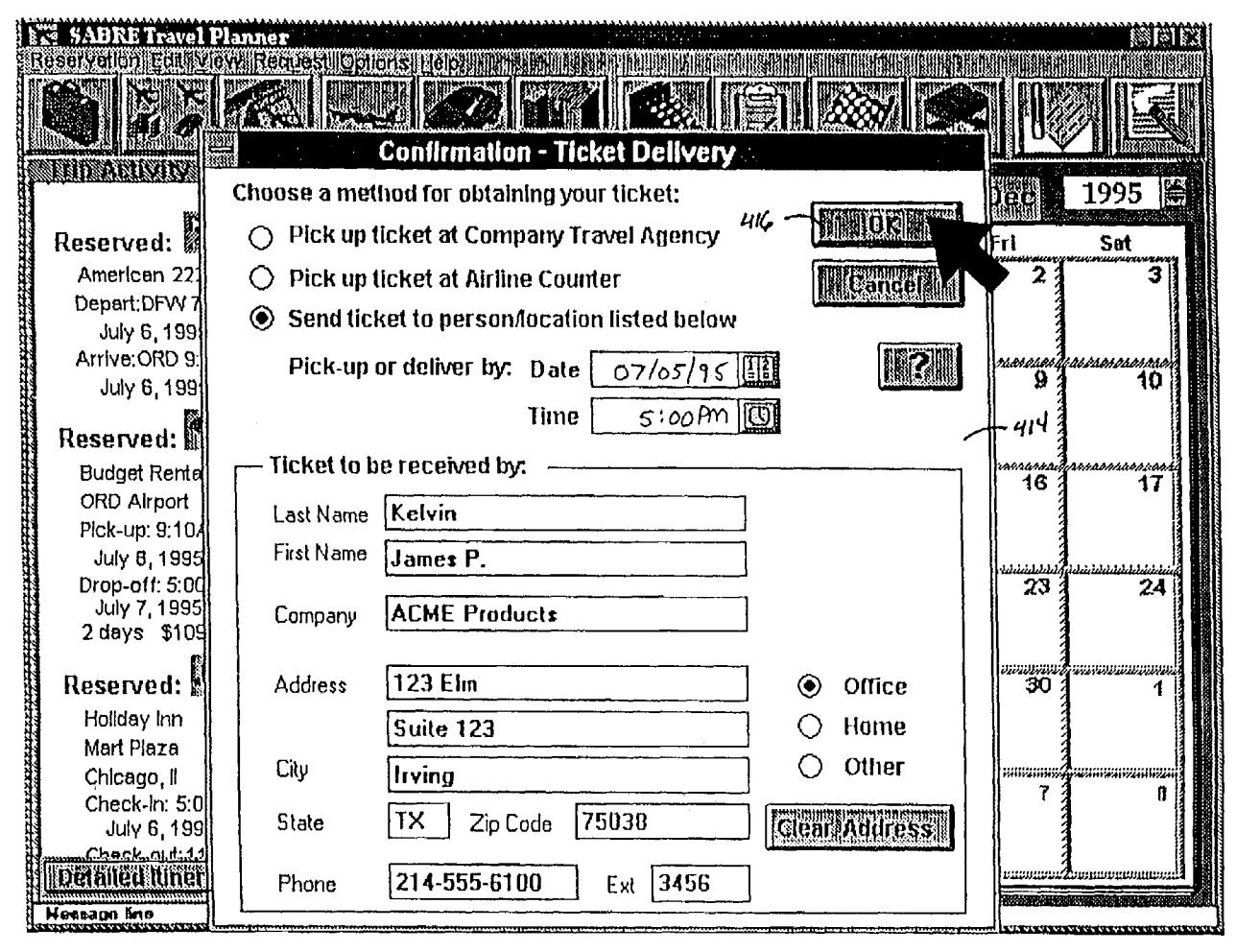
Figure 14N:
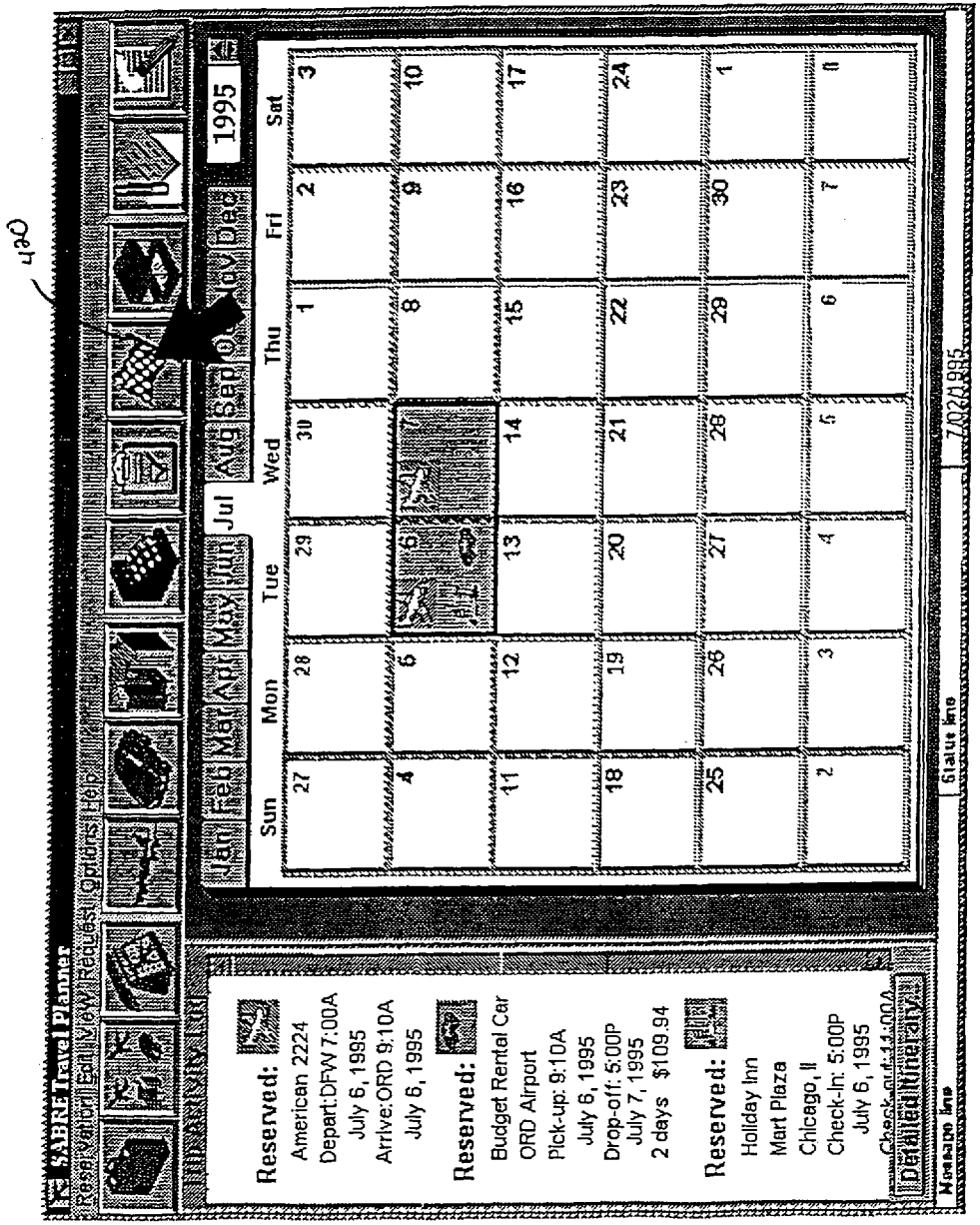
Figure 14W:
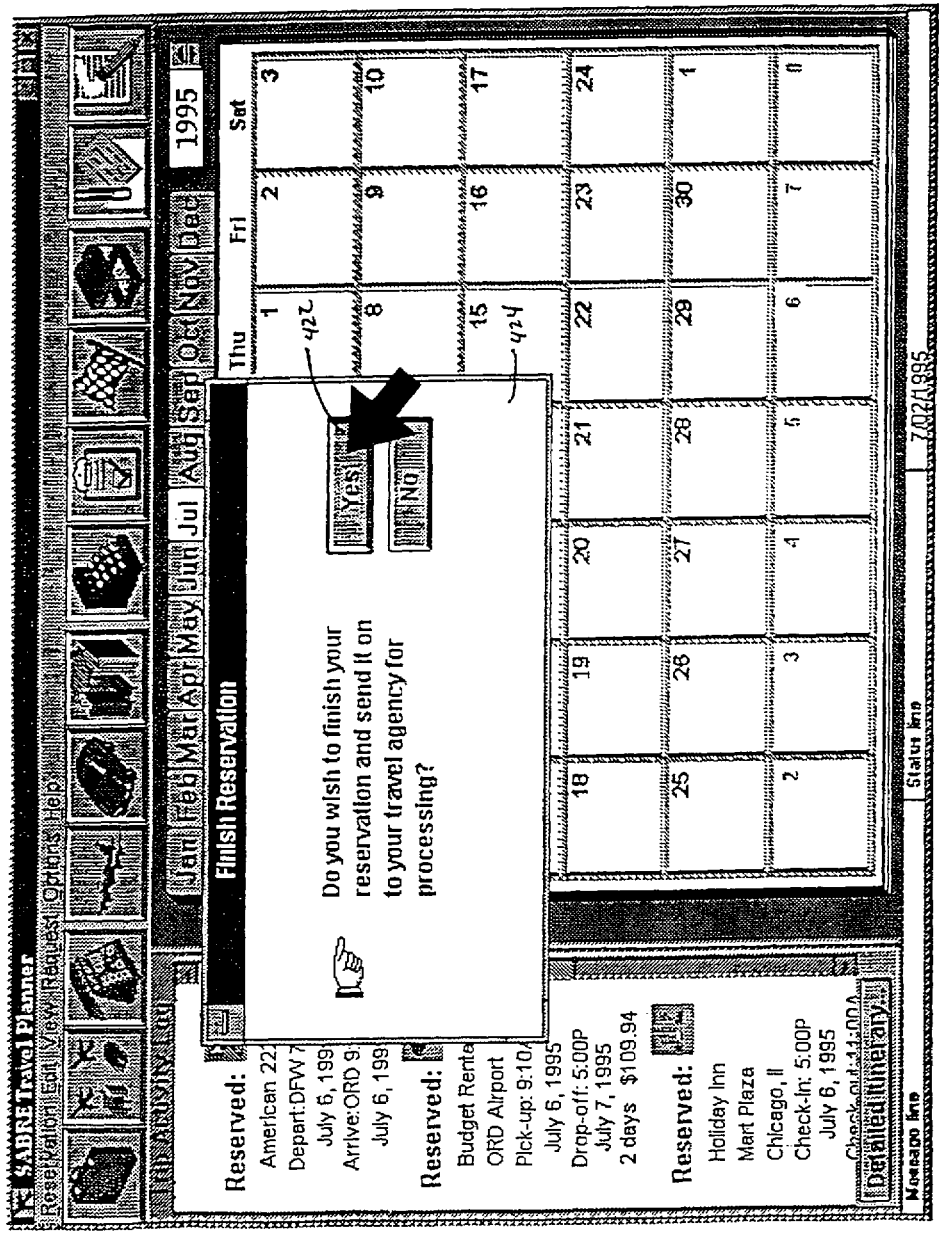
Figure 14X:
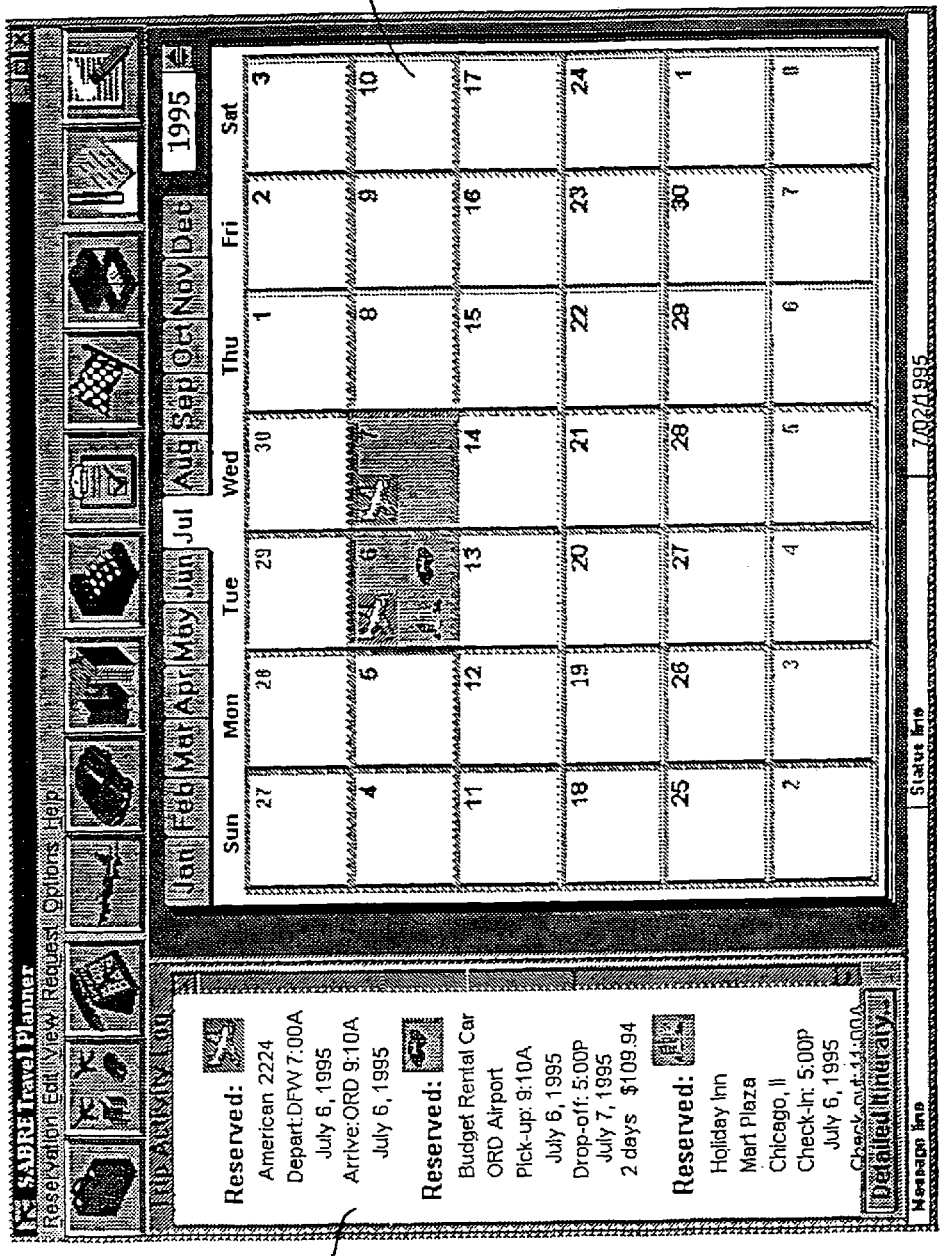
Figure 15A:
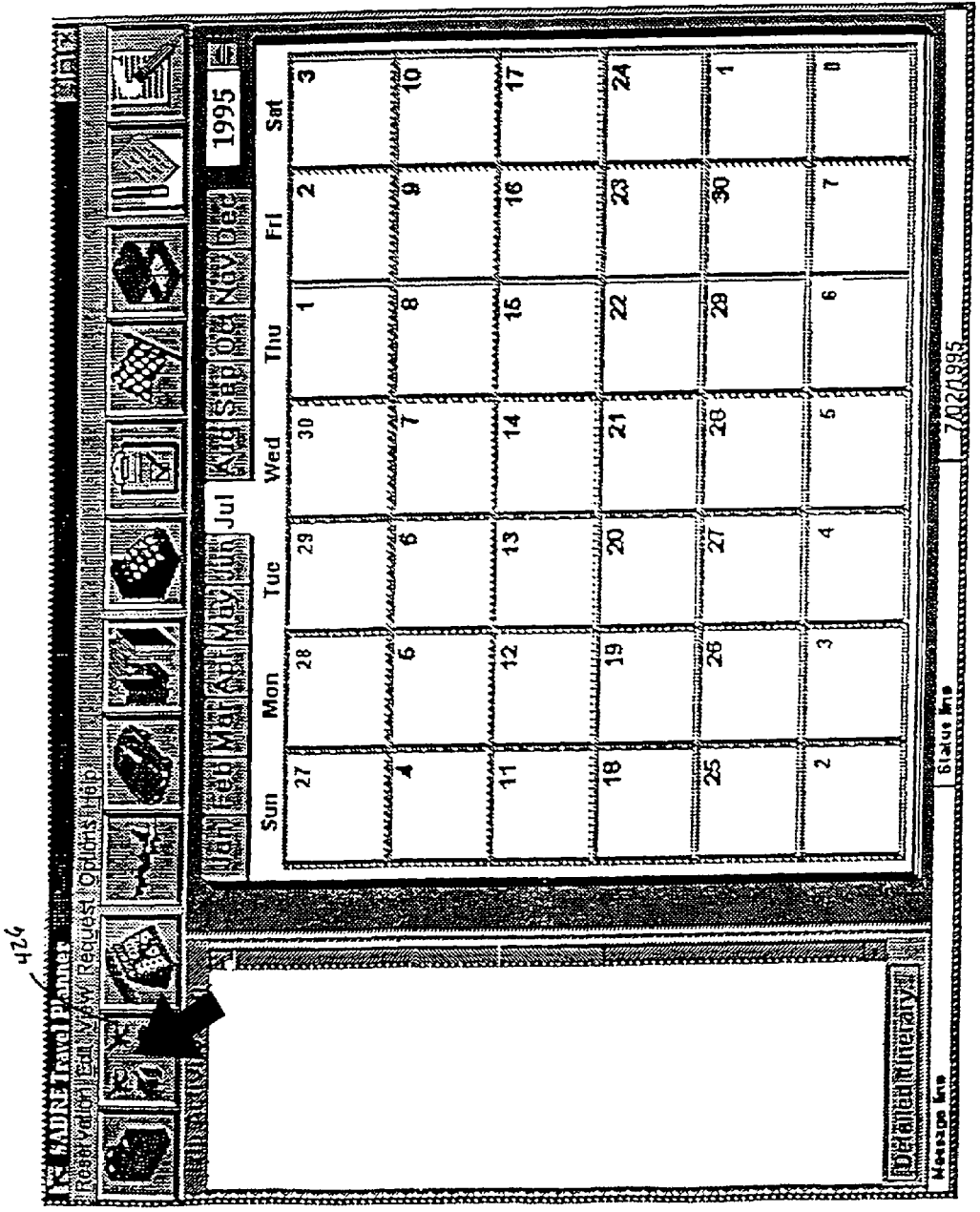
FIG. 15, consisting of 15A–15G, is a series of graphical user interfaces for scheduling repeat trips.
Figure 15B:
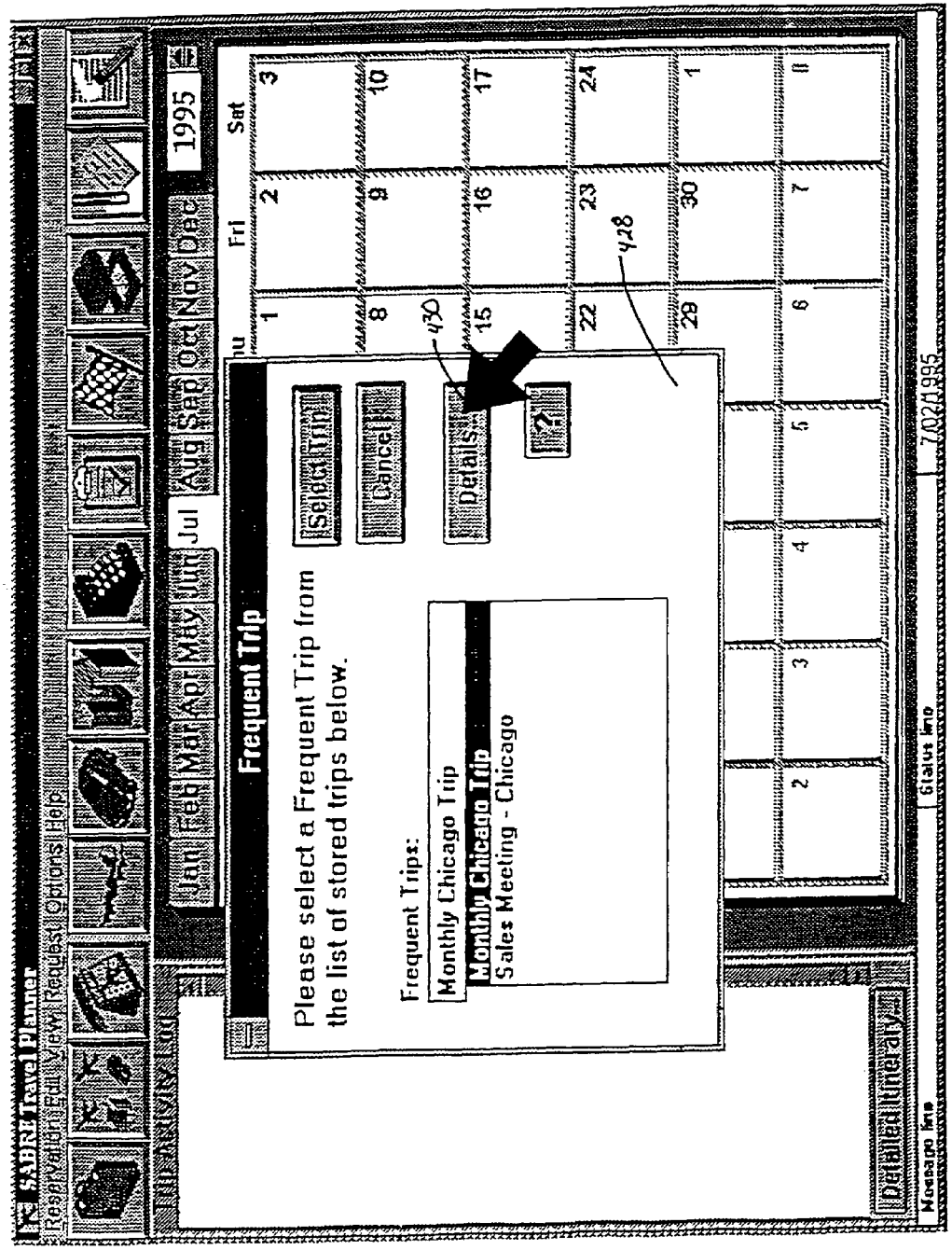
Figure 15C:
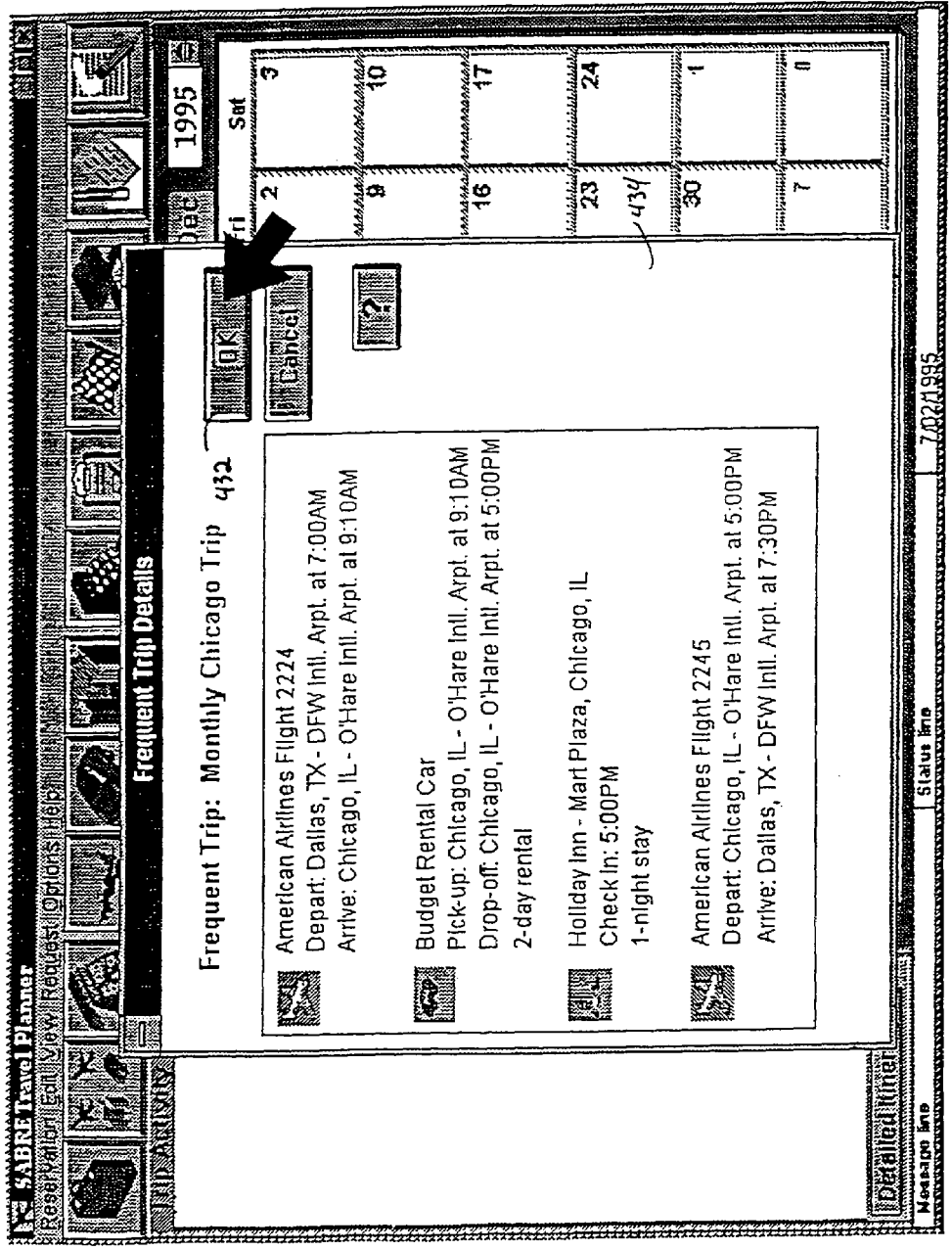
Figure 15D:
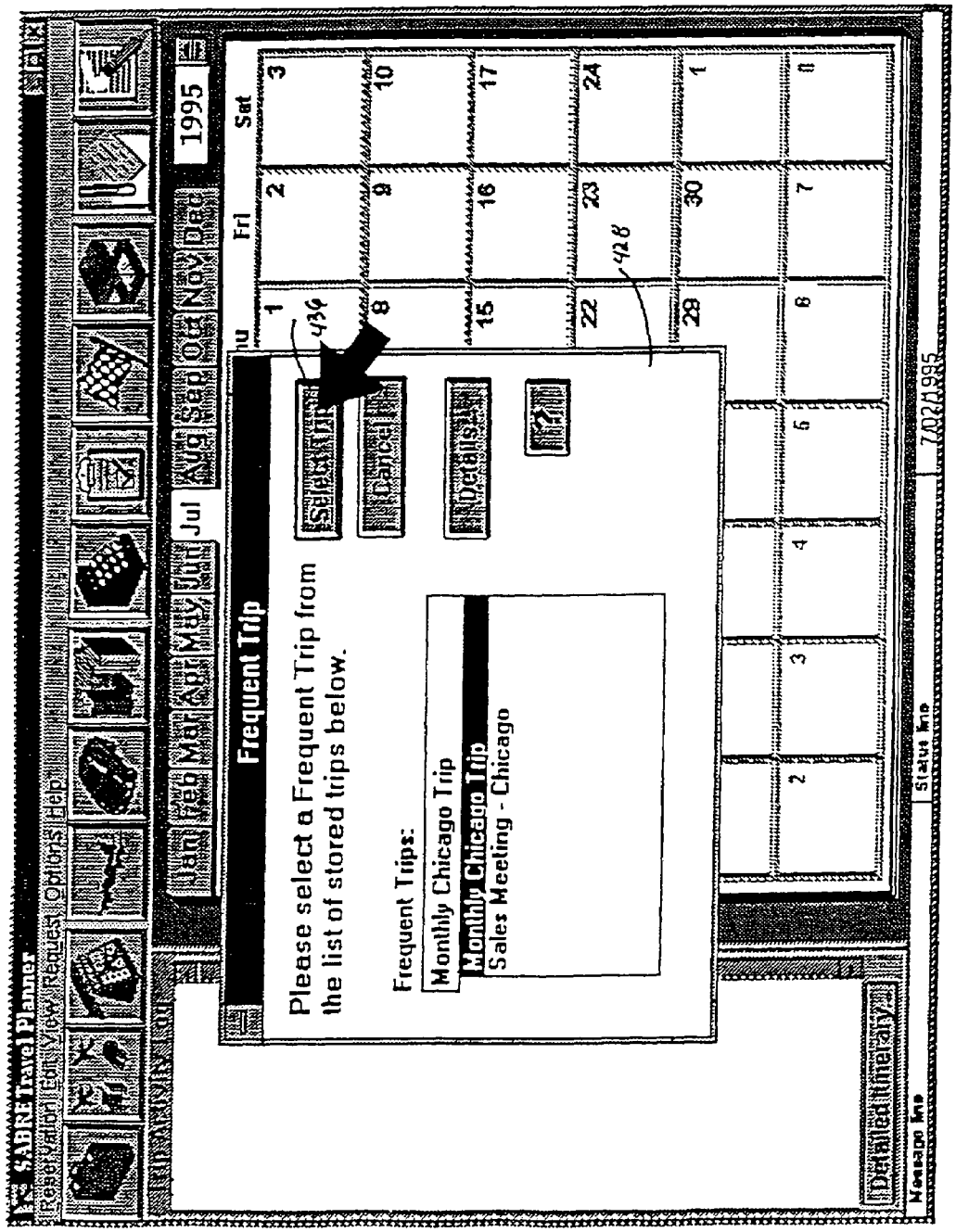
Figure 15E:
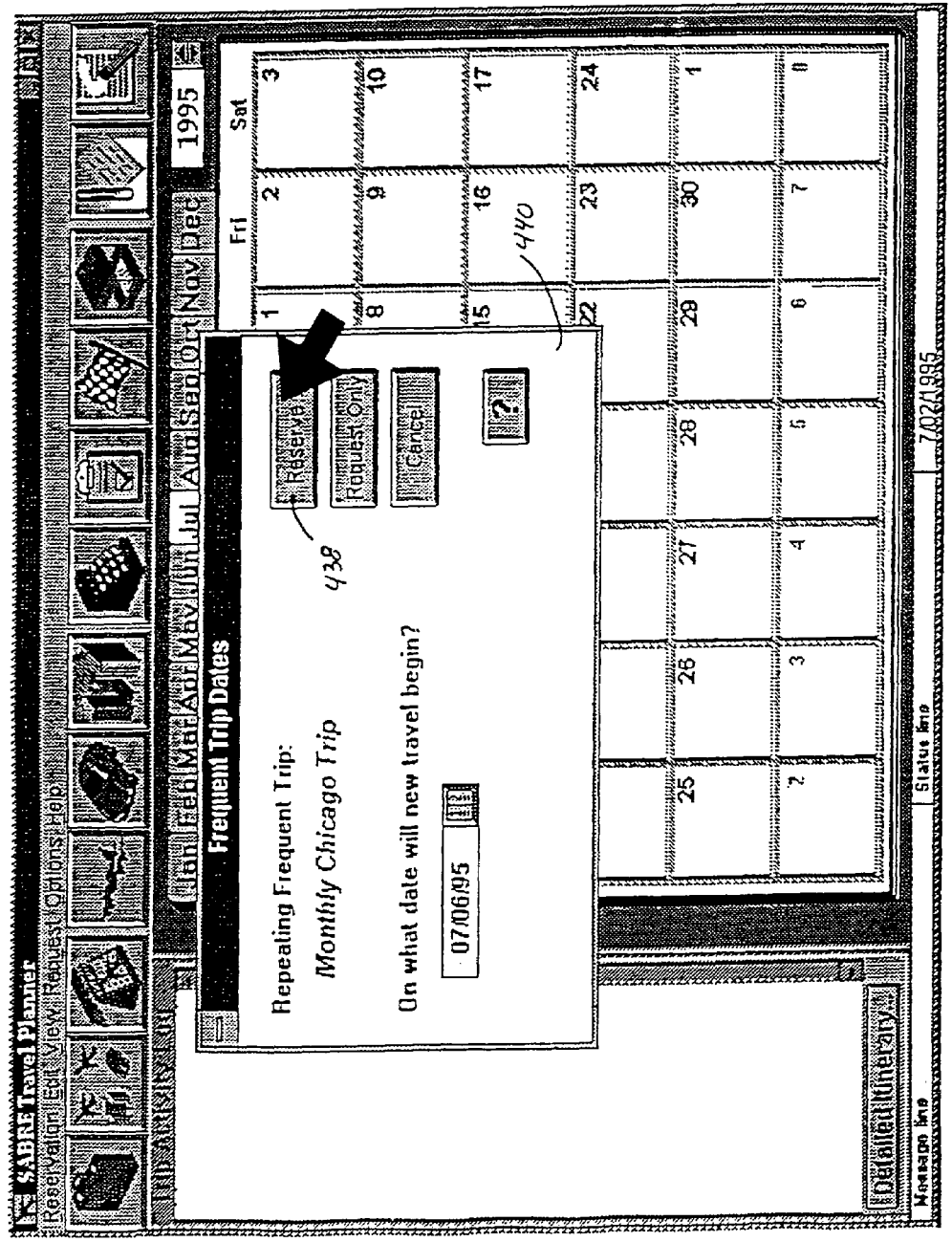
Figure 15F:
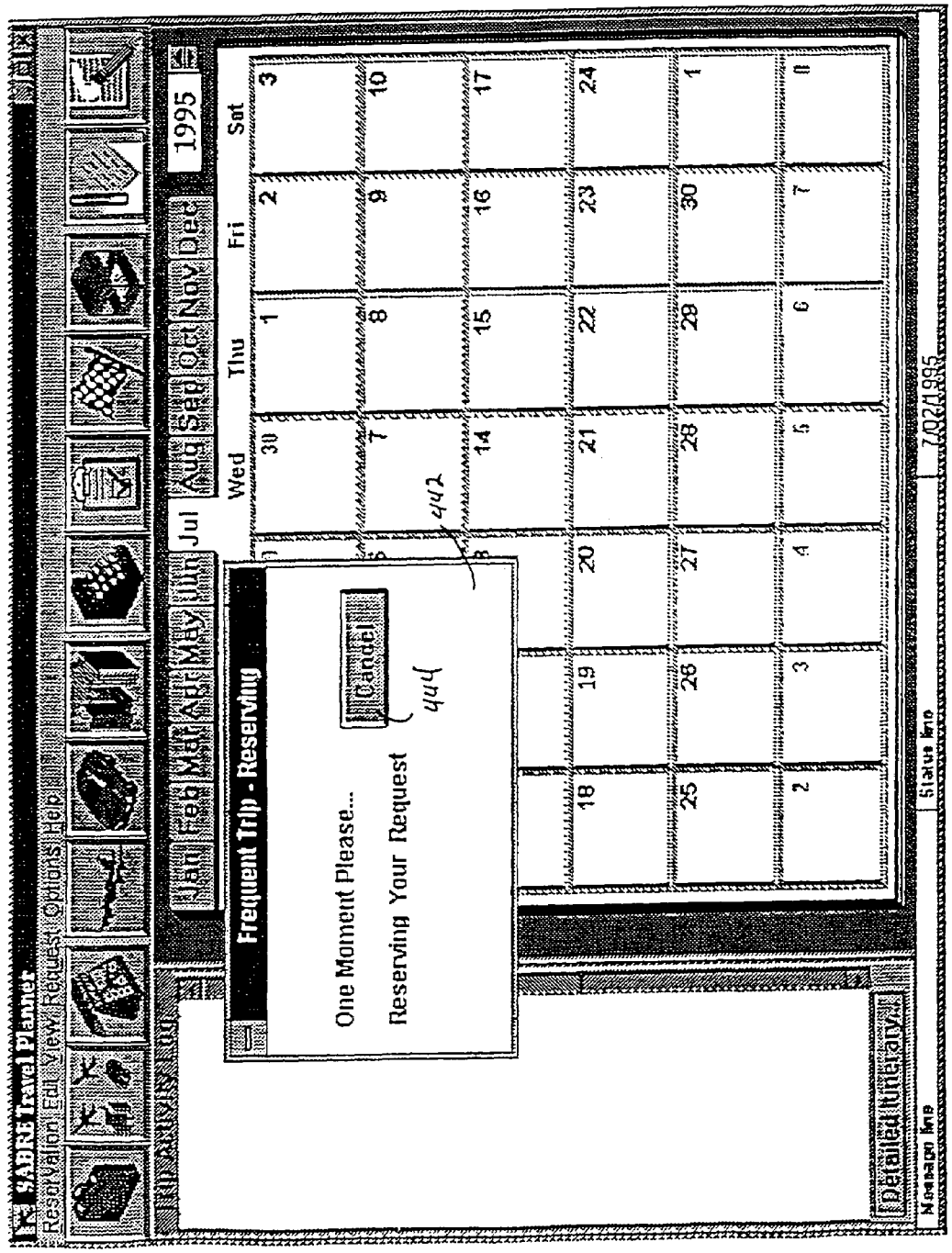
Figure 15G:
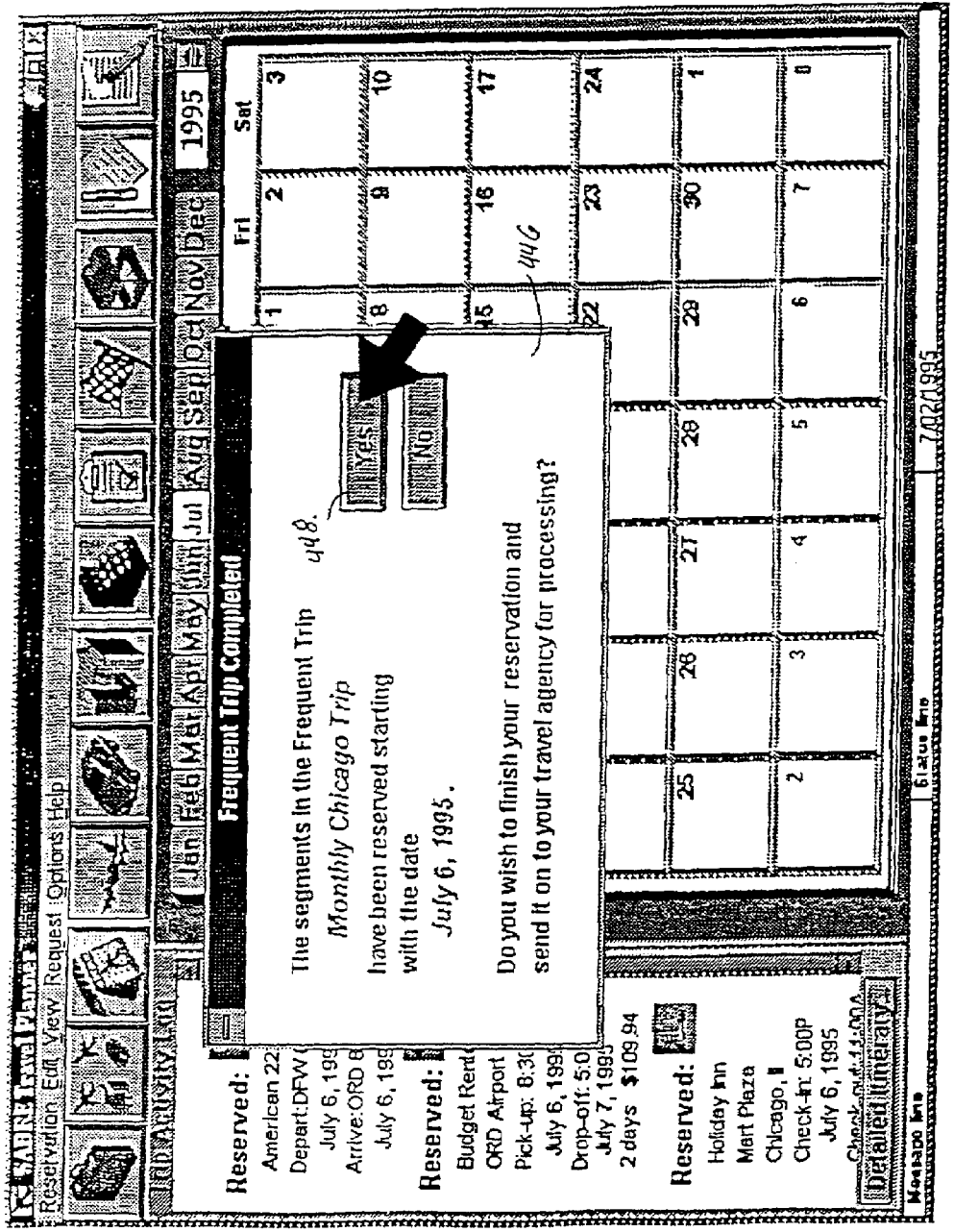

Now turning to FIG. 14, which consists of FIGS. 14A–14X, which are drawings that depict graphical user interfaces for trip planning module 68 as described above in reference to FIG. 4. The traveler 86 places a cursor 360 on the New Trip icon 362 and energizes the New Trip icon 362. The traveler 86 then enters the purpose of the trip and charge center for the trip and purpose of trip in the Charge Center window 364 then energizes Okay button 366 with cursor 360. The traveler 86 selects origination and destination data in Flight Request-Segment 1 window 368 and energizes the Search button 370 with the cursor 360. The traveler 86 selects a flight from the Flight List window 372 which makes a record of the flight in the Trip Activity Log 374 and the Calendar 376. The traveler 86 selects the Continuing Trip icon 378 and selects an origination and destination in the Flight Request-Segment 2 window 380. The traveler 86 selects flight data from the Flight List window 82 and a record of the selected flight is made in the Trip Activity Log 374 and the Calendar 376.

The traveler 86 selects the Hotel icon 384. From the Hotel Request Information window 386, the traveler 86 may search for hotels in the destination city. The traveler 86 selects from a list of hotels from the Hotel List window 388. A record of the hotel selection is made in the Trip Activity Log 374 and on the Calendar 376.

The traveler 86 may select the Rental Car icon 390 to see the Car Request Information window 392. After energizing the Search button 394, the traveler 86 receives a list of available cars and prices in the destination city from the Car List window 396. After the traveler 86 selects a car, a record of the car selected is made in the Trip Activity Log 374 and on the Calendar 376.

The traveler 86 selects the Cost icon 398 to view the Trip Price Information window 400. From the Trip Price Information window 400, the traveler 86 may search for cheaper flights by energizing the Search for Cheaper Flights button 402 which brings up the BargainFinderPlus Parameters window 404. From the BargainFinderPlus Parameters window 404, the traveler 86 may search for cheaper flights by selecting from a menu of parameters. After completing the search, results are displayed from the BargainFinderPlus Search Results window 406 from which the traveler 86 may select from a menu of flights. The traveler 86 may select a different flight by energizing Yes button 408 in the Replace Flights Message window 410. A record of this transaction is made by updating the Trip Activity Log 374 and the Calendar 376.

The traveler 86 may confirm ticketing by energizing the Confirm Ticketing icon 412. From the Confirmation-Ticket Delivery window 414, the traveler 86 may choose a method for obtaining tickets by energizing Okay button 416. The travel Itinerary window 418 is then displayed for the traveler 86.

The traveler 86 may create a reservation by pressing the Finish icon 420. If the traveler 86 wishes to finish the reservation process and send it on to the travel agency for processing, the traveler 86 may energize Yes button 422 in the Finish Reservations window 424. The resulting display shows the the Trip Activity Log 374 and the Calendar 376 with current travel information.

Now turning to FIG. 15, which consists of FIGS. 15A–15G, which are diagrams of graphical user interfaces for repeat trip planning as described above in reference to FIG. 4. The traveler 86 energizes the Frequent Trip icon 426 to receive a menu of frequent trips in the Frequent Trip window 428. The traveler 86 then requests additional details from a selected frequent trip by energizing the Details button 430. If the appropriate frequent trip was selected, the traveler 86 energizes Okay button 432 from the Frequent Trip Details window 434. The traveler 86 then energizes the Select Trip button 436 from the Frequent Trip window 428. The traveler 86 then inputs the date on which travel will begin and energizes the Reserve button 438 in the Frequent Trip Dates window 440. As this information is being processed, the Frequent Trip-Reserving window 442 is viewed by the traveler 86. If Cancel button 444 is not depressed, the Frequent Trip Completed window 446 is displayed and the traveler 86 finishes the reservation process by energizing Yes button 448.

Figure 16A:
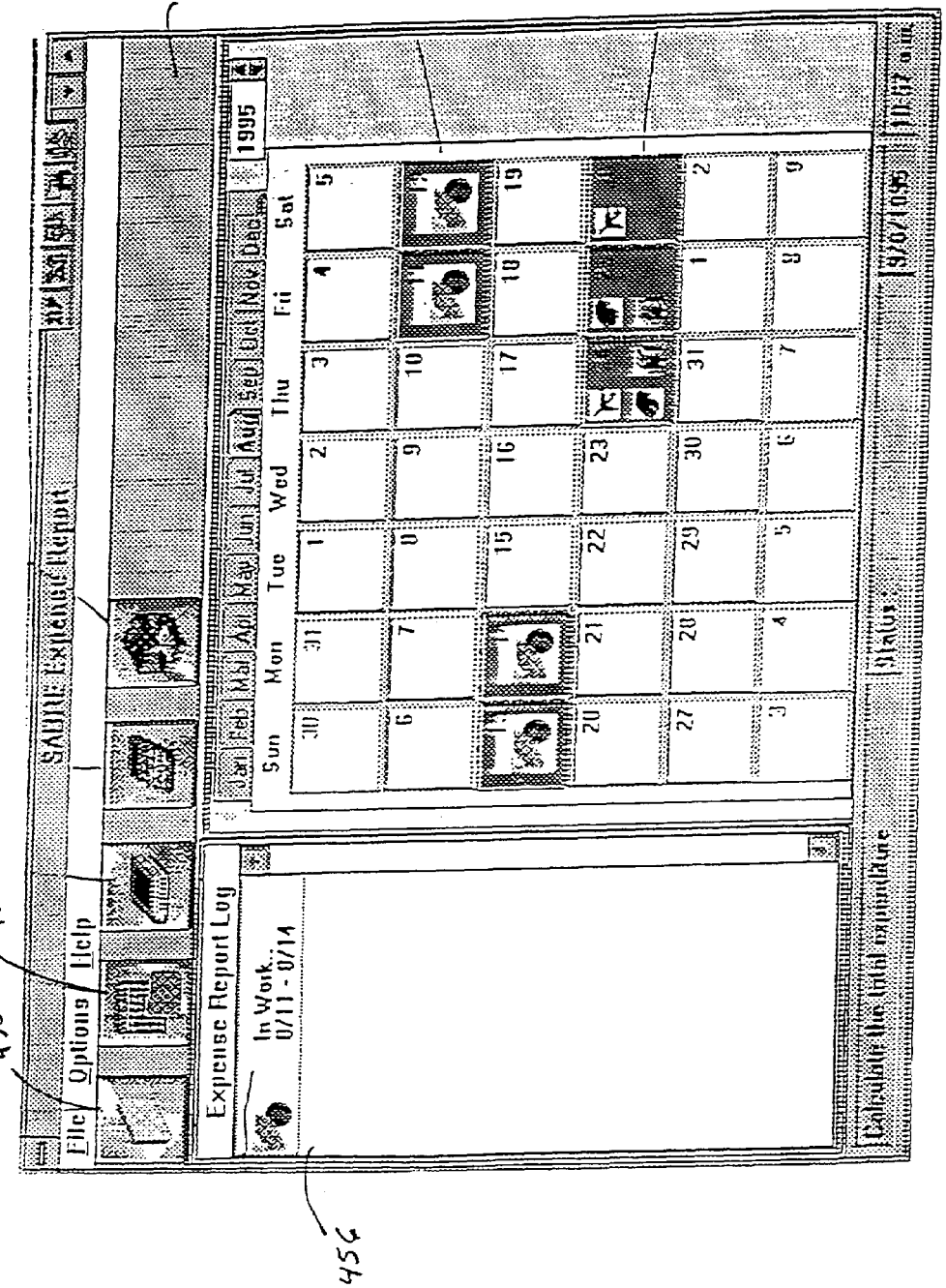
FIG. 16, consisting of 16A–16M, is a series of graphical user interfaces for creating an expense report.
Figure 16C:
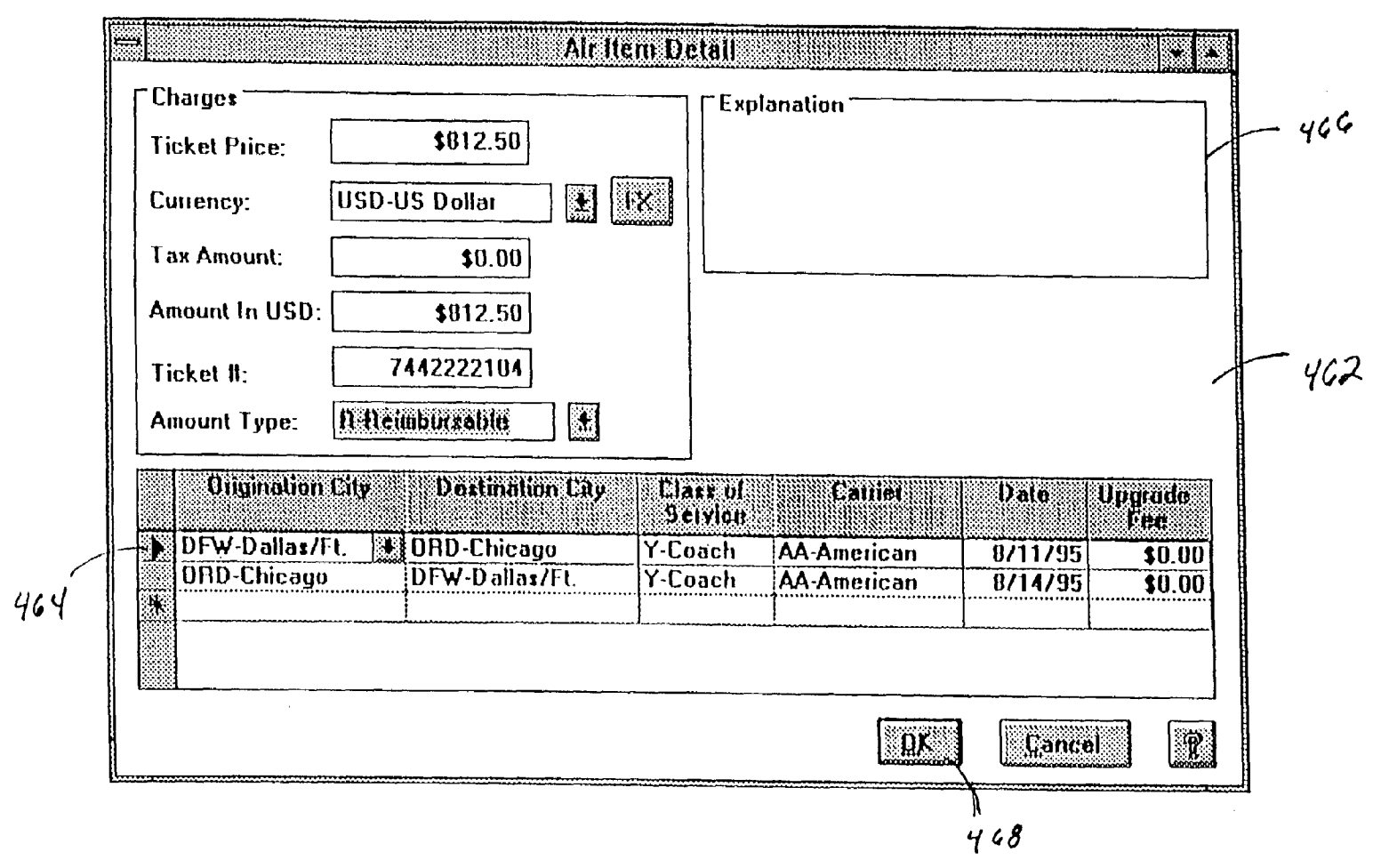
Figure 16D:
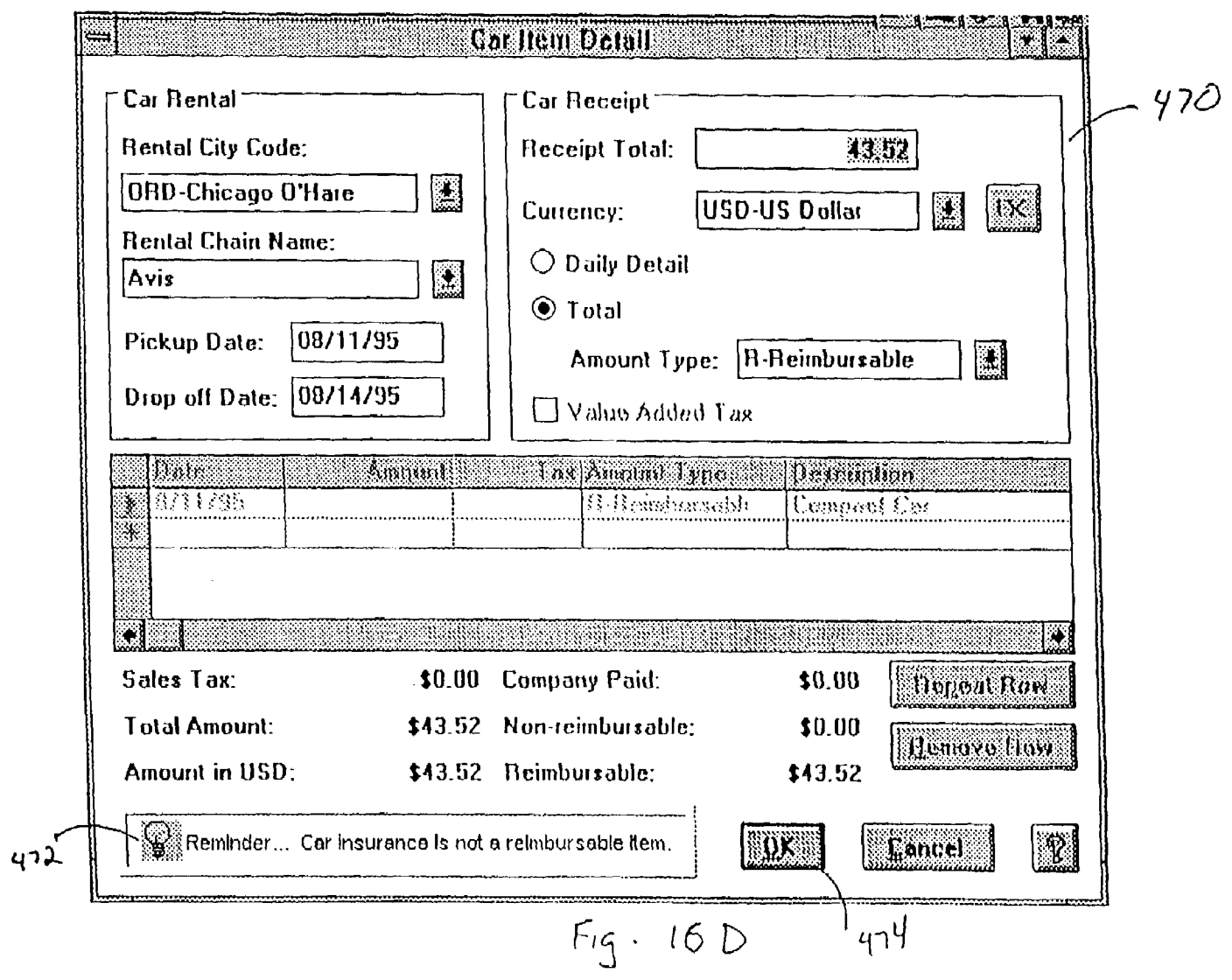
Figure 16E:
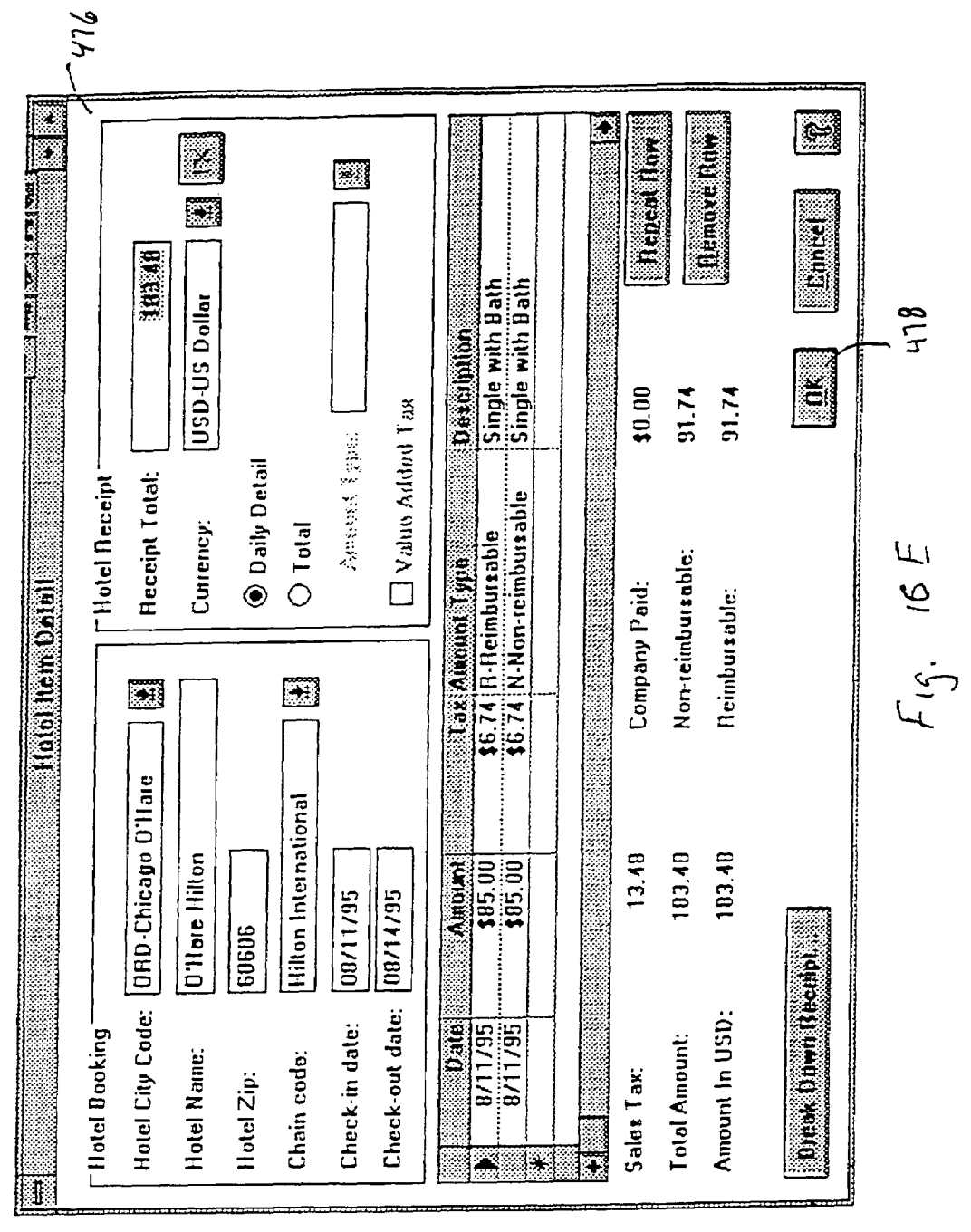
Figure 16F:
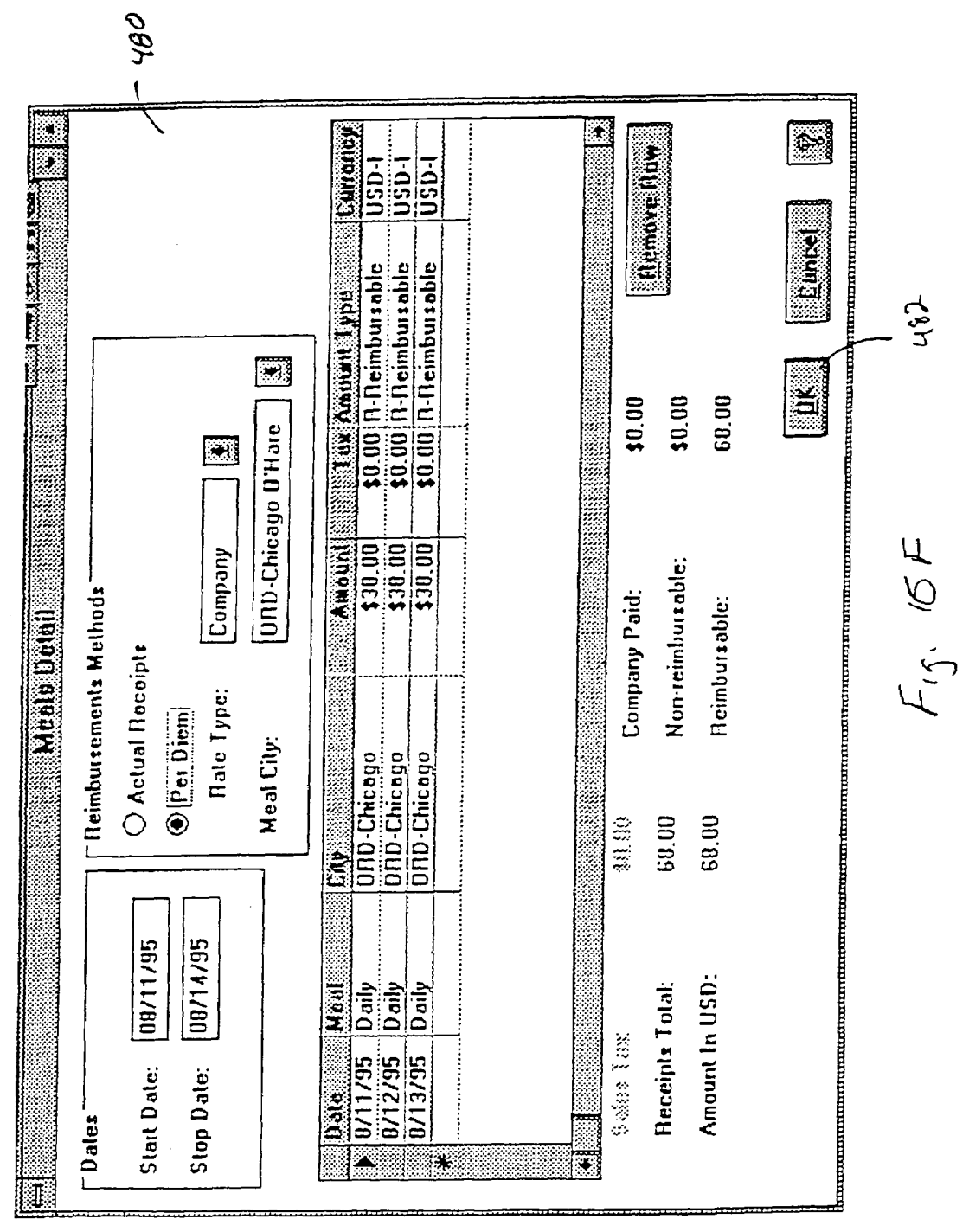
Figure 16H:
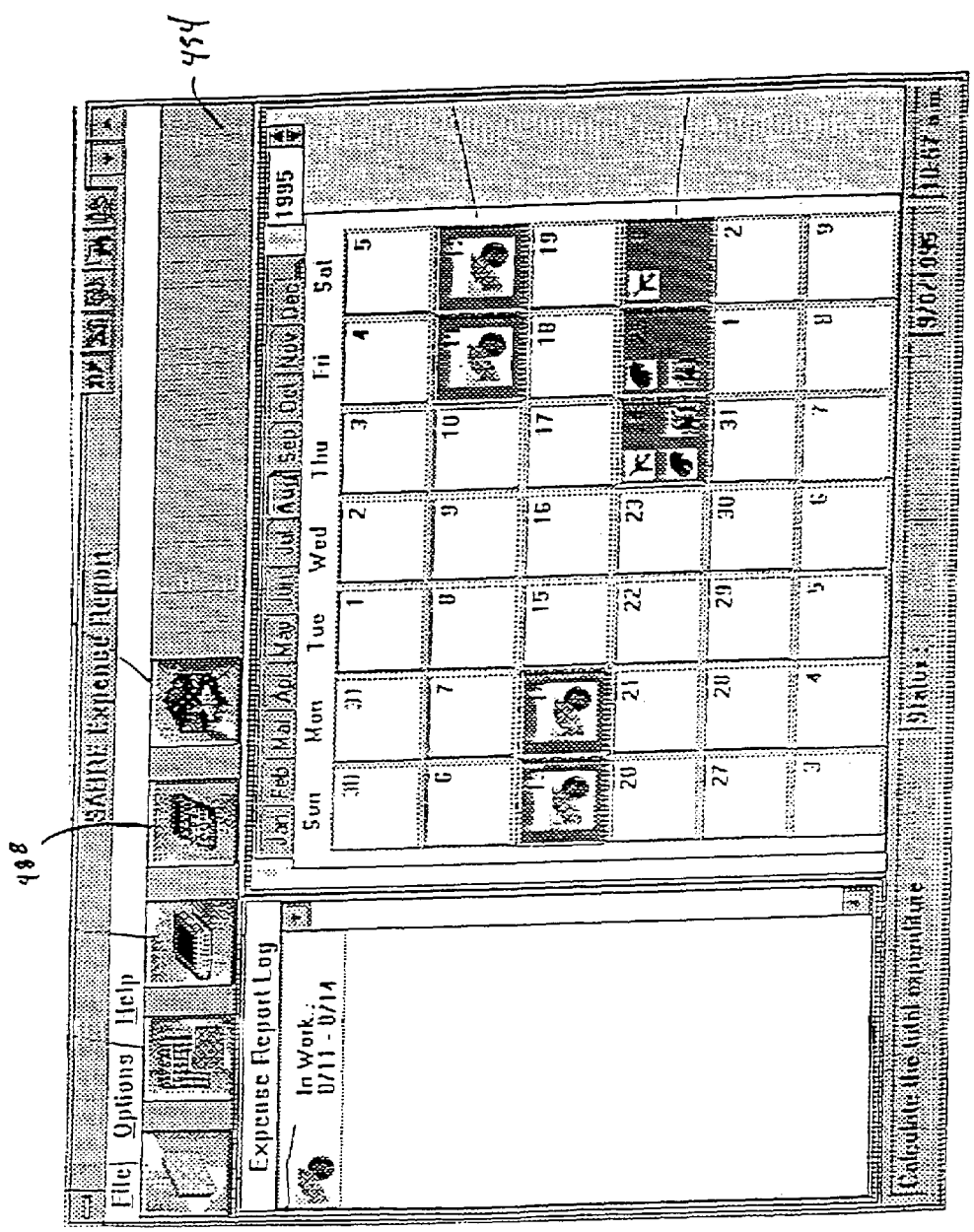
Figure 16J:
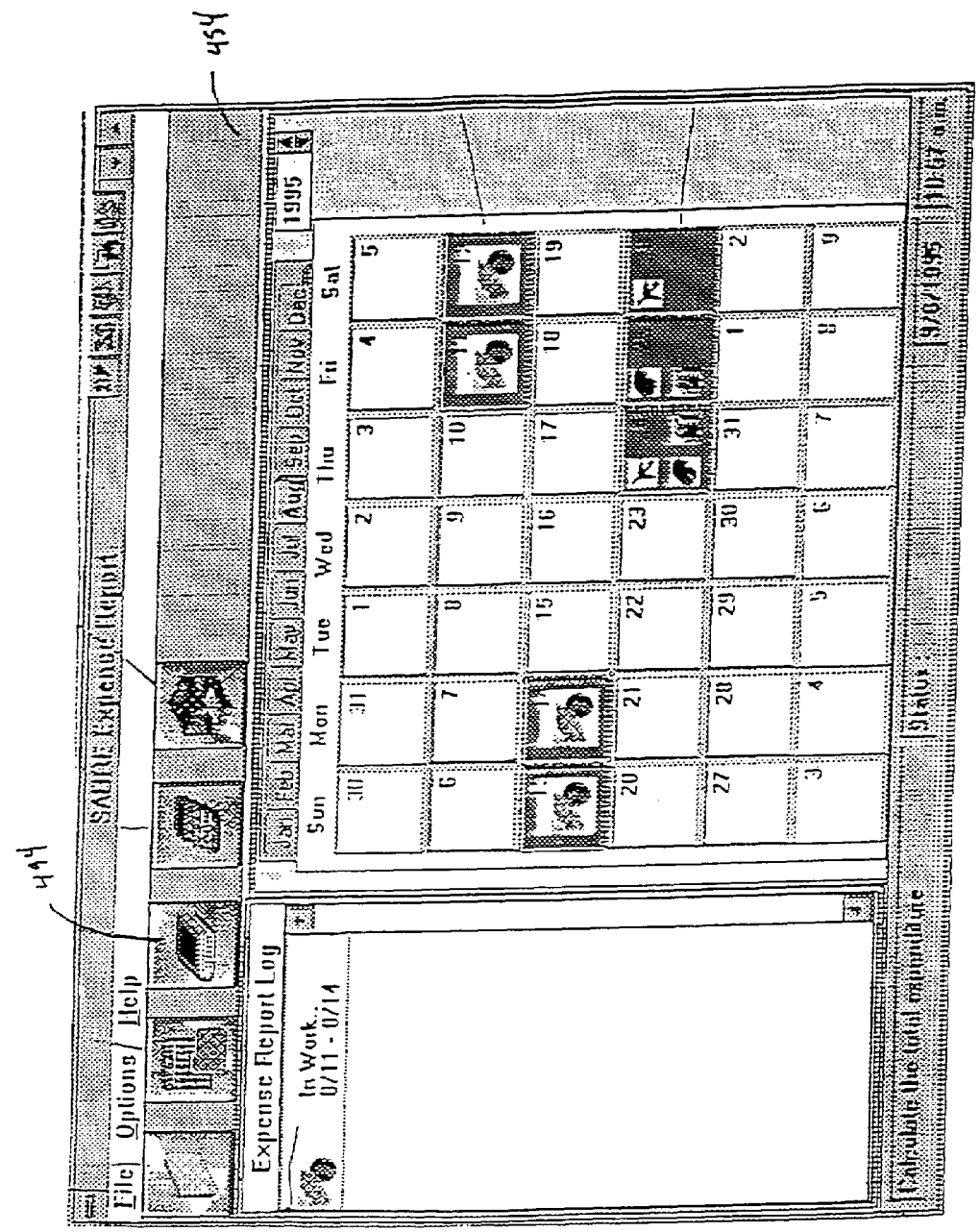
Figure 16K:
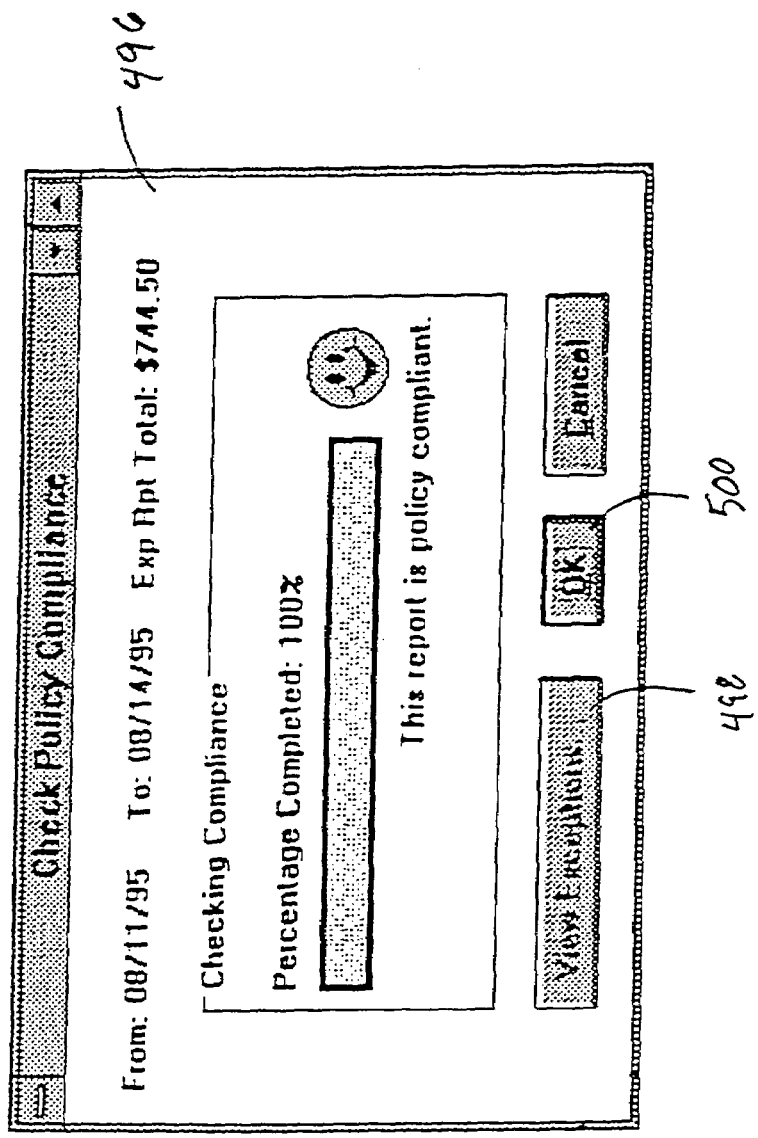
Figure 16:
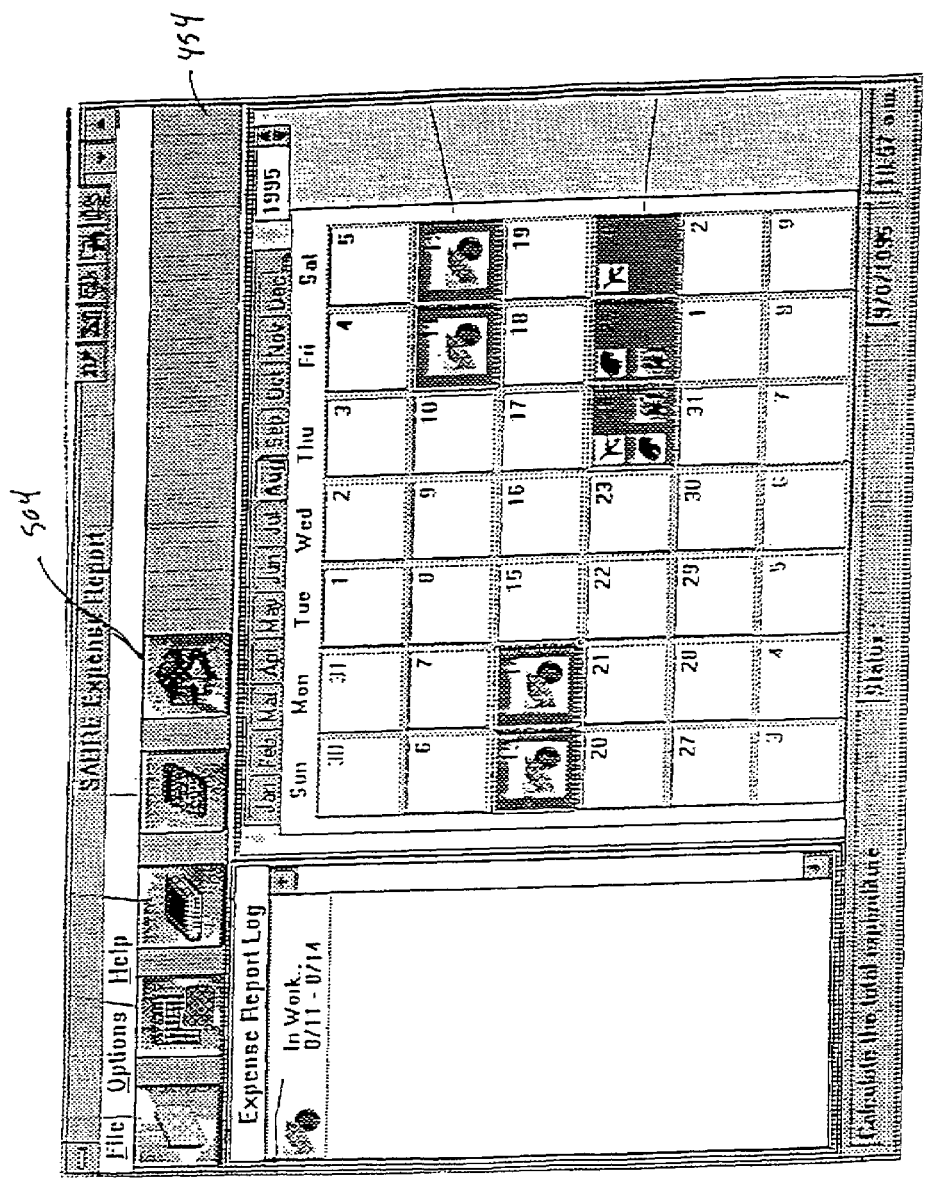

Now turning to FIG. 16, which consists of FIGS. 16A–16M, which are diagrams of graphical user interfaces for creating an expense report as described above in reference to FIG. 10. The traveler 86 selects New Expense Report icon 450 or Modify Expense Report icon 452 from the Expense Report window 454 which shows the status of saved expense reports in an Expense Report Log window 456. Energizing the New Expense Report icon 450 or the Modify Expense Report icon 452 brings up the Expense Data Range window 458, from which the traveler 86 enters or the corporate database 18 autofills date, project and purpose of the trip/expense parameters. The traveler 86 then energizes the Okay bottom 460 to view the Air Item Detail window 462 from which the traveler 86 enters or the corporate database 18 autofills charge parameters for the selected city pair 464. The traveler 86 may also enter an explanation of expenses in the Explanation window 466.

The traveler 86 then energizes the Okay bottom 468 to view the Car Item Detail window 470 from which the traveler 86 enters or the corporate database 18 autofills car rental and car receipt parameters. The corporate database 18 also provides corporate policy data 472 to the traveler 86. The traveler 86 then energizes the Okay bottom 474 to view the Hotel Item Detail window 476 from which the traveler 86 enters or the corporate database 18 autofills hotel booking and hotel receipt parameters. The traveler 86 then energizes the Okay bottom 478 to view the Meals Detail window 480 from which the traveler 86 enters or the corporate database 18 autofills reimbursement parameters. The traveler 86 then energizes the Okay bottom 478 to view the Business Entertainment Detail window 484 from which the traveler 86 enters or the corporate database 18 autofills entertainment parameters. To return to the Expense Report window 454, the traveler 86 energizes the Okay button 486.

The traveler 488 may select the Calculate Totals icon 488 to bring up the Calculate Totals window 490. Expense are totaled by date or by type for the traveler 86. The traveler 86 may also input payment instructions.

The traveler 86 may check for policy compliance by energizing the Check Policy button 492 from the Calculate Totals window 490 of the Check Policy icon 494 from the Expense Report window 454. The traveler 86 views the Check Policy Compliance window 496 while the system does a policy check. The traveler 86 may request explanation of policy violations by energizing the View Exceptions button 498. The traveler 86 may also energizing the Okay button 500 to view the expense report in Expense Report window 502. The traveler 86 submits the expense report for approval by energizing the Submit for Approval icon 504.

Although the invention has been described in detail, it is to be clearly understood that the same is by way of illustration and examplary only and is not to be taken by way of limitation, the spirit and scope of the invention being limited only to the terms of the appended claim.

What is claimed is:

1. A method for creating a new travel reservation based on information reflecting frequent trips comprising:
   storing in a database a set of frequent trip records, each frequent trip record associated with a traveler and reflecting a travel itinerary;
   receiving selection information reflecting a selected one of the frequent trip records to form a trip request;
   prompting a user to indicate at least one new travel date associated with the trip request regardless of whether the selected frequent trip record has any associated travel dates;
   transmitting at least certain aspects of the trip request to a computerized reservation system, wherein a new travel reservation is automatically created using the transmitted aspects of the trip request; and
   displaying a calendar showing at least one month divided into days with at least two icons on days associated with the new travel reservation, wherein the icons represent components on the travel reservation and are selected from the group comprising a transportation component, a lodging component, and a car rental component.

2. The method of claim 1, wherein the step of receiving selection information reflecting a selected frequent trip record to form a trip request further comprises the substep of prompting the particular user for the trip request.

3. The method of claim 1, wherein the step of receiving selection information reflecting a selected frequent trip record to form a trip request further comprises the substep of displaying a set of frequent trip records associated with the particular traveler and stored in a database.

4. The method of claim 1, further comprising:
   maintaining a log of travel reservations for the particular traveler.

5. The method of claim 4, wherein an expense report is associated with each entry in the log.

6. The method of claim 1, further comprising:
   storing expense reports for travel reservations.

7. The method of claim 6, wherein the step of transmitting at least certain aspects of the trip request to a computerized reservation system comprises the substep of creating a new expense report for the new travel reservation.

8. The method of claim 7, further comprising:
   automatically populating, without user intervention, at least one field of the new expense report.

9. The method of claim 1, further comprising:
   creating and sorting a new expense report associated with the new travel reservation; and
   populating at least one field of a new expense report from information obtained when booking the new travel reservation.

10. The method of claim 9, further comprising:
    prompting the particular traveler for information to complete the new expense report.

11. The method of claim 1, further comprising:
    determining, before booking the new travel reservation, whether all components of the new travel reservation comply with predetermined policies or agreements governing travel associated with an entity.

12. The method of claim 1, further comprising:
    creating and sorting a new expense report associated with the new travel reservation;
    populating at least one field of a new expense report from information obtained when booking the new travel reservation; and
    determining whether all components of the new travel reservation comply with predetermined policies or agreements governing travel associated with an entity.

13. The method of claim 11, wherein the components are selected from the group comprising a transportation component, a lodging component, a car rental component, a food component, and an entertainment component.

14. The method of claim 12, wherein the components are selected from the group comprising a transportation component, a lodging component, a car rental component, a food component, and an entertainment component.

15. The method of claim 1, further comprising:
    displaying a calendar showing at least one month divided into days with icons on days associated with the new travel reservation.

16. The method of claim 1, wherein the step of prompting—a user to indicate at least one new travel date includes receiving information reflecting at least one of a month, day, and year.

17. The method of claim 1, wherein the step of transmitting includes the substep of prompting the particular traveler to authorize creation of a new travel reservation associated with the trip request and scheduled based on the provided travel date.

18. The method of claim 17, wherein the step of transmitting further comprises the step of providing the particular traveler with an opportunity to cancel the new travel reservation within a predetermined period of time.

19. The method of claim 18, wherein the step of transmitting further comprises the step of prompting the particular traveler to authorize automatic forwarding of the new travel reservation to a travel agency for post-reservation processing.

20. The method of claim 1, wherein the step of transmitting further comprises the substeps of:
prompting the particular traveler to authorize creation of a new travel reservation associated with the trip request and scheduled based on the indicated travel date;
automatically creating the new travel reservation in response to the particular traveler's authorization;
providing the particular traveler with an opportunity to cancel the new travel reservation within a predetermined period of time following creation of the new travel reservation; and
prompting the particular traveler to authorize automatic forwarding of at least information reflecting the new travel reservation to a travel agency for post-reservation processing.

21. The method of claim 20, further comprising the step of automatically determining whether at least one component of the new travel reservation complies with one or more predetermined policies governing travel associated with an entity.

22. The method of claim 21, wherein the one or more predetermined policies indicate restrictions on travel reservations based on a profile of the particular traveler within the entity.

23. The method of claim 21, wherein the component of the new travel reservation is selected from the group comprising a transportation component, a lodging component, a car rental component, a food component, and an entertainment component.

24. The method of claim 21, further comprising the step of:
canceling a new travel reservation that does not comply with the one or more predetermined policies governing travel associated with the entity.

25. The method of claim 21, further comprising the step of:
populating at least one field of an expense report with information obtained during the step of determining whether at least one component of the new travel reservation complies with predetermined policies governing travel associated with an entity.

26. The method of claim 1, further comprising the step of automatically determining whether a least one component of the new travel reservation complies with one or more predetermined policies governing travel associated with an entity.

27. The method of claim 26, wherein the one or more predetermined policies include restrictions on travel reservations based on a profile of the particular traveler within the entity.

28. The method of claim 26, further comprising the step of canceling any new travel reservation that does not comply with the one or more predetermined policies governing travel associated with the entity.

29. The method of claim 26, further comprising the step of:
populating at least one field of an expense report with information obtained during the step of determining whether at least one component of the new travel reservation complies with predetermined policies governing travel associated with an entity.

30. The method of claim 1, wherein the step of transmitting comprises automatically forwarding the new travel reservation to a travel agency for post reservation processing.

31. The method of claim 30, further comprising the step of automatically determining whether at least one component of the new travel reservation complies with one or more predetermined policies governing travel associated with an entity.

32. The method of claim 31, wherein the one or more predetermined policies include restrictions on travel reservations based on a profile of the particular traveler within the entity.

33. The method of claim 31, further comprising the step of canceling a new travel reservation that does not comply with the one or more predetermined policies governing travel associated with the entity before the step of automatically forwarding the new travel reservation to a travel agency for post reservation processing.

34. The method of claim 31, further comprising the step of:
populating at least one field of an expense report with information obtained during the step of determining whether at least one component of the new travel reservation complies with predetermined policies governing travel associated with an entity.

35. The method of claim 1, wherein the step of transmitting automatically occurs in response only to an indication of a new travel date by the user.

36. The method of claim 1, wherein the at least one new travel date comprises a beginning travel date on which travel for the new travel reservation will begin.

37. The method of claim 35, further comprising the step of automatically identifying an ending date on which travel for the new travel reservation will end.

38. The method of claim 37, wherein the step of automatically identifying the ending date is based solely on the travel itinerary associated with the selected one of the frequent trip records and the beginning travel date indicated by the user.

39. The method of claim 36, further comprising the step of automatically identifying a travel duration for the new travel reservation.

40. The method of claim 39, wherein the travel duration comprises a number of travel days corresponding to a number of travel days of the travel itinerary associated with the selected one of the stored frequent trip records.

41. The method of claim 39, wherein the step of automatically identifying the travel duration is based solely on the travel itinerary associated with the selected one of the stored frequent trip records.

42. The method of claim 1, wherein the transmitted aspects of the trip request comprise a travel ending date for the new travel reservation.

43. The method of claim 42, wherein the travel ending date for the new travel reservation is automatically identified based on the travel itinerary associated with the selected one of the frequent trip records and the new travel date indicated by the user.

44. The method of claim 1, wherein the transmitted aspects of the trip request comprise a travel duration for the new travel reservation.

45. The method of claim 44, wherein the travel duration for the new travel reservation is automatically identified based solely on the travel itinerary associated with the selected one of the frequent trip records.

46. The method of claim 1, wherein the step of transmitting at least certain aspects of the trip request to a computerized reservation system comprises the substeps of accessing travel data associated with the selected one of the frequent trip records stored in the database, transmitting the travel data to the computerized reservation, and receiving a confirmation of the new travel reservation based solely on the new travel date indicated by the user.

47. The method of claim 1, further comprising the step of receiving a new travel date in response to the step of prompting, and the step of transmitting at least certain aspects of the trip request to a computerized reservation system automatically occurs in response solely to the step of receiving a new travel date.

48. A method for creating a new travel reservation based on a set of frequent trip records comprising:
   storing in a database a set of frequent trip records, each frequent trip record including a travel itinerary associated with a traveler;
   displaying a menu selected from the stored set of frequent trip records;
   prompting a user to select one of the frequent trip records from the displayed menu to form a new travel reservation;
   prompting the user to indicate a new trip travel date for the new travel reservation regardless of whether the selected frequent trip record includes a travel date;
   transmitting information selected from the new travel reservation to a computerized reservation system so as to book a new reservation; and
   automatically calculating a travel end date for the new travel reservation based on the selected frequent trip record and the indicated new trip travel date, and including the travel end date in the information transmitted to the computerized reservation system.

49. The method of claim 48, further comprising the step of prompting a user to select a frequent trip icon, and wherein the step of displaying automatically occurs in response to the selection of the frequent trip icon.

50. The method of claim 48, wherein the step of transmitting automatically occurs in response solely to the indication of the new trip travel date.

51. The method of claim 48, wherein the new trip travel date comprises a beginning travel date on which travel for the new travel reservation is expected to begin.

52. The method of claim 51, further comprising the step of automatically identifying an ending date upon which travel for the new travel reservation will end.

53. The method of claim 52, wherein the step of automatically identifying the ending date is based solely on the travel itinerary associated with the selected frequent trip record and the indicated beginning travel date.

54. The method of claim 52, further comprising the step of automatically identifying a travel duration for the new travel reservation.

55. The method of claim 54, wherein the travel duration comprises a number of travel days corresponding to a number of travel days of the travel itinerary associated with the selected frequent trip record.

56. The method of claim 54, wherein the step of automatically identifying the travel duration is based solely on the travel itinerary associated with the selected frequent trip record.

57. The method of claim 48, further comprising the step of automatically determining whether at least one component of the new travel reservation complies with one or more predetermined policies governing travel associated with an entity.

58. The method of claim 57, wherein the one or more predetermined policies indicate restrictions on travel reservations based on a profile of the particular traveler within the entity.

59. The method of claim 57, wherein the component of the new travel reservation is selected from a group comprising a transportation component, a lodging component, a car rental component, a food component, and an entertainment component.

60. The method of claim 57, further comprising the step of canceling a new travel reservation that does not comply with the one or more predetermined policies governing travel associated with the entity.

61. The method of claim 57, further comprising the step of populating at least one field of an expense report with information obtained during the step of determining whether at least one component of the new travel reservation complies with predetermined policies governing travel associated with an entity.

62. The method of claim 48, wherein the step of transmitting comprises the step of automatically forwarding the new travel reservation to a travel agency for post reservation processing.

63. A method for booking a new travel reservation through an interactive reservation system and based on at least one past travel, itinerary comprising:
   storing a plurality of past travel itineraries associated with a traveler in a database, each of the plurality of past travel itineraries having a travel start date;
   displaying a menu of icons for each of the stored plurality of past travel itineraries;
   retrieving a past travel itinerary associated with the traveler from the database and displaying the retrieved past travel itinerary in response to a selection of one of the menu icons;
   prompting the user to create a new travel itinerary based on the displayed past travel itinerary by identifying a new travel start date different from the travel start date associated with the displayed past travel itinerary;
   transmitting the new travel itinerary through the interactive reservation system to book a new travel reservation based on the identified new travel start date; and
   automatically calculating the travel end date for the new travel itinerary based on the displayed past travel itinerary and the identified new travel start date, and including the calculated travel end date in the new travel itinerary transmitted through the interactive reservation system.

64. The method of claim 63, wherein the step of transmitting automatically occurs in response solely to the indication of the new travel start date.

65. The method of claim 63, further comprising the step of automatically calculating a travel duration for the new travel reservation based on a travel duration of the displayed past travel itinerary.

66. The method of claim 63, further comprising the step of automatically determining whether at least one component of the new travel reservation complies with one or more predetermined policies governing travel associated with an entity.

67. The method of claim 66, wherein the one or more predetermined policies include restrictions on travel reservations based on a profile of the particular traveler within the entity.

68. The method of claim 66, wherein the component of the new travel reservation is selected from a group comprising a transportation component, a lodging component, a car rental component, a food component, and an entertainment component.

69. The method of claim 66, further comprising the step of canceling a new travel reservation that does not comply with the one or more predetermined policies governing travel associated with the entity.

70. The method of claim 66, further comprising the step of populating at least one field of an expense report with information obtained during the step of determining whether at least one component of the new travel reservation complies with predetermined policies governing travel associated with an entity.

71. The method of claim 63, wherein the step of transmitting comprises the step of automatically forwarding the new travel reservation to a travel agency for post reservation processing, including ticket printing.

* * * * *